United States Patent
Baba et al.

(10) Patent No.: US 8,693,385 B2
(45) Date of Patent: Apr. 8, 2014

(54) REPEATER, COMMUNICATION SYSTEM, BASE STATION, RADIO TERMINAL, AND MANAGEMENT SERVER

(75) Inventors: Takashi Baba, Kanagawa (JP); Nubuo Kuchiki, Kanagawa (JP); Akira Ishida, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 287 days.

(21) Appl. No.: 13/061,387

(22) PCT Filed: Aug. 20, 2009

(86) PCT No.: PCT/JP2009/003967
§ 371 (c)(1),
(2), (4) Date: May 23, 2011

(87) PCT Pub. No.: WO2010/023847
PCT Pub. Date: Mar. 4, 2010

(65) Prior Publication Data
US 2011/0211521 A1    Sep. 1, 2011

(30) Foreign Application Priority Data

Aug. 28, 2008  (JP) ................ 2008-220220
Aug. 28, 2008  (JP) ................ 2008-220221
Aug. 28, 2008  (JP) ................ 2008-220222
Aug. 28, 2008  (JP) ................ 2008-220223

(51) Int. Cl.
*H04B 7/14* (2006.01)

(52) U.S. Cl.
USPC .......................... 370/315; 370/328

(58) Field of Classification Search
CPC ... H04B 7/2606; H04B 7/155; H04W 84/047; H04W 84/045; H04W 16/26
See application file for complete search history.

(56) References Cited

U.S. PATENT DOCUMENTS 4,901,307 A     2/1990  Gilhousen et al.
2004/0071128 A1  4/2004  Jang et al.
(Continued)

FOREIGN PATENT DOCUMENTS

JP    S63-108827 A    5/1988
JP    H03-108915 A    5/1991
(Continued)

OTHER PUBLICATIONS

Hattori et al., "Wireless Broadband Textbook, High Speed Wireless Version", vol. 2, Jun. 21, 2006, pp. 190-191, Impress R&D, Japan.

(Continued)

*Primary Examiner* — Jung Park
(74) *Attorney, Agent, or Firm* — Procopio, Cory, Hargreaves & Savitch LLP

(57) ABSTRACT

Provided is a repeater for relaying communication by achieving synchronization with a base station and a mobile station without using GPS. The repeater includes a donor unit communicating with the base station and a remote unit communicating with the mobile station. Upon receipt of a signal from the base station, the donor unit specifies a preamble of the received signal to achieve synchronization with the base station. This determines start of each frame in the communication between the base station and the repeater. After the synchronization achievement, the remote unit starts performing procedures for achieving synchronization with the mobile station. Upon notification of the start timing of each frame from the donor unit, the remote unit determines the notified timing as start timing of each frame in the communication between the repeater and the mobile station, and transmits a preamble referred to by the mobile station when it achieves synchronization.

14 Claims, 45 Drawing Sheets

(56) References Cited

U.S. PATENT DOCUMENTS

| | | |
|---|---|---|
| 2005/0136835 A1 | 6/2005 | Suwa |
| 2007/0086388 A1 | 4/2007 | Kang et al. |
| 2008/0045145 A1 | 2/2008 | Nakatsugawa |
| 2008/0045174 A1 | 2/2008 | Chen et al. |
| 2008/0062908 A1 | 3/2008 | Hart et al. |
| 2010/0105397 A1 | 4/2010 | Hart et al. |
| 2011/0038294 A1* | 2/2011 | Zhou et al. .................... 370/311 |
| 2013/0010604 A1* | 1/2013 | Zhang et al. .................. 370/241 |

FOREIGN PATENT DOCUMENTS

| | | |
|---|---|---|
| JP | H10-135892 A | 5/1998 |
| JP | 2000-004469 A | 7/2000 |
| JP | 2000-197108 A | 7/2000 |
| JP | 2003-524944 A | 8/2003 |
| JP | 2003-530047 A | 10/2003 |
| JP | 2004-166247 A | 6/2004 |
| JP | 2005-184193 A | 7/2005 |
| JP | 2007-116696 A | 10/2007 |
| JP | 2007-312045 A | 11/2007 |
| JP | 2008-048218 A | 2/2008 |
| JP | 2008-048414 A | 2/2008 |
| JP | 2008-067386 A | 3/2008 |
| WO | 01/17125 A1 | 3/2001 |
| WO | 01/76311 A2 | 10/2001 |

OTHER PUBLICATIONS

"WiMAX Kyoukasyo / WiMAX Textbook", Chapter 7, Section 7.
Decision of Final Rejection dated Nov. 24, 2009 issued for counterpart Japanese Application No. 2008-220223.
Notification of Reasons for Refusal dated Mar. 29, 2011 issued for counterpart Japanese Application No. 2008-220222.
Notification of Reasons for Refusal dated Mar. 29, 2011 issued for counterpart Japanese Application No. 2008-220220.
International Search Report and Written Opinion dated Nov. 24, 2009 issued by the Japanese Patent Office for International Application No. PCT/JP2009/003967.

* cited by examiner

FIG. 15A

| Holding device | Neighbor list |
|---|---|
| BS2103 | RS2202, RS2201, BS2101, BS2102, BS2107 |

FIG. 15B

| Holding device | Neighbor list |
|---|---|
| RS2202 | BS2103, BS2107, BS2102 |

FIG. 15C

| Holding device | Neighbor list |
|---|---|
| MS2301 | RS2202, RS2201, BS2101, BS2102, BS2107 |

FIG. 15D

| Holding device | Neighbor list |
|---|---|
| MS2302, MS2304 | BS2103, BS2107, BS2102 |

FIG. 26A

| Holding device | Neighbor list |
|---|---|
| BS3103 | RS3202, RS3201, BS3101, BS3102, BS3107 |

FIG. 26B

| Holding device | Neighbor list |
|---|---|
| RS3202 | RS3201, BS3103, BS3107, BS3102 |

FIG. 26C

| Holding device | Neighbor list |
|---|---|
| BS3107 | BS3105, BS3106, BS3103, BS3104 |

FIG. 26D

| Holding device | Neighbor list |
|---|---|
| MS3302 | RS3201, BS3103, BS3107, BS3102 |

FIG. 32A

| Holding device | Neighbor list |
|---|---|
| BS3103 | RS3201, BS3101, BS3102, BS3107 |

FIG. 32B

| Holding device | Neighbor list |
|---|---|
| RS3202 | BS3105, BS3106, BS3103, BS3104, BS3107 |

FIG. 32C

| Holding device | Neighbor list |
|---|---|
| BS3107 | RS3202, BS3105, BS3106, BS3103, BS3104 |

FIG. 32D

| Holding device | Neighbor list |
|---|---|
| MS3302 | BS3105, BS3106, BS3103, BS3104, BS3107 |

FIG. 38

| Zone | Base station | Repeater |
|------|--------------|----------|
| Zone001 | BS4101 | |
| | BS4102 | |
| | | RS4201 |
| | BS4103 | |
| | | RS4202 |
| Zone002 | BS4104 | |
| | | RS4203 |
| | BS4105 | |
| | | RS4204 |
| | BS4106 | |
| | BS4107 | |
| ⋮ | ⋮ | ⋮ |

FIG. 39

| Zone | Content to be broadcast |
|---|---|
| Zone001 | Content A |
| Zone002 | Content B |
| ⋮ | ⋮ |

FIG. 44

| Zone | Base station | Repeater |
|---|---|---|
| Zone001 | BS4101 | |
| | BS4102 | |
| | | RS4201 |
| | BS4103 | |
| Zone002 | BS4104 | |
| | | RS4203 |
| | BS4105 | |
| | | RS4204 |
| | BS4106 | |
| | BS4107 | |
| | | RS4202 |
| ⋮ | ⋮ | ⋮ |

REPEATER, COMMUNICATION SYSTEM, BASE STATION, RADIO TERMINAL, AND MANAGEMENT SERVER

TECHNICAL FIELD

The present invention relates to a repeater that receives a signal from a base station and relays the received signal to a mobile station, and in particular to a technique for achieving synchronization.

BACKGROUND ART

Repeaters can be interposed in communication between a mobile station and a base station, in order to overcome attenuation which occurs when the mobile station is located in such a position that a signal transmitted from any base station cannot be properly received. Such a repeater receives a signal from a base station and relays the received signal to the mobile station. Normally, the repeater amplifies the received signal, and outputs the signal to the mobile station at the amplified level.

It is necessary to achieve synchronization between the base station and the repeater, and between the repeater and the mobile station, in order for the communication between the base station and the repeater and between the repeater and the mobile station to be performed.

Between the base station and the mobile station, the communication is performed as shown in FIG. 8. In FIG. 8, Tx indicates a transmission phase, and Rx indicates a reception phase. It is assumed that the repeater is interposed between the base station and the mobile station, so that the signal transmitted from the base station is relayed by the repeater.

Regarding such a communication where the repeater is interposed between the base station and the mobile station, so that the communication between the base station and the mobile station is relayed by the repeater, the WiMAX standards describe the following frame structure to mitigate interference and improve quality in the communication. That is to say, as shown in FIG. 9, the start (i.e. time points T0 and T2 in FIG. 9) of each frame transmitted/received in a path between an upstream end (i.e. the base station) and a downstream end (i.e. the mobile station) is determined so that timing of downlink (i.e. DL in FIG. 9) frames are aligned with each other, and timing of uplink (i.e. UL in FIG. 9) frames are aligned with each other. Such alignment of start timing of each frame is performed across a plurality of communication devices, and is called achievement of synchronization. Note that each frame consists of an UL sub-frame, a DL sub-frame, and a preamble attached before the DL sub-frame for the synchronization purpose, and is configured to be 5 msec long.

As a method for achieving synchronization, a technique is disclosed in Patent Literature 1. According to the technique disclosed in Patent Literature 1, each of the base station, the repeater, and the mobile station is equipped with a GPS (Global Positioning System), and operates in accordance with clock signals which are extremely accurate time information output from the GPS. Synchronization is achieved by adjusting the start of each of predetermined numbers of frames (i.e. 200 frames) so that each frame starts at a rising edge of the respective clock signals (1 clk/sec).

Further, Non-Patent Literature 1 describes the achievement of synchronization according to the WiMAX standards.

CITATION LIST

Patent Literature

[Patent Literature 1] Japanese patent application publication No. 2000-197108

Non-Patent Literature

[Non-Patent Literature 1] Shono Takashi. WiMAX Textbook. Impress R&D: Tokyo, Japan; 2008.

SUMMARY OF INVENTION

Technical Problem

The method disclosed in Patent Literature 1 mentioned above has a problem that equipping each base station and each repeater with a GPS is highly cost consuming.

In view of the problem, an objective of the present invention is to provide a repeater that is capable of achieving synchronization with a base station and a mobile station which conform to the WiMAX standards, without a need for equipment of a GPS.

The present invention also discloses a communication system using such a repeater, and a terminal device used in the communication system.

Solution to Problem

In order to achieve the above objective, one aspect of the present invention provides a repeater for relaying data communication between a base station and a mobile station, the repeater comprising: a donor unit operable to perform data communication with the base station; a remote unit operable to perform data communication with the mobile station, wherein the donor unit (i) receives a signal including a preamble from the base station, (ii) achieves synchronization with the base station in accordance with the received signal to determine start timing of each frame to be used in the data communication between the donor unit and the base station, and (iii) notifies the remote unit of timing serving as a reference for determination of start timing of each frame to be used in the data communication between the remote unit and the mobile station, and the remote unit transmits a frame including a preamble at the start timing determined with reference to the notified reference timing so that the preamble reception by the donor unit is synchronized with the preamble transmission from the remote unit to the mobile station.

Advantageous Effects of Invention

With the above structure, a repeater of the present invention is enabled to achieve synchronization with a base station without a need for a GPS. Further, the repeater of the present invention is enabled to achieve synchronization with a mobile station as follows without violating the WiMax standards. That is to say, the repeater transmits a signal including a preamble, and the preamble is received by the mobile station. Thus, between the base station and the mobile station, synchronization is achieved and communication is performed.

BRIEF DESCRIPTION OF DRAWINGS

FIGS. 15A to 15D are views showing neighbor lists held by some of devices shown in the system configuration diagram of FIG. 11 according to the second embodiment, FIG. 15A shows the neighbor list held by a base station 2103, FIG. 15B shows the neighbor list held by a repeater 2202, FIG. 15C shows the neighbor list held by a mobile station 2301, and FIG. 15D shows the neighbor list held by mobile stations 2302 and 2304.

FIGS. 26A to 26D are views showing the neighbor lists held by some of devices shown in the system configuration diagram of FIG. 22 according to the third embodiment, FIG. 26A shows the neighbor list held by a base station 3103, FIG. 26B shows the neighbor list held by a repeater 3202, FIG. 26C shows the neighbor list held by a base station 3107, and FIG. 26D shows the neighbor list held by a mobile station 3302.

FIGS. 32A to 32D are views showing the neighbor lists updated as a result of the repeater 3202 having performed a handover from the base station 3103 to the base station 3107 according to the third embodiment, FIG. 32A shows the updated neighbor list held by the base station 3103, FIG. 32B shows the updated neighbor list held by the repeater 3202, FIG. 32C shows the updated neighbor list held by the mobile station 3107, and FIG. 32D shows the neighbor list held by the mobile station 3302.

FIG. 38 is a conceptual diagram showing an example of a data structure of a BSID list 4441 according to the fourth embodiment.

FIG. 39 is a conceptual diagram showing an example of a data structure of a content broadcast table 4443 held by an ASN-GW server 4400 according to the fourth embodiment.

FIG. 44 shows the updated BSID list 4441 according to the fourth embodiment.

DESCRIPTION OF EMBODIMENTS

A description is given below of a repeater which is one embodiment of the present invention, with reference to the drawings.

First Embodiment

Figure 1:
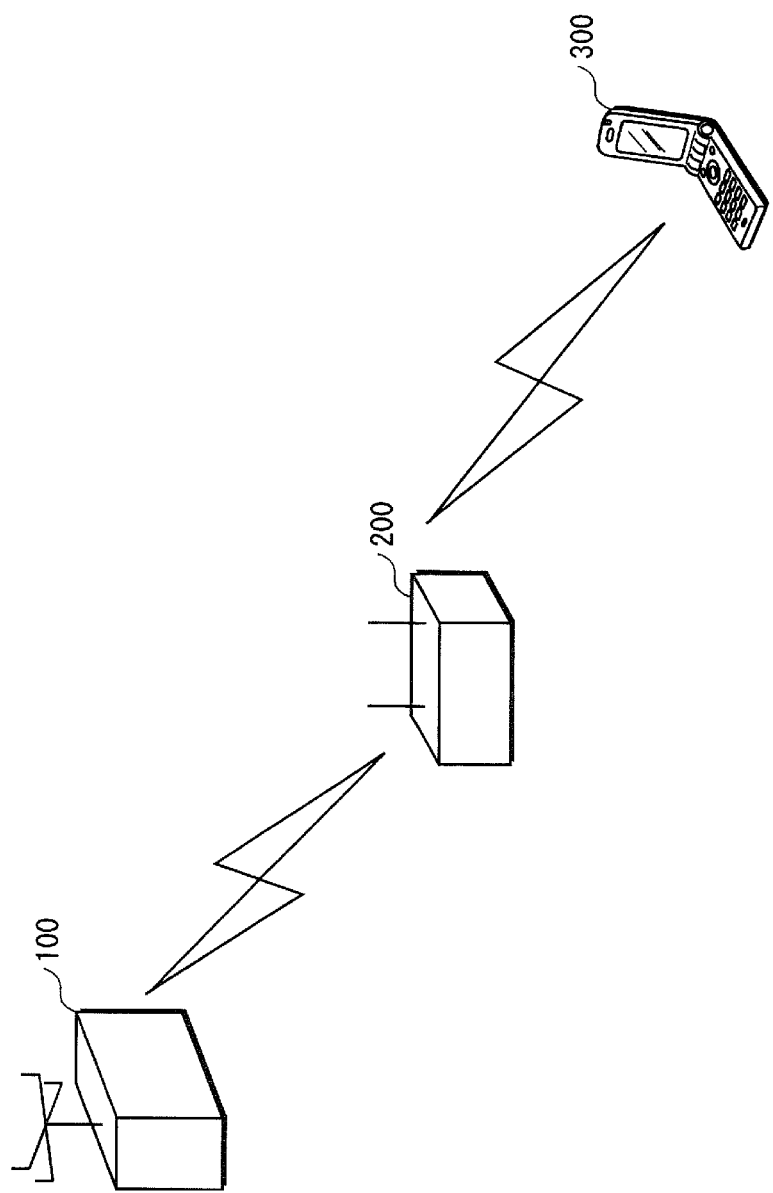
FIG. 1 is a configuration diagram of a communication system according to a first embodiment.

A description is given of the repeater according to a first embodiment, with reference to FIGS. 1 to 10.
<Structure>
FIG. 1 is a configuration diagram of a communication system including a repeater according to a first embodiment.

As can be seen from FIG. 1, the communication system includes a base station 100, a relay device (referred to below as the repeater) 200, and a mobile station 300. The communication system performs communication in accordance with the WiMAX (IEEE802.16) standards. Note that although the system diagram of FIG. 1 shows only one base station, one repeater, and one mobile station, the communication system actually includes more than one base stations, repeaters, and mobile stations.

The base station transmits a signal to the repeater, and the repeater receives the signal and relays the received signal to the mobile station. The mobile station transmits a signal to the repeater, and the repeater receives the signal and relays the received signal to the mobile station. This enables the mobile station to communicate with other mobile station(s).

It is indispensable to achieve synchronization between the base station and the repeater, and between the repeater and the mobile station, in order to perform the communication. The present embodiment describes a method for achieving such synchronization without using a GPS. In the present embodiment, the description is given in details of how such synchronization is achieved. A description of the communication is omitted, since it is assumed that the communication is performed in accordance with the WiMAX standards.

Figure 2:
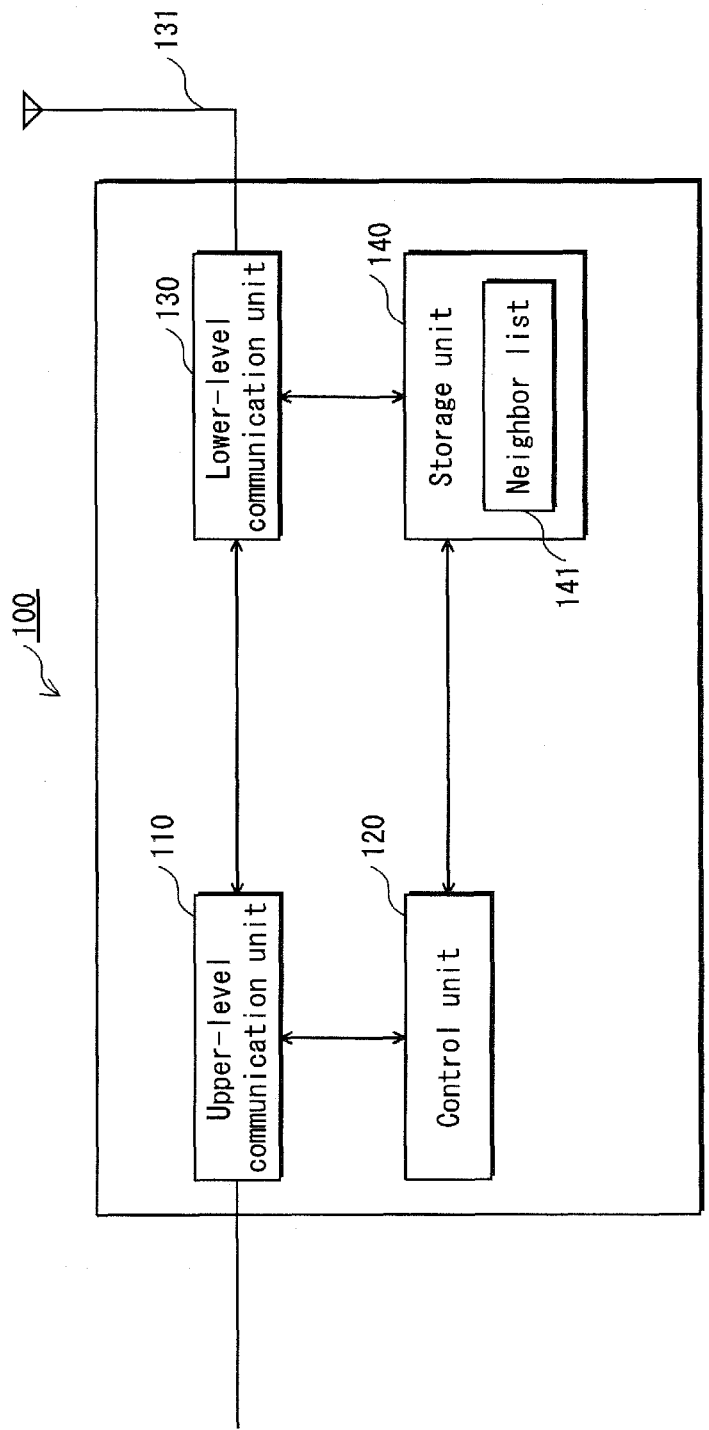
FIG. 2 is a function block diagram showing a functional structure of a base station according to the first embodiment.

FIG. 2 is a function block diagram showing a functional structure of the base station 100. As shown in FIG. 2, the base station 100 includes an upper-level communication unit 110, a control unit 120, a lower-level communication unit 130, and a storage unit 140.

The upper-level communication unit 110 is connected to a telephone network (not shown), and has a function of performing communication with other base station(s).

The control unit 120 has a function of controlling each unit included in the base station 100.

The lower-level communication unit 130 is connected to an antenna 131, and has a function of performing communication with the mobile station and the repeater. The lower-level communication unit 130 transmits, via the antenna 131, a frame containing a preamble, DL-MAP, and UL-MAP so as to achieve synchronization with the repeater and the mobile station. The DL-MAP includes information, such as a frequency, required for communication in a downlink direction.

The UL-MAP includes information, such as a frequency, required for communication in an uplink direction.

The storage unit 140 has a function of storing therein a program and data required for the base station 100 to perform operations, and stores therein a neighbor list 141. The neighbor list 141 is information referred to when the mobile station or the repeater with which the base station 100 has achieved synchronization performs a handover to another base station. The information in the neighbor list 141 indicates base stations and repeaters that are candidates for the handover target.

The description has been given of the base station 100 so far.

Next, a description is given of the repeater 200.

Figure 3:
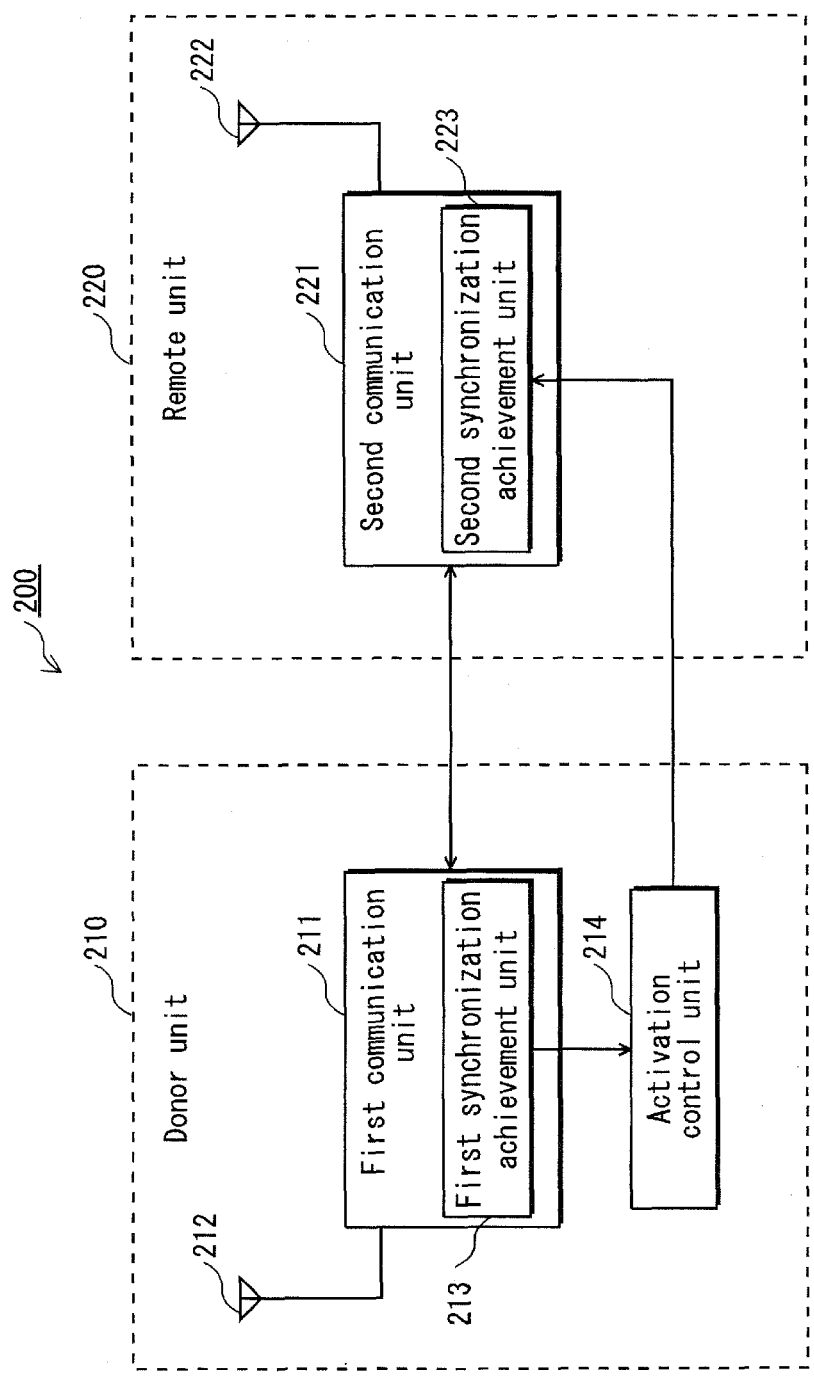
FIG. 3 is a function block diagram showing a functional structure of a repeater according to the first embodiment.

FIG. 3 is a function block diagram showing a functional structure of the repeater 200. As shown in FIG. 3, the repeater 200 includes a donor unit 210 and a remote unit 220. The donor unit 210 has a function of performing communication with the base station 100. The remote unit 220 has a function of performing communication with the mobile station 300. The donor unit 210 and the remote unit 220 operate in accordance with an identical clock signal. The identical clock signal herein refers to a common clock signal or a plurality of clock signals having the same frequency and the same phase.

The donor unit 210 includes a first communication unit 211 and an activation control unit 214.

The first communication unit 211 is connected to an antenna 212 and includes a first synchronization achievement unit 213. The first communication unit 211 has a function of performing communication with the base station via the antenna 212. The first communication unit 211 has a function of sending a signal received from the base station via the antenna 212 to the remote unit 220. The first communication unit 211 also has a function of sending a signal received from the remote unit 220 to the base station via the antenna 212.

The first synchronization achievement unit 213 holds a preamble reference signal. In the state where synchronization is not yet achieved with the base station, the first synchronization achievement unit 213 detects, from among signals received by the first communication unit, a signal matching the preamble reference signal to specify the preamble of the signal. Then, in accordance with the MAP information following the preamble (including a frequency bandwidth of the downlink, allocation of a downlink burst, a frequency bandwidth of the uplink, and allocation of an uplink burst), the first synchronization achievement unit 213 achieves synchronization with the base station.

After the first synchronization achievement unit 213 achieves synchronization with the base station, the activation control unit 214 converts time and intervals of preamble arrival from the base station into time and intervals measured in terms of an operation clock of the repeater 200. The activation control unit 214 then notifies a second synchronization achievement unit 223 described below of the converted time and intervals, and instructs transmission of a frame including the preamble required for synchronization. The preamble required for synchronization herein may be either the same or different from the specified preamble included in the signal matching the preamble reference signal, as far as synchronization is achieved using the preambles.

The remote unit 220 includes a second communication unit 211.

The second communication unit 221 is connected to an antenna 222 and includes the second synchronization achievement unit 223. The second communication unit 221 has a function of performing communication with the mobile station connected to the remote unit via the antenna 222. The second communication unit 221 has a function of sending a signal received from the first communication unit 211 to a specified mobile station via the antenna 222. The first communication unit 221 also has a function of sending a signal received via the antenna 222 to the first communication unit 211.

The second communication unit 221 generates the preamble and the MAP information for each frame. The second synchronization achievement unit 223 notifies the second communication unit 211 of timing for transmission so that the preamble transmission is synchronized with the time and the intervals notified by the activation control unit 214. The second communication unit 221 transmits a signal including the generated information at the timing notified by the second synchronization achievement unit 223. Upon receipt of the preamble and the MAP information by the mobile station, various processes of synchronization are started. The second synchronization achievement unit 223 negotiates with the mobile station to achieve synchronization with the mobile station, as needed.

The description has been given of the repeater 200 so far.

Figure 4:
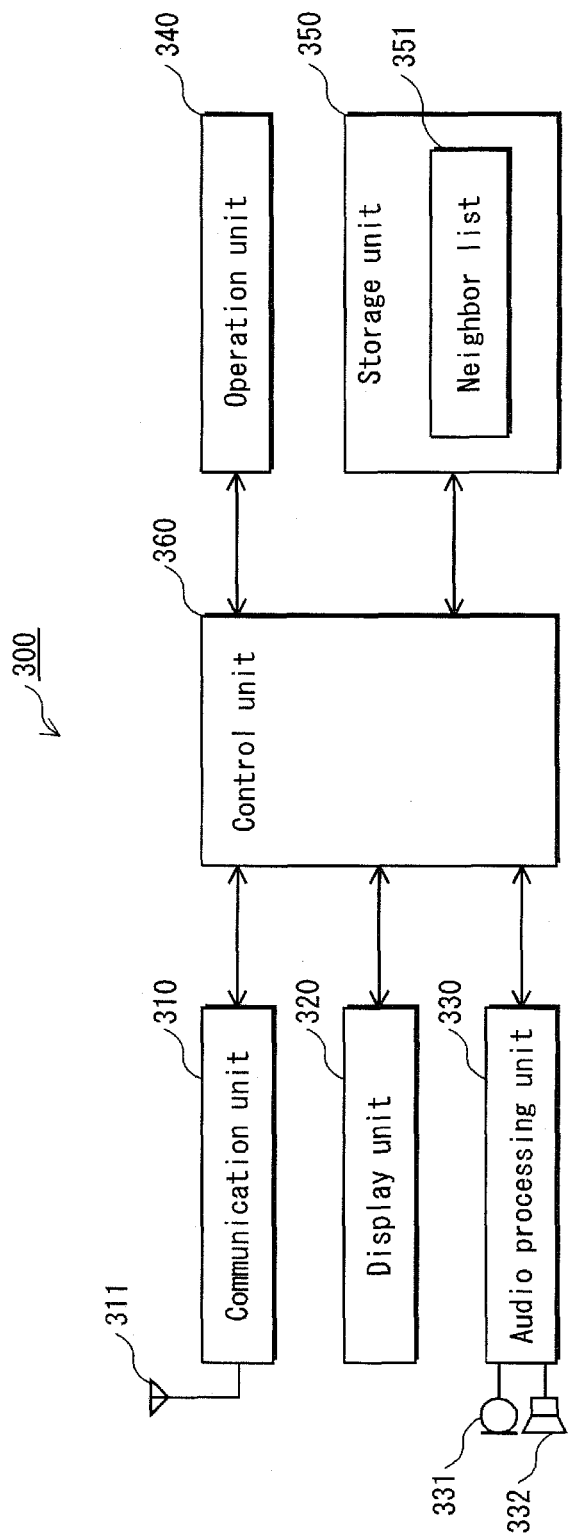
FIG. 4 is a function block diagram showing a functional structure of a mobile station according to the first embodiment.

Now, a description is given of the mobile station 300. FIG. 4 is a function block diagram showing a functional structure of the mobile station 300.

As shown in FIG. 4, the mobile station 300 includes a communication unit 310, a display unit 320, an audio processing unit 330, an operating unit 340, a storage unit 350, and a control unit 360.

The communication unit 310 has a function of receiving a signal via an antenna 311, demodulating the received signal to a telephone voice signal and a data signal, and outputting the telephone voice signal and the data signal acquired by the demodulation to the control unit 360. The communication unit 310 also has a function of modulating a transmission data signal, and outputting the data signal acquired by the modulation via the antenna 311 used for the communication. The transmission data signal includes a telephone voice signal which has been A/D converted by the audio processing unit 330, and an email signal which has been sent from the control unit 360. The communication unit 310 also has a function of receiving a signal from the base station or the repeater and achieving synchronization with the base station or the repeater.

The display unit 320 includes a display realized by an LCD (Liquid Crystal Display) or the like. The display unit 320 has a function of displaying an image on the display in response to an instruction of the control unit 360.

The audio processing unit 330 includes the following two functions. One is to D/A convert the received audio signal acquired from the communication unit 310 and output the converted audio signal to a speaker 332. The other is to A/D convert the transmission audio signal acquired from a microphone 331 and output the converted audio signal to the control unit 360.

The operating unit 340 includes a ten-key pad, an on hook key, an off hook key, a direction key, a determination key, a mail key, a side key, and others. The operating unit 340 has a function of receiving a user operation and outputting the received user operation to the control unit 360.

The storage unit 350 includes a ROM (Read Only Memory) and a RAM (Random Access Memory), and can be realized by, for example, a small size hard disk or a nonvolatile memory. The storage unit 350 has a function of storing therein various data and programs required for the mobile station 300 to perform operations. The various data includes music data and image data. The storage unit 350 stores therein a neighbor list received from the base station or the repeater with which the mobile station has achieved synchronization. The neighbor list is referred to by the communication unit 310 when the mobile station 300 performs a handover.

The control unit 360 is realized by, for example, a CPU (Central Processing Unit), and has a function of controlling each unit included in the mobile station 300.

The description has been given of the mobile station 300 so far.

<Data>

From now, a description is given of various data required for synchronization.

Figure 5:
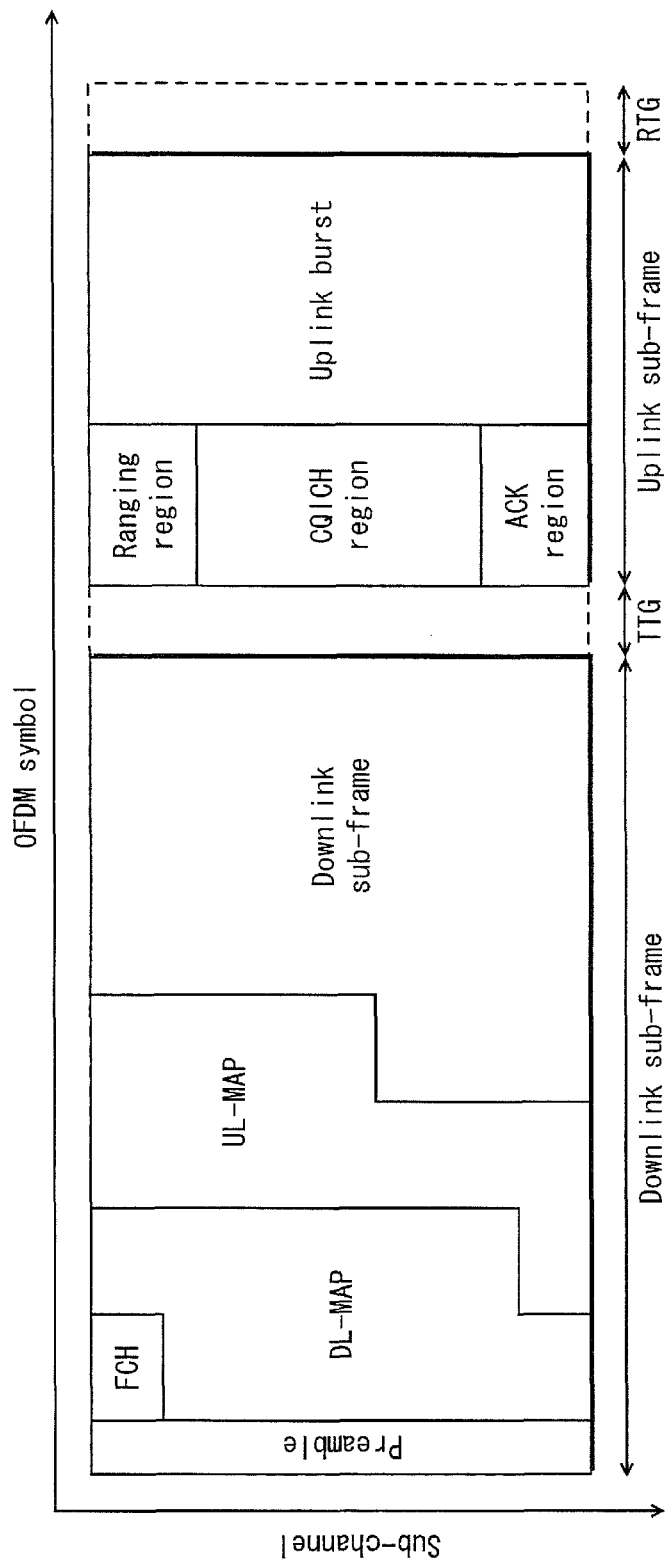
FIG. 5 is a conceptual diagram showing an example of a frame structure of a signal exchanged between the mobile station and the repeater according to the first embodiment.

FIG. 5 is a conceptual diagram showing an example of a frame structure of a signal exchanged between the mobile station and the repeater. According to the WiMAX standards, one frame has a duration of 5 msec.

As shown in FIG. 5, one frame is configured to have downlink and uplink sub-frames. A guard interval period is placed between the downlink and uplink sub-frames, and is called a TTG (Transmit Transition Gap). After the completion of an uplink sub-frame, another guard interval period is placed between this sub-frame and the next downlink sub-frame. This guard interval period is called an RTG (Receive Transition Gap). The guard interval periods are placed for the purpose of switching between transmission and reception. The communication between the base station and the repeater, and between the repeater and the mobile station is performed on a frame-by-frame basis (i.e. with use of successive frames).

The downlink sub-frame includes a preamble, an FCH (Frame Control Header), the DL-MAP (Down Link-MAP), the UL-MAP (Up Link-MAP), and the downlink burst.

The preamble is a signal used for synchronization achievement. With use of the preamble, a downstream device (i.e. the repeater or the mobile station with respect to the base station, or the mobile station with respect to the repeater) acknowledges the start of a frame.

The FCH is data indicating a data structure of the subsequent DL-MAP.

The DL-MAP is data required for the repeater or the mobile station to achieve synchronization in the downstream direction.

The UL-MAP is data required for the repeater or the mobile station to achieve synchronization in the upstream direction.

The downlink burst is actual data transmitted from the base station to the repeater or the mobile station. The actual data herein includes data representing telephone voice and data broadcast using the MCBCS. The actual data may also be extended communication control information which is not included in the UL-MAP and the DL-MAP.

The TTG is the guard interval period placed for switching a communication direction of data from the downlink to the uplink in the base station, the repeater, and the mobile station.

The uplink sub-frame includes a ranging region, a CQICH (Channel Quality Information Channel) region, an ACK (Acknowledgement) region, and the uplink burst.

The ranging region is used for transmission of a signal for making a bandwidth request and performing a ranging operation. The bandwidth request refers to processing performed by the mobile station to request for a channel to be allocated for data transmission to the base station. The ranging is processing performed between the base station and the repeater, or between the base station and the mobile station, for time and frequency synchronization purposes.

The CQICH region is used by a receiving device to provide a transmitting device with feedback of channel quality information.

The ACK region is used as an ACKCH (ACK Channel) for feedback of ACK/NAK in response to a hybrid automatic re-transmission request.

The uplink burst is actual data transmitted from the mobile station to the repeater or the base station.

The RTG is the guard interval period placed for switching the communication direction of data from the uplink to the downlink in the base station, the repeater, and the mobile station.

The description has been given of the frame on the above.

<Operations>

A description is now given of operations for the achieving synchronization in the first embodiment.

Figure 6:
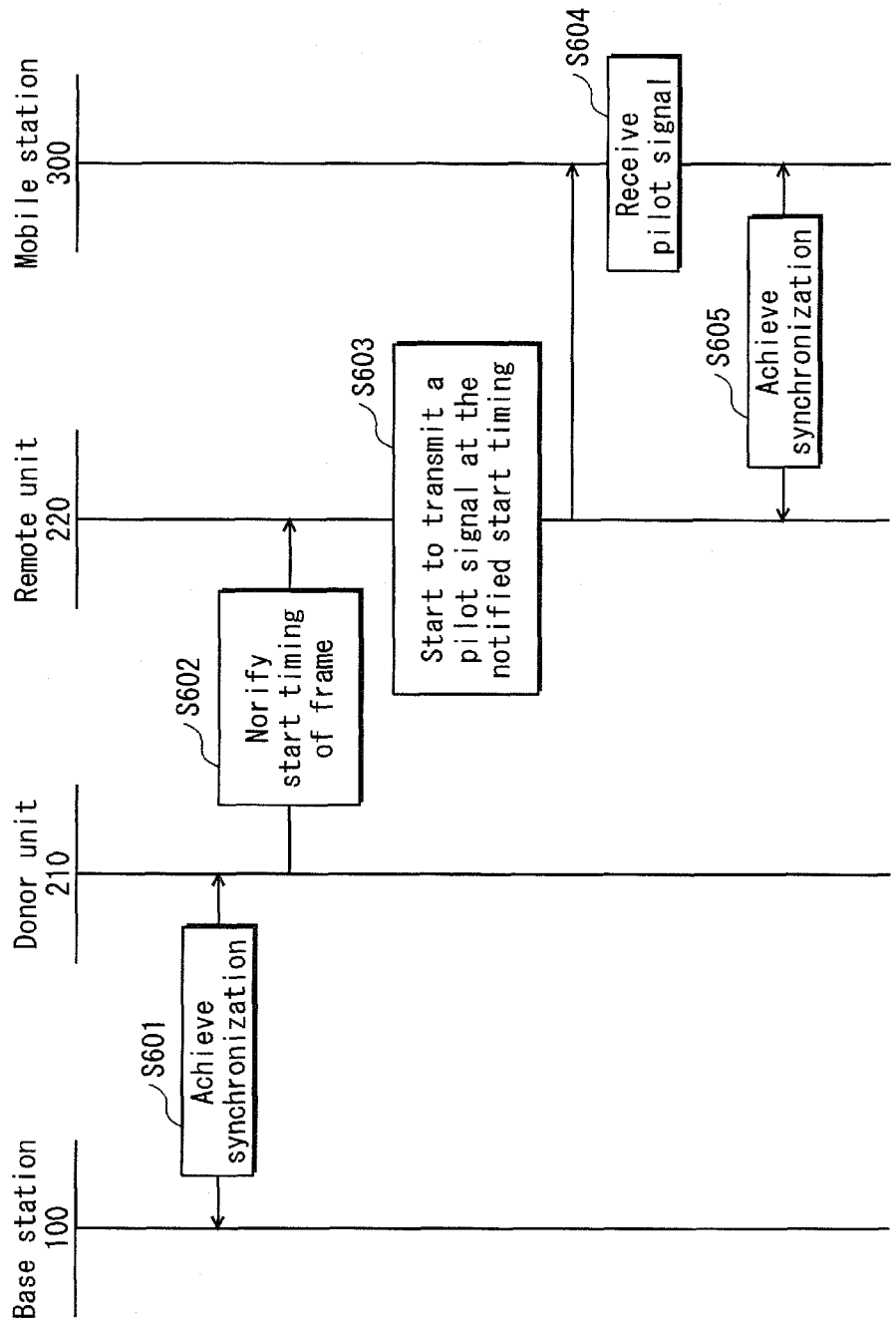
FIG. 6 is a flowchart showing operations of the repeater at the time of achievement of synchronization according to the first embodiment.

To begin with, with reference to FIG. 6, a series of operations for the synchronization achievement are described.

Firstly, the base station 100 transmits a signal including a preamble signal, the DL-MAP, and the UL-MAP, on a frame-by-frame basis. In response to the preamble signal, the donor unit 210 of the repeater operates to achieve synchronization with the base station.

Synchronization is achieved between the donor unit 210 and the base station 100 (step S601). The donor unit 210 then notifies the remote unit 220 of the reception timing, that is to say, time at which the donor unit 210 is expected to receive the preamble from the base station 100 as the start timing of a frame containing the preamble (step S602).

Upon notification of the timing of each frame by the donor unit 210, the remote unit 220 transmits a signal including the preamble signal, the DL-MAP, and the UL-MAP on a frame basis at the notified timing (step S603).

The mobile station 300 receives the preamble signal transmitted from the remote unit (step S604), and achieves synchronization with the remote unit 220 (step S605).

With synchronization achieved between the base station and the repeater, and between the repeater and the mobile station, the mobile station is enabled to perform communication with the other mobile station(s) via the repeater and the base station.

Figure 7:
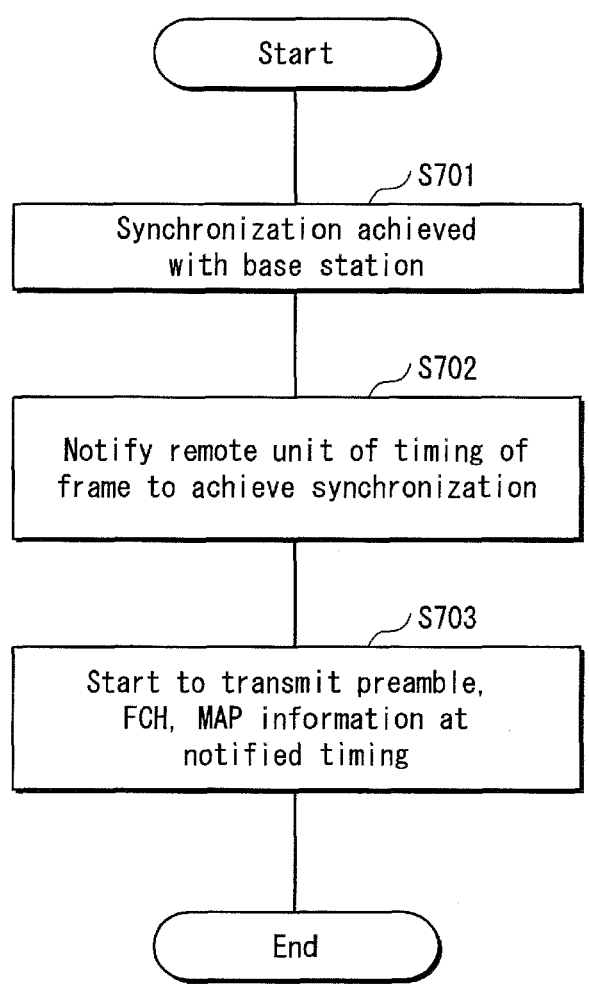
FIG. 7 is a flowchart showing a sequence in which synchronization is achieved between a remote unit of the repeater and the mobile station according to the first embodiment.
Figure 8:
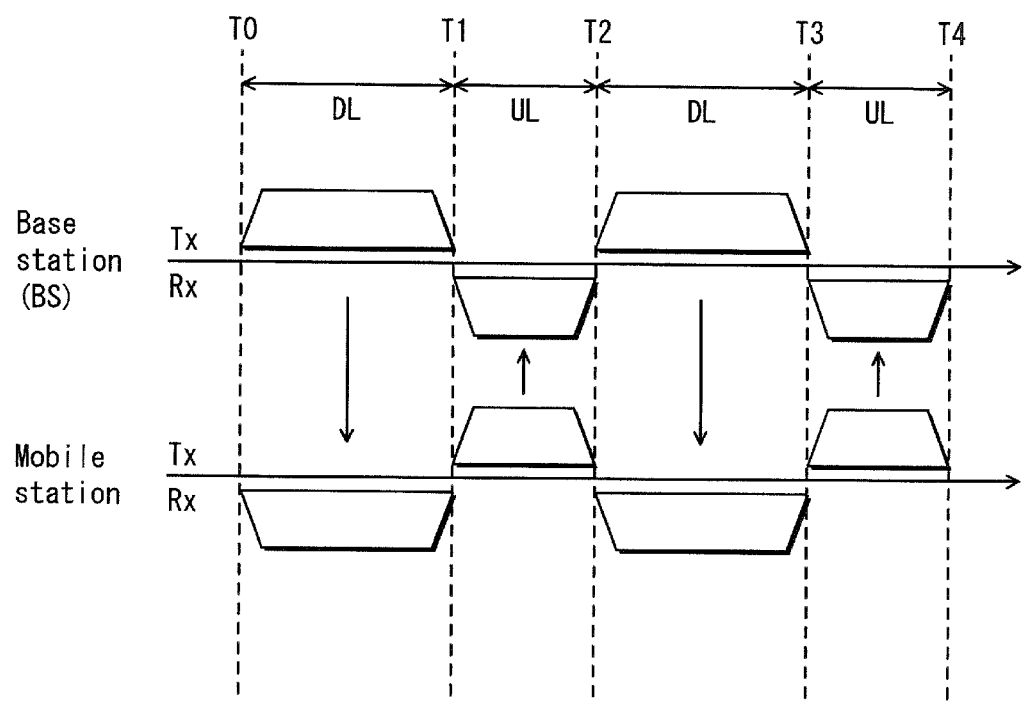
FIG. 8 is a view showing communication between the base station and the mobile station according to the first embodiment.

Next, with reference to FIG. 7, a description is given of operations for achieving the synchronization performed in the repeater.

The first communication unit 211 of the donor unit 210 receives the signal from the base station after scanning a plurality of frequency bands. The first synchronization achievement unit 213 specifies the preamble of the signal received from the base station, by comparing the received signal with the reference signal held therein. Since the duration of one frame is fixed to 5 msec, the start time of the next frame can be specified. By thus acknowledging the start timing of the successive frames, the first synchronization achievement unit 213 achieves synchronization (step S701). After the synchronization achievement, the first synchronization achievement unit 213 specifies structures of the downlink and uplink bursts based on the DL-MAP and the UL-MAP, and subsequently, performs various network entry procedures while negotiating with the base station. As for the network entry procedures, the details are disclosed in the above-mentioned Patent Literature 1, for example.

The activation control unit 214 of the donor unit 210 detects the time and the intervals at which the first synchronization achievement unit 213 achieves synchronization with the base station and receives the preamble from the base station, in terms of the operation clock of repeater 200. The activation control unit 214 sends the detected time and intervals to the remote unit (step S702). Specifically, the activation control unit 214 outputs a pulse signal generated by masking the operation clock of the repeater 200 except for the time of preamble reception.

The remote unit 220 operates in response to the clock signal supplied from a clock signal generator which is used in common by the donor unit 210 or identical to the donor unit 210. The remote unit 220 transmits the preamble at the time and the intervals notified by the activation control unit 214 in terms of the clock (step S703). By this means, the remote unit 220 is enabled to transmit a frame including the preamble so that the preamble is received by the mobile station 300 simultaneously with the reception of the preamble transmitted from the base station 100 to the donor unit 210. Specifically, the remote unit 220 outputs the preamble at such timing that the pulse signal output from the activation control unit 214 is synchronized with the operation clock of the donor unit 210.

Figure 9:
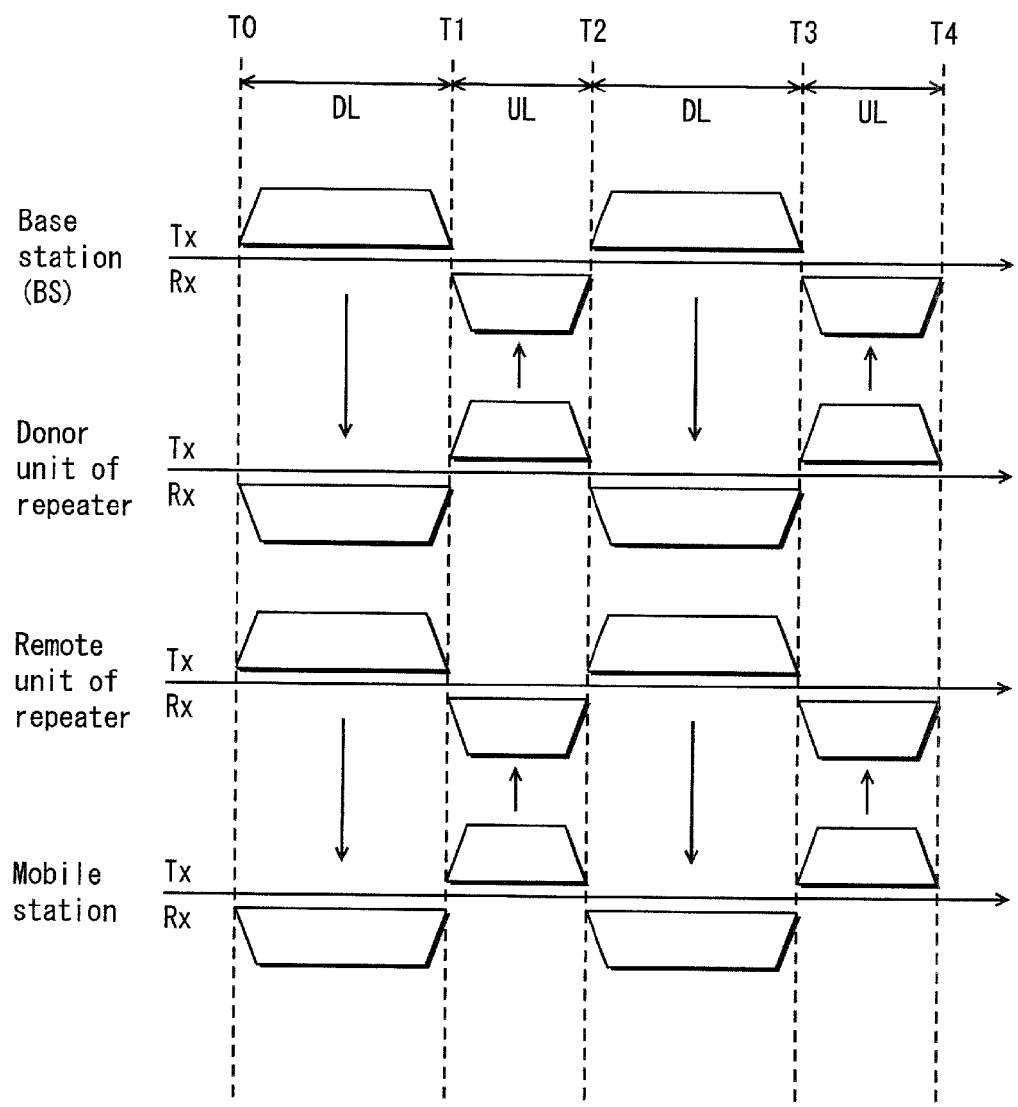
FIG. 9 is a view showing communication between the base station, the repeater, and the mobile station according to the first embodiment.

The above structure allows the base station and the repeater, and the repeater and the mobile station to perform communication with use of the uniform frame timing, as shown in FIG. 9. Meanwhile, regarding the signal transmitted from the base station to the mobile station, a description is given of a signal transmitted from the base station to the remote unit of the repeater during time period T0-T1. The transmitted signal is re-transmitted in any one of the subsequent downlink frames (e.g. during time period T2-T3) from the repeater to the mobile station. Similarly, regarding the signal transmitted from the mobile station to the base station, a signal transmitted during time period T1-T2 is re-transmitted in any one of the subsequent uplink frames (e.g. during time period T3-T4) from the donor unit of the repeater to the base station.

As has been described on the above, in the present embodiment, synchronization is achieved between the base station and the repeater, and between the repeater and the mobile station to perform communication conforming to the WiMax standards, without the need for equipment of a GPS. Thanks to the absence of the GPS, circuit sizes and production costs are reduced.

Modifications of First Embodiment

Now, a description is given of various modifications of the above first embodiment.

Figure 10:
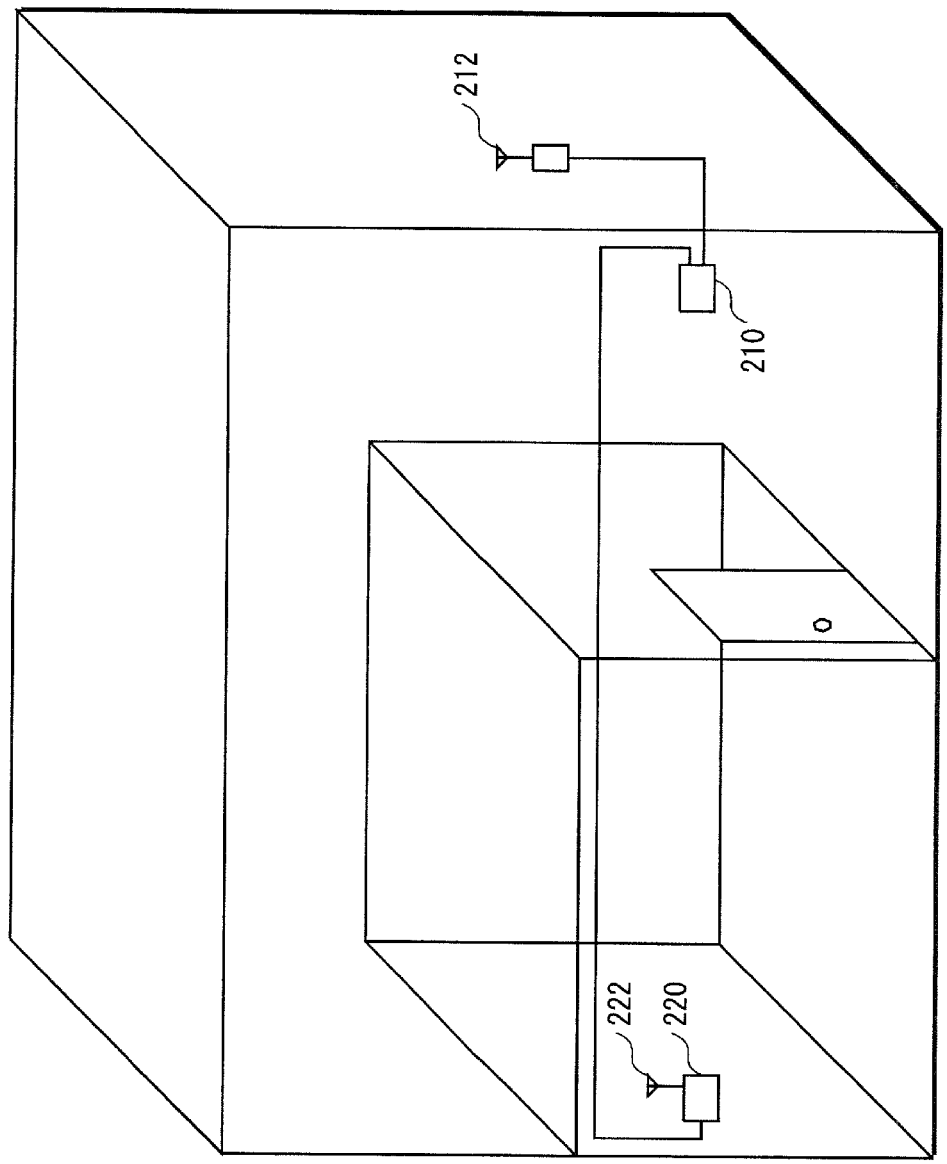
FIG. 10 shows an example of layout in the case where a donor unit and the remote unit of the repeater are located over a distance according to the first embodiment.

(1) In the above first embodiment, the repeater includes the donor unit 210 and the remote unit 220 that are disposed in one housing in an integrated manner. However, it is not necessary to dispose the donor unit 210 of the repeater and the remote unit 220 in the common housing. For example, as shown in FIG. 10, the donor unit 210 may be located separately from the remote unit 220. FIG. 10 shows an example of layout in the case where the repeater is located inside a building. According to FIG. 10, locating the donor unit 210 close to outside of the building facilitates the communication with the base station. Further, locating the remote unit 220 inside the building facilitates the communication with the mobile station located inside the building. Moreover, locating the donor unit 210 separately from the remote unit 220 prevents signals transmitted/received from/by the donor unit 210 and signals transmitted/received from/by the remote unit 220 from causing interference to each other as much as possible.

The communication between the donor unit 210 and the remote unit 220 is performed in accordance with the IEEE802.3 standards, for example. It is preferable that the communication is performed without a communication delay. However, in the case where the communication delay occurs in the communication between the donor unit 210 and the remote unit 220, it is necessary to perform control in consideration of the delay time. In particular, at the time of the synchronization achievement where the donor unit 210 achieves synchronization with the base station and then the time and the intervals of preamble transmission is notified, the remote unit 220 has to transmit the preamble after deducting the delay time from the notified time and intervals.

(2) In the above first embodiment, the description is given of synchronization achieved between the mobile station and the base station, and a description is omitted for synchronization between the repeater and the mobile station due to similarity. Regarding a location registration, however, it should be noted that the mobile station makes the location registration not in the repeater, but in the base station with which the repeater is in communication, in an attempt to achieve synchronization with the repeater.

(3) Although in the above first embodiment only one repeater is interposed between the base station and the mobile station, a plurality of repeaters may be interposed.

(4) In the above first embodiment, the first synchronization achievement unit 211 or the communication unit 310 holds therein in advance the reference signal used for specifying the preamble, and detects a signal matching the reference signal to specify the preamble. However, the preamble may be specified by the following method without using the reference signal.

That is to say, the preamble is created by putting ten consecutive symbols together, each containing the same content data. A data receiving device compares a received signal with a signal created by delaying the received signal by a difference of one symbol. By doing so, it is detected that a large part of the signal overlaps with nine consecutive symbols of the preamble. The overlapping 9 consecutive symbols and the previous symbol are specified as the preamble. This method may also be used to specify the preamble.

(5) It is possible to create a control program consisting of a program code for causing a processor of the repeater or the like and various circuits connected to the processor to perform synchronization operations described in the first embodiment, notification processing of the time and the intervals of preamble transmission in the repeater, and others. Such a control program may be recorded on a recording medium, or circulated and distributed via various communication networks. Such a storage medium includes an IC card, a hard disk, an optical disk, a flexible disk, and a ROM. The circulated and distributed control program becomes available as it is contained in a memory and the like which can be read by a processor. The control program is then executed by the processor, so that the various functions as described in the embodiments are realized.

Second Embodiment

To above first embodiment discloses the repeater that is capable of achieving synchronization without the GPS. However, using such a repeater might bring about problems. The objective of the second embodiment is to solve such problems.

To describe an aspect of the present invention according to the second embodiment, the above problems are first illustrated.

Figure 18:
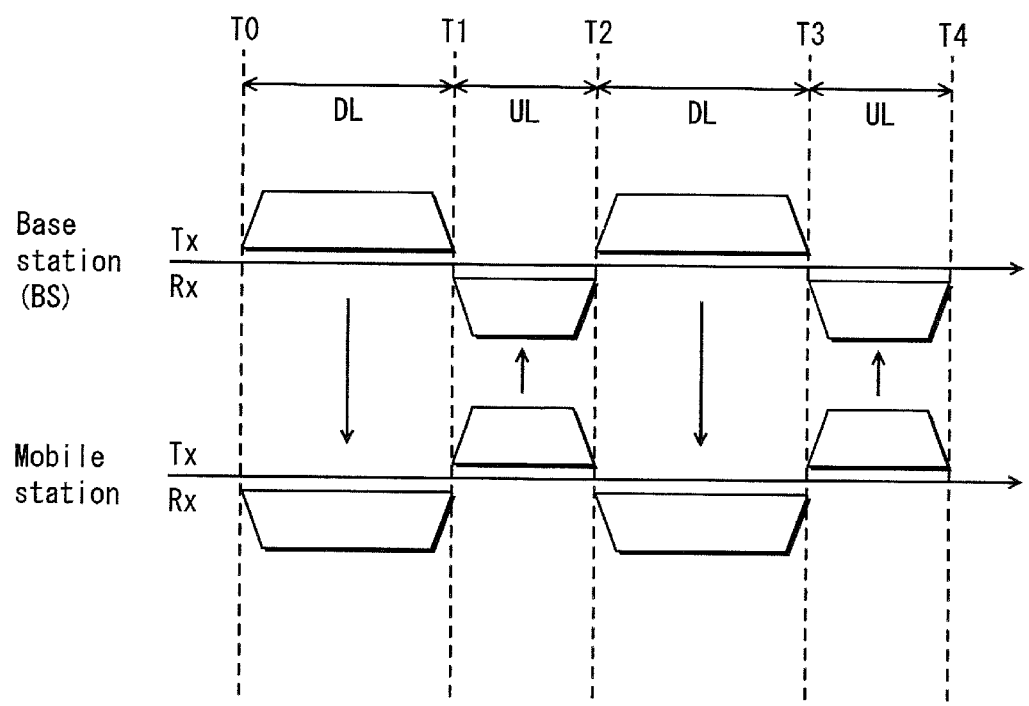
FIG. 18 is a view showing communication between the base station and the mobile station according to the second embodiment.
Figure 19:
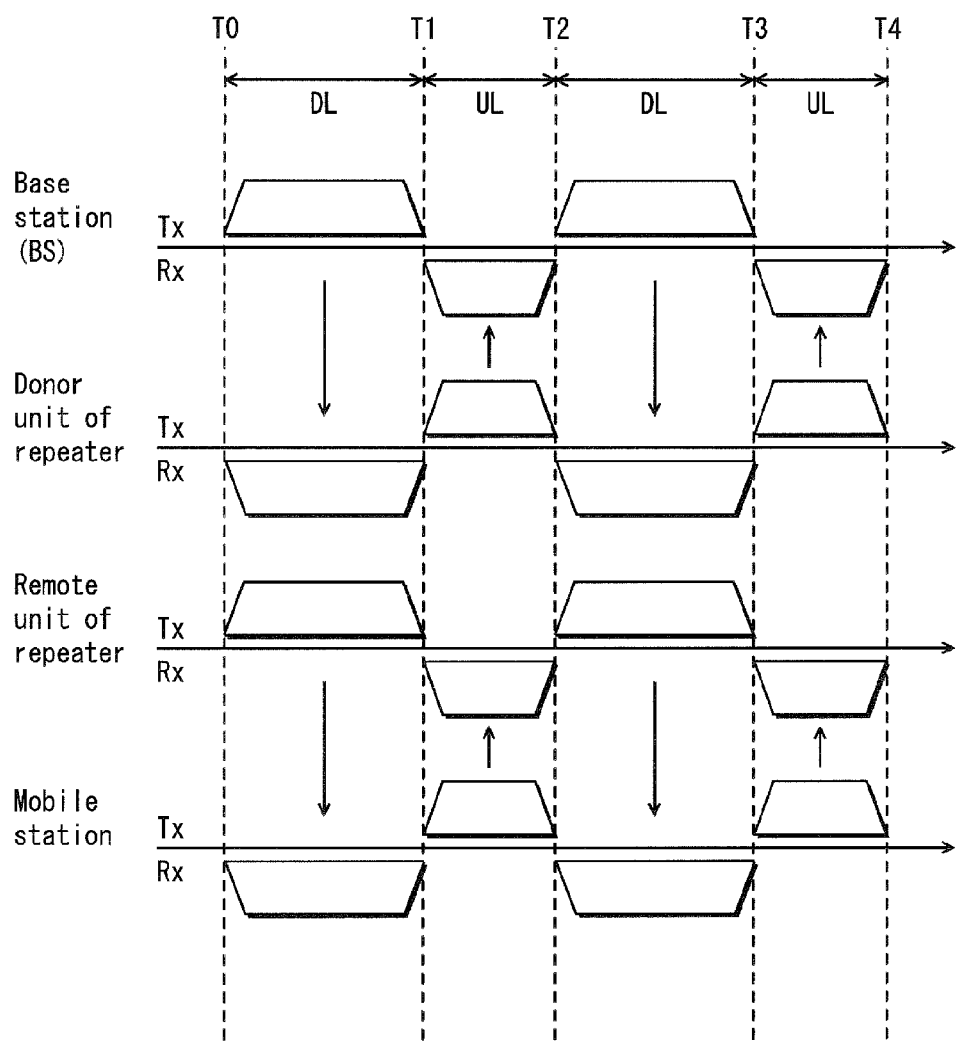
FIG. 19 is a view showing communication in the case where the communication between the base station and the mobile station is relayed by the repeater according to the second embodiment.

According to the WiMAX (IEEE802.16) standards, data transmission and reception between the base station and the mobile station is performed at time and intervals as shown in FIG. 18. In FIG. 18, Tx indicates the transmission phase, and Rx indicates the reception phase. FIG. 19 shows a communication configuration in which the repeater, namely the relay device, is interposed between the base station and the mobile station shown in FIG. 18.

As shown in FIG. 19, in a path from the base station to the mobile station, any data transmission from the base station towards the mobile station is synchronized, and any data transmission from the mobile station towards the base station is synchronized. In other words, data is transmitted from the base station to the repeater simultaneously with data transmission from the repeater to the mobile station. Also, data is transmitted from the mobile station to the repeater simultaneously with data transmission from the repeater to the base station. Note that data transmitted from the base station to the repeater is not the same as data transmitted from the repeater to the mobile station at the same time. Similarly, data transmitted from the mobile station to the repeater is not the same as data transmitted from the repeater to the base station at the same time.

Thus, uplink communication is performed at the same time across all the devices, and the downlink communication is performed at the same time across all the devices. This prevents the uplink and downlink communication from causing interference to each other.

However, a problem in the above FIG. 19 is that signals transmitted during time periods T0-T1 and T2-T3 from the remote unit of the repeater might be diffracted, thereby causing interference to the donor unit of the repeater. Another problem is that signals transmitted during time periods T1-T2 and T3-T4 from the donor unit of the repeater might be diffracted, thereby causing interference to the remote unit of the repeater.

Figure 20:
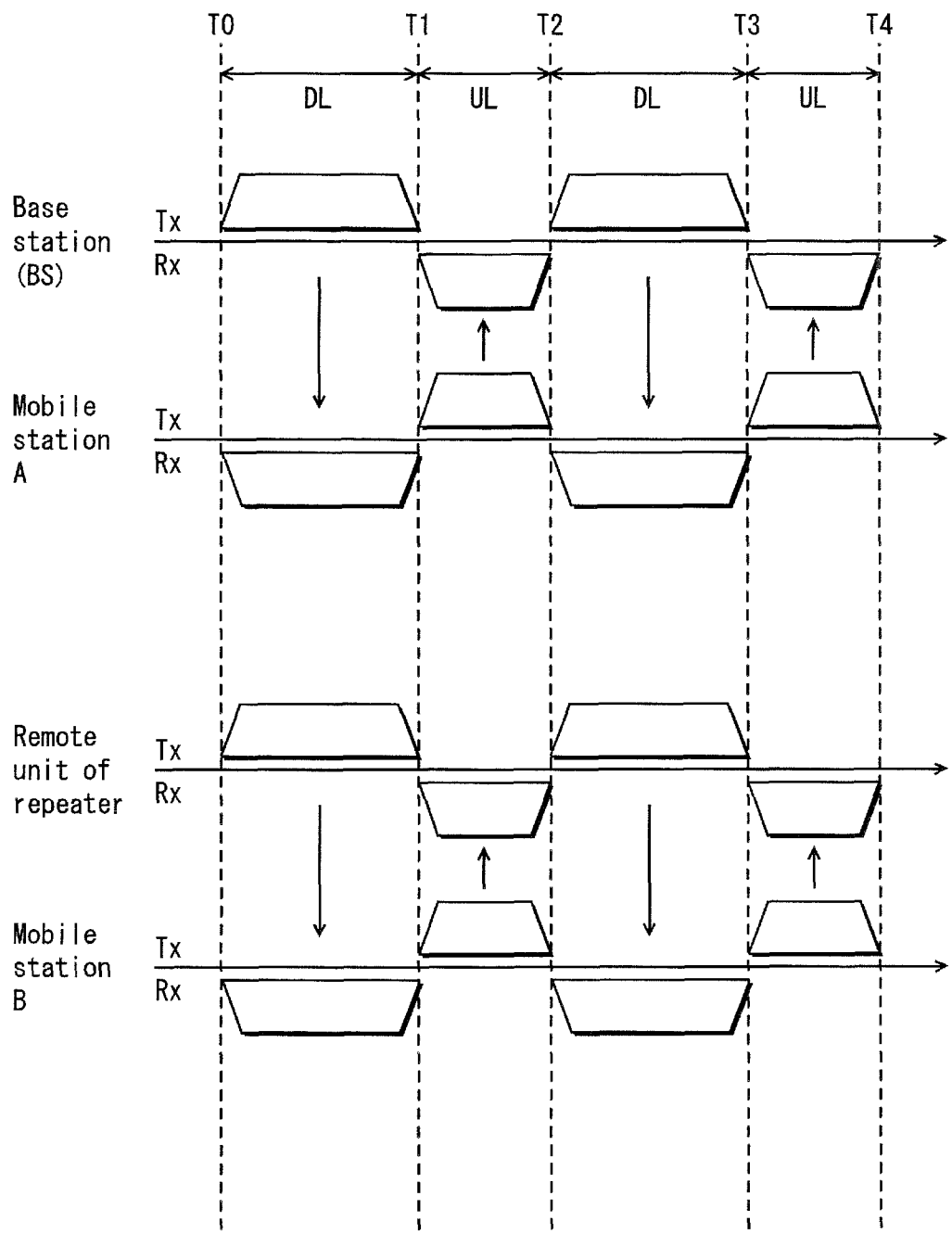
FIG. 20 is a view illustrating interference that can occur in the communication between the base station and the mobile station, and in the repeater and the mobile station according to the second embodiment.

Yet another problem relates to the case where, in addition to the mobile station A, another mobile station B, which is in communication not with the repeater but with the base station, is present in vicinity of the repeater. In this case, as shown in FIG. 20, a signal transmitted from the repeater to the mobile station B and a signal transmitted from the base station to the mobile station A might cause interference to each other.

Figure 21:
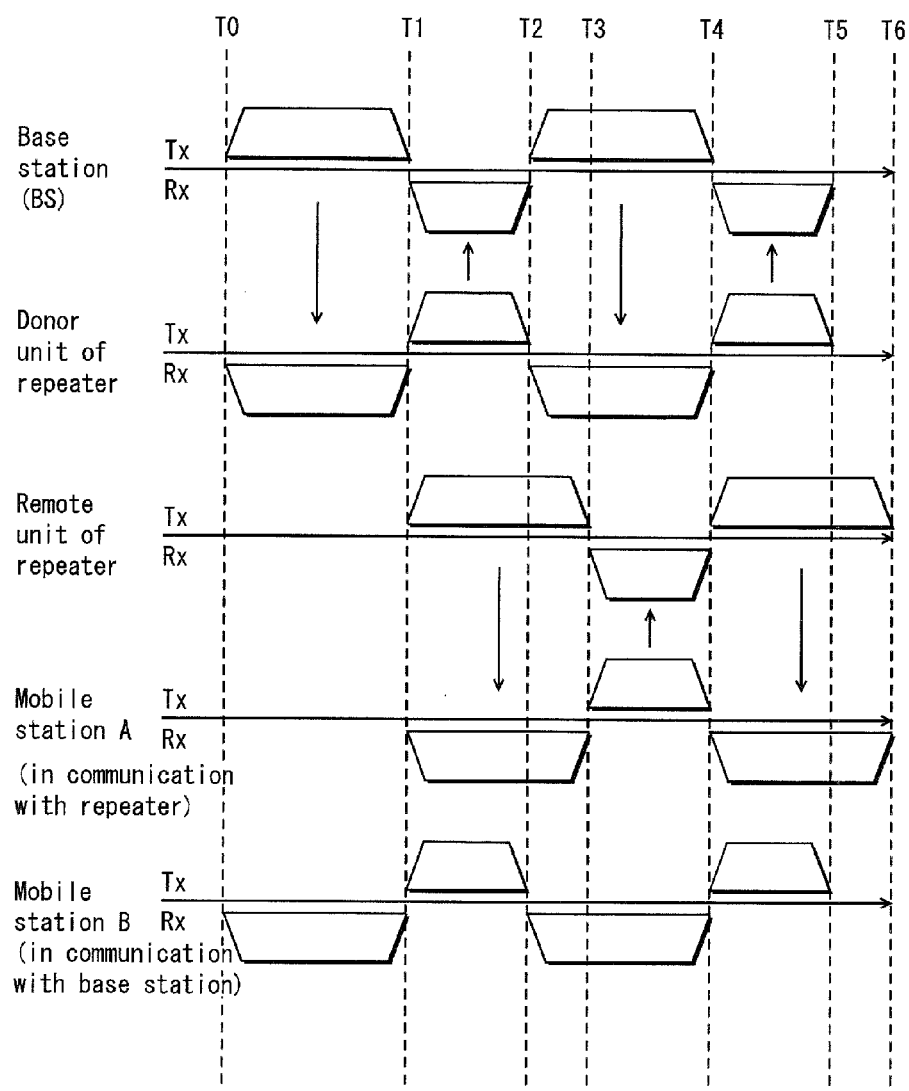
FIG. 21 is a view illustrating interference that can occur in the case where control is performed to insert a delay for each frame, providing that the interference according to the second embodiment does not originally occur.

In order to prevent such interference, it is possible to control the time and the intervals of data transmission and reception, although such control is not allowed in the WiMax standards. Specifically, the control is to offset the start of each frame in communication between the base station and the repeater, relative to communication between the repeater and the mobile station. FIG. 21 shows the data transmission and reception in which the time interval control is performed. Attention is first paid to the donor and the remote units of the repeater. As can be seen from FIG. 21, although interference occurs during the time period T2-T3, interference does not occur during the time periods T1-T2 and T3-T4.

However, this method has a problem that interference might occur between the mobile stations. With the time and the intervals being offset as shown in FIG. 21, if the mobile station B which is in communication with the base station moves towards the mobile station A, interference occurs between the mobile stations during the time periods T1-T2 and T3-T4. Moreover, the above method is not allowed in the WiMax standards, and has a problem regarding lack of versatility.

The repeater and the mobile station according to the second embodiment have been conceived in order to solve the above problems. In the second embodiment, the repeater and the mobile station are provided both of which are capable of minimizing disturbance to communication even when the above-described interference occurs, while also conforming to the WiMax standards.

<Structure>

A description is given of a communication system according to the second embodiment that aims to solve the above problems, with reference to FIGS. 11 to 21.

Figure 11:
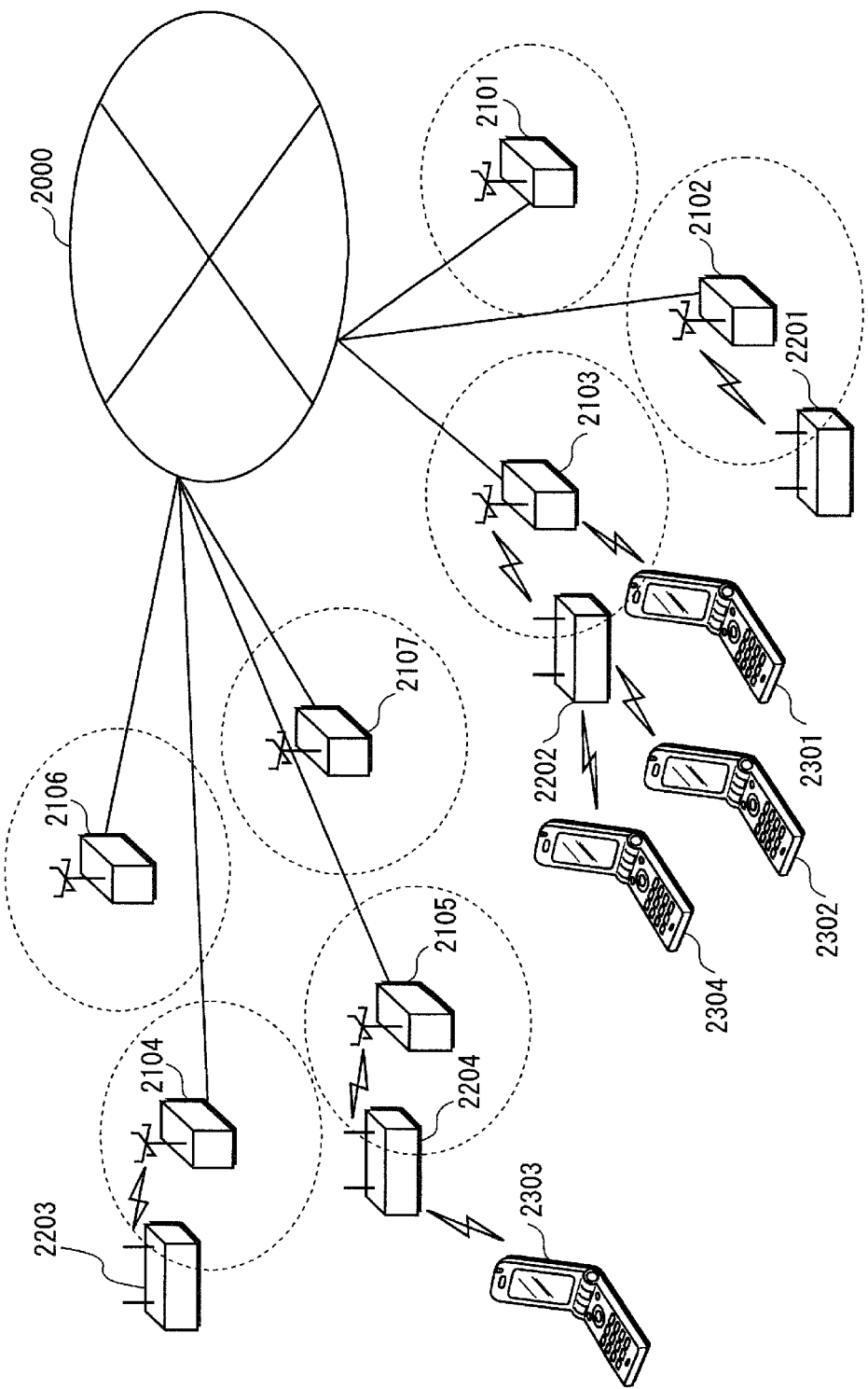
FIG. 11 is a configuration diagram of the communication system according to a second embodiment.

FIG. 11 is a system diagram showing a system structure of the communication system.

The communication system includes base stations 2101 to 2107, repeaters 2201 to 2204, and mobile stations 2301 to 2304. Note that FIG. 11 only shows an example of the numbers of the base stations, the repeaters, and the mobile station. In fact, the communication system may include thousands or several tens of thousands of base stations, repeaters, and mobile stations.

The base stations 2101 to 2107 are connected with each other via a network 2000.

The repeater 2201 has achieved synchronization and is in communication with the base station 2102. The repeater 2202 has achieved synchronization and is in communication with the base station 2103. The repeater 2203 has achieved synchronization and is in communication with the base station 2104. The repeater 2204 has achieved synchronization and is in communication with the base station 2105.

The mobile station 2301 has achieved synchronization and is in communication with the base station 2103. The mobile station 2302 has achieved synchronization and is in communication with the repeater 2202. The mobile station 2303 has achieved synchronization and is in communication with the repeater 2204. The mobile station 2304 has achieved synchronization and is in communication with the repeater 2202.

It should be noted that in the description below the base station, the repeater, and the mobile station may be referred to as a BS (Base Station), an RS (Relay Station), and a MS (Mobile Station), respectively. Further, it is assumed that the base station, the repeater, and the mobile station each have a fundamental structure conventionally known, and the description of the present embodiment focuses on characteristic features of the invention.

Figure 12:
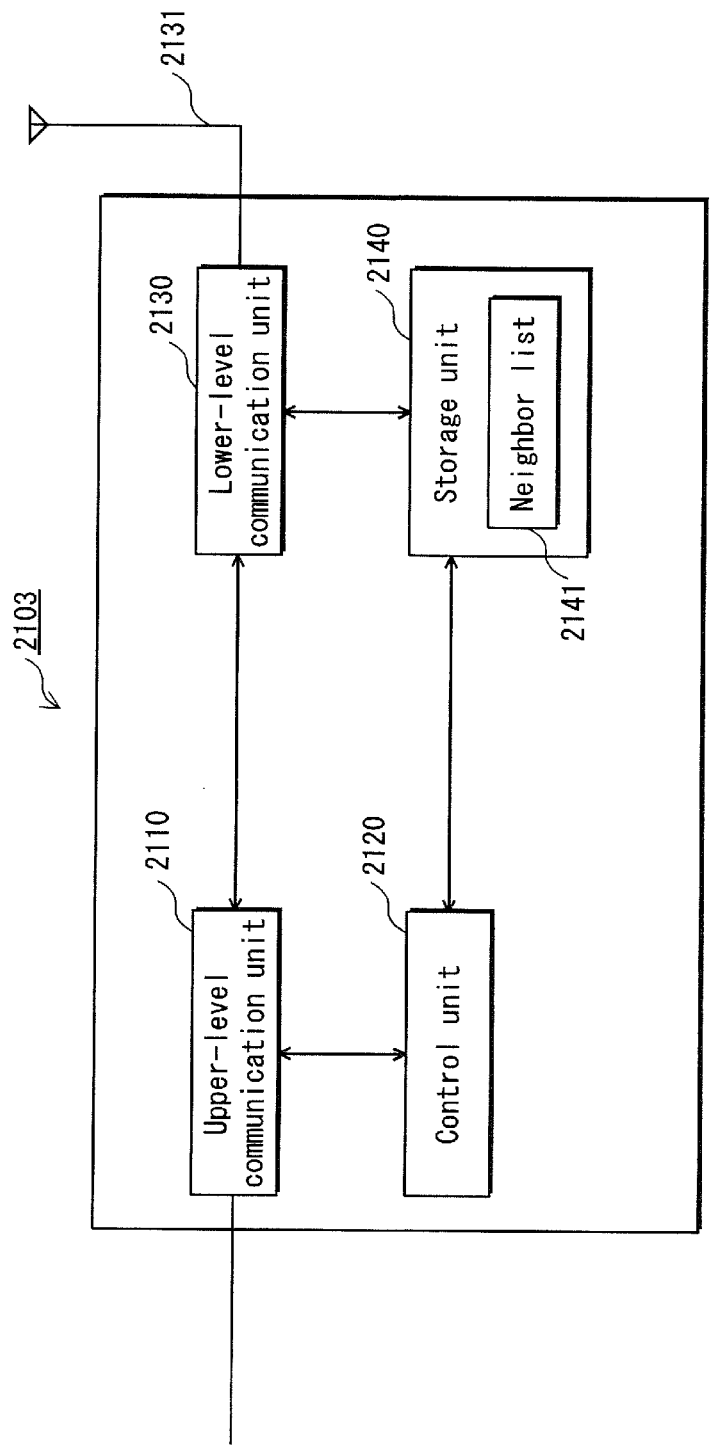
FIG. 12 is a function block diagram showing a functional structure of the base station according to the second embodiment.

FIG. 12 is a function block diagram showing a functional structure of the base station. Each base station has a similar functional structure, and the description herein takes the base station 2103 as an example. As shown in FIG. 12, the base station 2103 includes an upper communication unit 2110, a control unit 2120, a lower-level communication unit 2130, and a storage unit 2140.

The upper-level communication unit 2110 is connected to the network 2000 (not shown), and has a function of performing communication with other base station(s). The upper-level communication unit 2110 also has the following two functions. One is to receive, from another base station, a signal addressed to any one of the mobile stations whose information is registered in the own base station, and send the received signal to the lower-level communication unit 2130. The other is to output, to the network 2000, a signal sent from the lower-level communication unit 2130.

The control unit 2120 has a function of controlling each unit included in the base station 2103.

The lower-level communication unit 2130 is connected to an antenna 2131, and has a function of performing communication with the mobile stations and the repeater. The lower-level communication unit 2130 transmits, via the antenna 2131, a frame containing a preamble, the DL-MAP, and the UL-MAP so as to achieve synchronization with the repeater and the mobile stations. The DL-MAP includes information, such as a frequency, required for communication in the downlink direction. The UL-MAP includes information, such as a frequency, required for communication in the uplink direction.

The storage unit 2140 has a function of storing therein a program and data required for the base station 2103 to perform operations, and stores therein a neighbor list 2141. The neighbor list 2141 is information referred to when the mobile station or the repeater with which the base station 2103 has achieved synchronization performs a handover to another base station. The information in the neighbor list 2141 indicates base stations and repeaters that are candidates for the handover target. Under instructions of the control unit 2120, the neighbor list 2141 is regularly broadcast to the mobile stations and the repeater managed by the base station 2103.

The description has been given of the base station 2103 so far.

Figure 13:
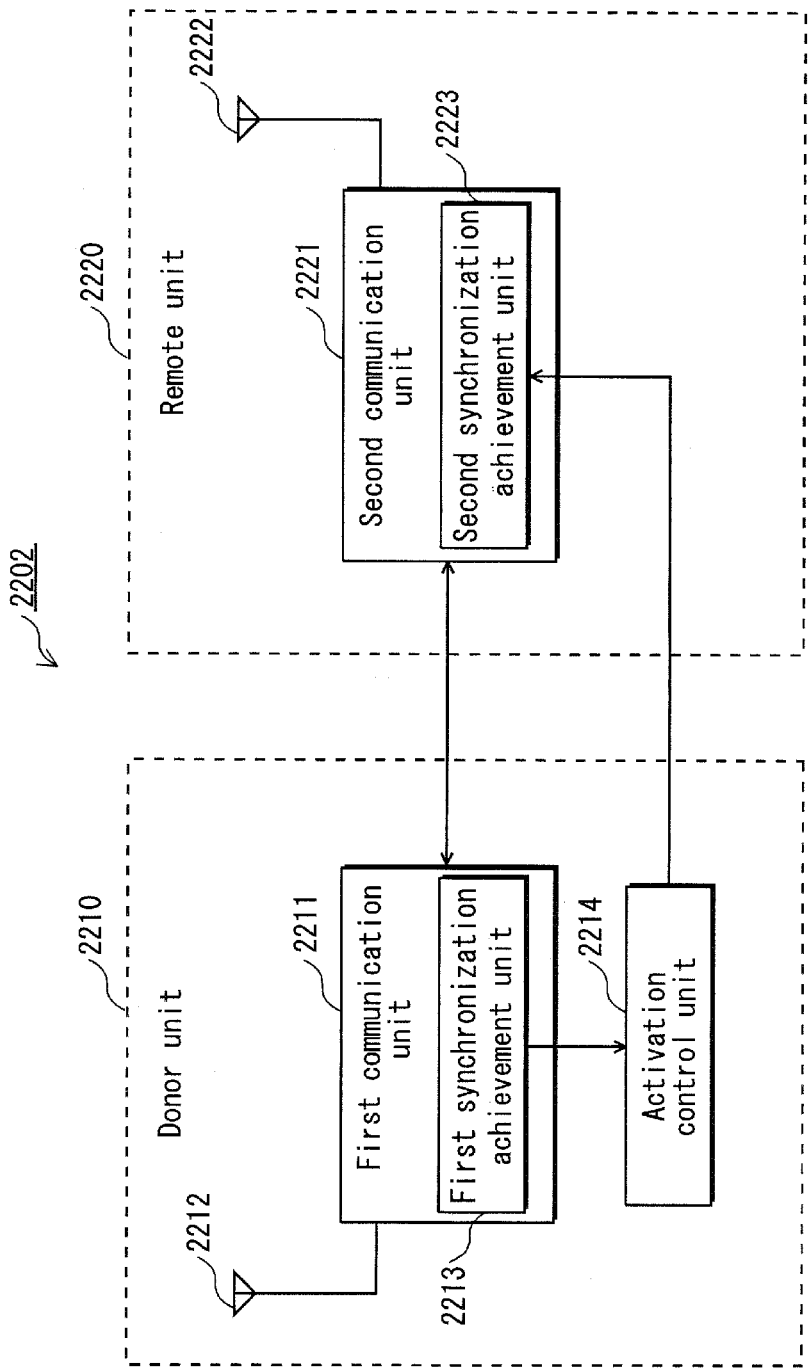
FIG. 13 is a function block diagram showing a functional structure of the repeater according to the second embodiment.

FIG. 13 is a function block diagram showing a functional structure of each repeater. Each repeater has a similar function, and the description below is given with the repeater 2202 taken as an example. As shown in FIG. 13, the repeater 2202 includes a donor unit 2210 and a remote unit 2220. The donor unit 2210 has a function of performing communication with the base station 2103. The remote unit 2220 has a function of performing communication with the mobile station 2301. The donor unit 2210 and the remote unit 2220 operate in accordance with an identical clock signal. The identical clock signal herein refers to a common clock signal or a plurality of clock signals having the same frequency and the same phase.

The donor unit 2210 includes a first communication unit 2211 and an activation control unit 2214.

The first communication unit 2211 is connected to an antenna 2212 and includes a first synchronization achievement unit 2213. The first communication unit 2211 has a function of performing communication with the base station via the antenna 2212. The first communication unit 2211 also has a function of sending a signal received from the base station via the antenna 2212 to the remote unit 2220. The first communication unit 2211 also has a function of sending a signal received from the remote unit 2220 to the base station via the antenna 2212.

The first synchronization achievement unit 2213 holds a reference signal for the preamble. In the state where synchronization is not yet achieved with the base station, the first synchronization achievement unit 2213 detects, from among the signals received by the first communication unit 2211, a signal matching the held reference signal to specify the preamble of the signal. Then, in accordance with the MAP information following the preamble (including a frequency bandwidth of the downlink, allocation of the downlink burst, a frequency bandwidth of the uplink, and allocation of the downlink burst), the first synchronization achievement unit 2213 achieves synchronization with the base station.

After the first synchronization achievement unit 2213 achieves synchronization with the base station, the activation control unit 2214 converts time and intervals of preamble arrival from the base station into time and intervals measured in terms of the operation clock of the repeater 2202. The activation control unit 2214 then notifies a second synchronization achievement unit 2223 described below of the converted time and intervals, and instructs transmission of a frame including the preamble required for synchronization.

The remote unit 2220 includes a second communication unit 2211.

The second communication unit 2211 is connected to an antenna 2222 and includes the second synchronization achievement unit 2223. The second communication unit 2221 has a function of performing communication with the mobile station connected to the remote unit 2200 via the antenna 2222. The second communication unit 2221 has a function of sending a signal received from the first communication unit 2211 to a specified mobile station via the antenna 2222. The second communication unit 2221 also has a function of sending a signal received via the antenna 2222 to the first communication unit 2211.

The second communication unit 2221 generates the preamble and the MAP information for each frame. The second synchronization achievement unit 2223 notifies the second communication unit 2211 of timing for transmission so that the preamble transmission is synchronized with the time and the intervals notified by the activation control unit 2214. The second communication unit 2221 transmits a signal including the generated information at the timing notified by the second synchronization achievement unit 2223. Upon receipt of the preamble and the MAP information by the mobile station, various processes of synchronization are started. The second synchronization achievement unit 2223 negotiates with the mobile station to achieve synchronization with the mobile station, as needed.

The description has been given of the repeater 2202 so far.

Figure 14:
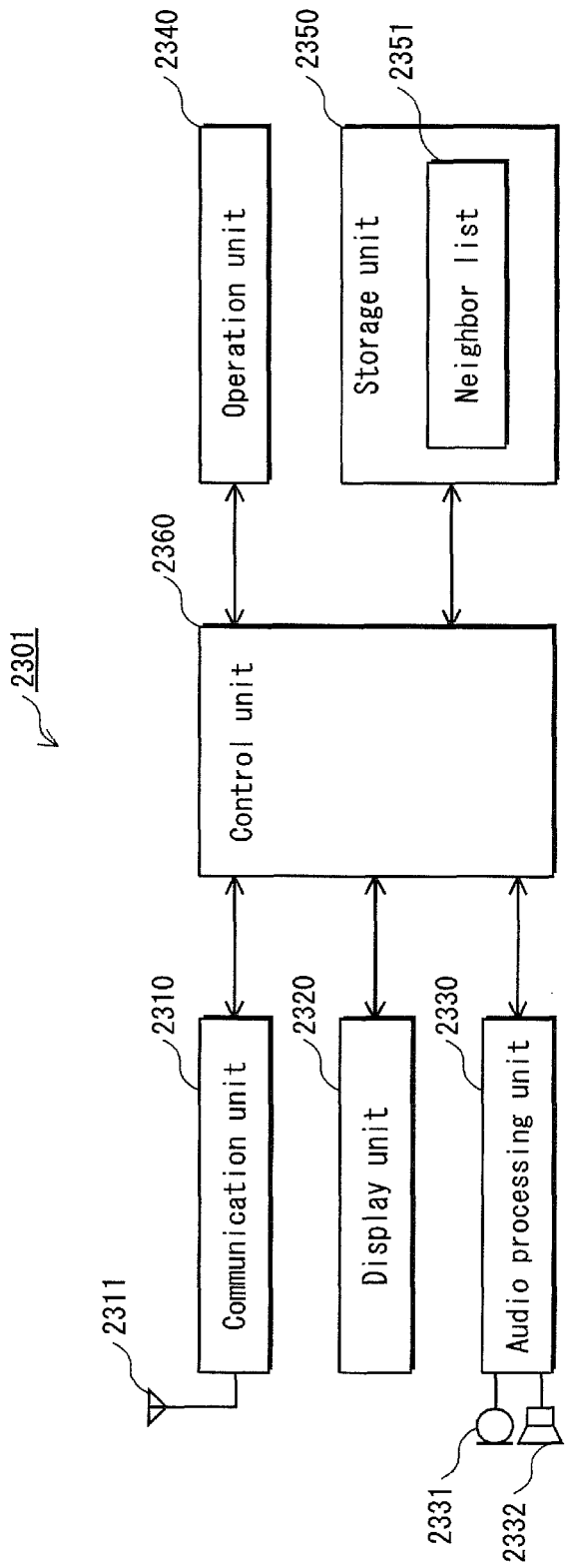
FIG. 14 is a function block diagram showing a functional structure of the mobile station according to the second embodiment.

FIG. 14 is a function block diagram showing a functional structure of the mobile station. Each mobile station has a similar functional structure, and the description herein takes the mobile station 2301 as an example.

As shown in FIG. 14, the mobile station 2301 includes a communication unit 2310, a display unit 2320, an audio processing unit 2330, an operating unit 2340, a storage unit 2350, and a control unit 2360.

The communication unit 2310 has a function of receiving a signal via an antenna 2311, demodulating the received signal to a telephone voice signal and a data signal, and outputting the telephone voice signal and the data signal acquired by the demodulation to the control unit 2360. The communication unit 2310 also has a function of modulating a transmission data signal, and outputting the data signal acquired by the modulation via the antenna 2311 used for the communication. The transmission data signal includes a telephone voice signal which has been A/D converted by the audio processing unit 2330, and an email signal which has been sent from the control unit 2360. The communication unit 2310 also has a function of receiving a signal from the base station or the repeater and achieving synchronization with the base station or the repeater. The communication unit 2310 calculates an error rate in the communication with the base station. The communication unit 2310 also has a function of sending a request for permission to perform a handover to the base station being in communication, if the calculated error rate is greater than a predetermined threshold value. At the time of the handover, the neighbor list 2351 stored in the storage unit 2350 is referred to and searched from the beginning for the handover target base station and the handover target repeater.

The display unit 2320 includes a display realized by an LCD (Liquid Crystal Display) or the like. The display unit 2320 has a function of displaying an image on the display in response to an instruction of the control unit 2360.

The audio processing unit 2330 includes the following two functions. One is to D/A convert the received audio signal acquired from the communication unit 2310 and output the converted audio signal to a speaker 2332. The other is to A/D convert the transmission audio signal acquired from a microphone 2331 and output the converted audio signal to the control unit 2360.

The operating unit 2340 includes a ten-key pad, an on hook key, an off hook key, a direction key, a determination key, a mail key, a side key, and others. The operating unit 2340 has a function of receiving a user operation and outputting the received user operation to the control unit 2360.

The storage unit 2350 includes a ROM (Read Only Memory) and a RAM (Random Access Memory), and can be realized by, for example, a small size hard disk or a non-volatile memory. The storage unit 2350 has a function of storing therein various data and programs required for the mobile station 2301 to perform operations. The various data includes music data and image data. The storage unit 2350 stores therein a neighbor list 2351 received from the base station or the repeater with which synchronization has been achieved. The neighbor list 2351 is referred to by the communication unit 2310 when the mobile station 2301 performs a handover. In the neighbor list 2351 broadcast from the base station or the repeater, one or more repeaters are registered first, and then one or more base stations are registered next as candidates for the handover target devices in advance by, for example, an operator. The communication unit 2310 searches the neighbor list 2351 from the beginning of the registered devices. Since the repeaters are registered in the beginning of the neighbor list 2351, the mobile station 2300 performs the handover preferentially to one of the repeaters.

The control unit 2360 is realized by, for example, a CPU (Central Processing Unit), and has a function of controlling each unit included in the mobile station 2301.

<Data>

FIGS. 15A to 15D show the neighbor lists referred to at the time of handovers.

FIGS. 15A to 15D show the neighbor lists held by the base station, the repeater, and the mobile station shown in FIG. 11. In FIGS. 15A TO 15D, each neighbor list is shown in association with the device holding the neighbor list. Normally, the neighbor list is referred to when a communication device performs a handover, and strictly speaking, the neighbor list held by the base station should not be called the neighbor list but rather a source of the neighbor list. However, the phrase neighbor list is also used to call the neighbor list held by the base station in the description.

FIG. 15A shows the neighbor list held by the base station 2103. In the neighbor list held by the base station 2103, RS2202, RS2201, BS2101, BS2102, and BS2107 are registered as candidates for the handover target of the base station 2103. The neighbor list is regularly broadcast to the repeater and the mobile stations with which the base station 2103 has achieved synchronization.

As shown in FIG. 15C, the mobile station 2301 which has achieved synchronization with the base station 2103 also has the identical neighbor list to the base station 2103.

FIG. 15B shows the neighbor list held by the repeater 2202. This neighbor list is referred to by the repeater 2202 when the repeater 2202 itself performs a handover, and referred to by any one of the mobile stations being in synchronization with the repeater 2202 when the mobile station performs a handover.

As shown in FIG. 15D, the mobile station 2302 and the mobile station 2304 both of which are in synchronization with the repeater 2202 also have the identical neighbor list to the repeater 2202. The repeater 2202, the mobile station 2302, and the mobile station 2304 each have the neighbor list in which BS2103, BS2107, and BS2102 are registered as the handover target in common.

Note that although FIGS. 15A to 15D show the neighbor lists held by only some of the devices shown in the system diagram of FIG. 11, actually all the devices of FIG. 11 each have one neighbor list.

The neighbor list is searched for a handover target base station or a handover target repeater in the order of registration. For example, in the neighbor list held by the mobile station 2301, RS2202, RS2201, BS2101, BS2102, and BS2107 are registered in the stated order. In this case, at the time of a handover, the mobile station 2301 searches for the handover target device from among the registered devices in the registered order.

<Operations>

Figure 16:
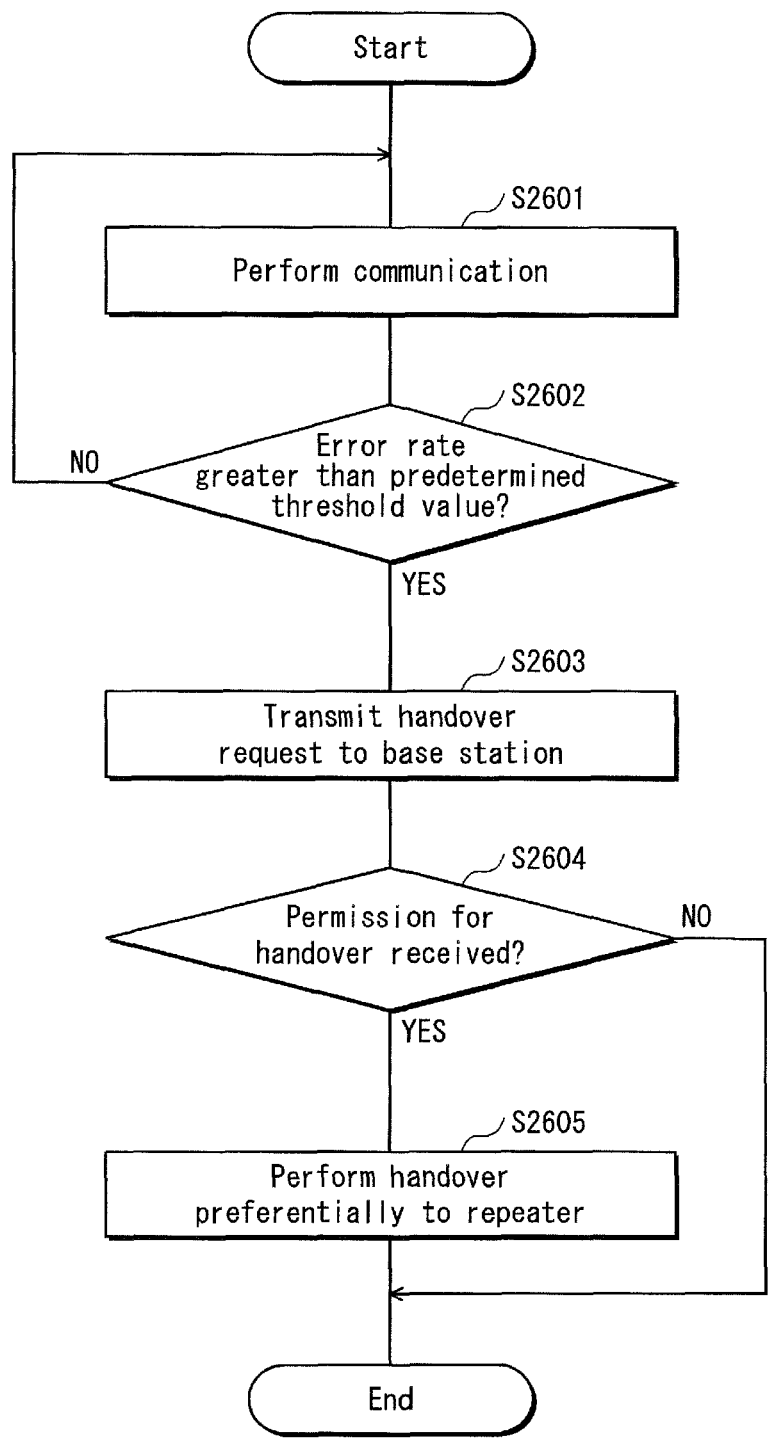
FIG. 16 is a flowchart showing operations pertaining to a handover performed by the mobile station according to the second embodiment.

A description is now given of operations of the mobile stations in the second embodiment, with reference to a flowchart shown in FIG. 16. The description herein takes the mobile station 2301 as an example.

The communication unit 2310 of the mobile station 2301 is in communication with the base station via the antenna 2311 (step S2601).

The communication unit 2310 detects an error occurred in the communication with the base station, for example by checking CRC (Cyclic Redundancy Check) included in the received packet signal. The communication unit 2310 detects an error rate based on the occurring errors, and determines whether the detected error rate is greater than the predetermined threshold value (step S2602).

If it is determined that the error rate is not greater than the predetermined threshold value (NO in step S2602), the communication unit 2310 continues to perform the communication.

If it is determined that the error rate is greater than the predetermined threshold value (YES in step SS2602), the communication unit 2310 sends a request for a handover to the communicating base station (step S2603).

Upon receipt of permission from the base station for the handover request (YES in step S2604), the communication unit 2310 refers to the neighbor list 2351 held in the storage unit 2350 to perform a handover. The neighbor list 2351 is searched starting with a repeater, and if reception strength of a signal received from the repeater searched is greater than a predetermined threshold value, the searching is ended, and the mobile station 2301 performs a handover to the repeater (step S2605). In the case where the reception strength is not greater than the threshold value, the searching is continued to find a repeater or a base station that transmits a signal having reception strength greater than the threshold value.

Without any permission from the base station for the handover request in step S2604 (NO in step S2604), the processing is terminated. In this case, the communication unit 2301 may send another request for a handover to the base station after a predetermined time period.

The description has been given of the operations of the mobile station at the time of a handover.

As mentioned above, the mobile station detects the error rate in the communication between the own terminal and the base station to perform a handover to the repeater. However, such a handover cannot be performed when, for example, the mobile station cannot receive permission for the handover from the base station. In this case, a communication error continuously occurs in the mobile station with which the base station has achieved synchronization and is in communication, and in the mobile stations with which the repeater has achieved synchronization and is in communication. In this situation, it cannot be said that the communication status is good.

To address such a situation, the repeater performs the following operations.

Figure 17:
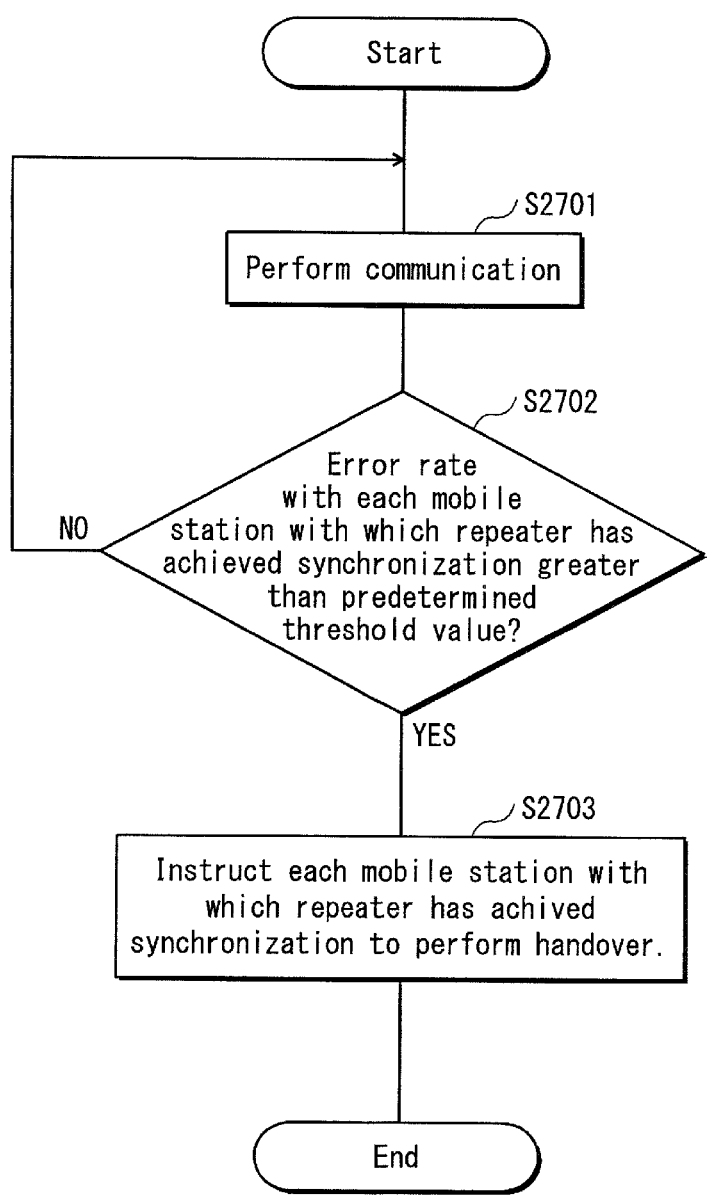
FIG. 17 is a flowchart showing operations of the repeater according to the second embodiment.

FIG. 17 is a flowchart showing processing performed in the case where the mobile station cannot perform a handover as shown in NO in the step S2604 of FIG. 16 and where the error continuously occurs in the communication between the repeater and the mobile station.

As shown in the system diagram of FIG. 11, the mobile station 2301 is located close to the mobile station 2302. This means that the mobile station 2301 is located close to the repeater 2202, because a communication range of the repeater is significantly smaller than the base station. Accordingly, a signal transmitted from the mobile station 2301 to the base station is also received by the repeater 2202. This causes interference to a signal transmitted from the mobile station 2302 or the mobile station 2304 to the repeater 2202. As a result, an error is likely to occur in the communication between the mobile station 2302 and the repeater 2202, and between the mobile station 2304 and the repeater 2202.

To address this problem, the repeater 2202 detects an error in the communication paths while performing communication with the mobile stations (step S2701).

The second communication unit of the repeater 2202 determines, for a signal received from each mobile station with which the repeater 2202 has achieved synchronization and is in communication, whether the error rate in the communication with the each mobile station is greater than the predetermined threshold value (step S2702).

If it is determined that the error rate is not greater than the predetermined threshold value (NO in step S2702), the repeater 2202 continues to perform the communication with the corresponding mobile station.

If it is determined that the error rate is greater than the predetermined threshold value, the second communication unit instructions to perform a handover to all the mobile stations with which the repeater 2202 is in communication (step S2703). Upon receipt of the handover instructions, the mobile stations refer to the respective neighbor lists held therein to perform a handover.

This solves the problem of the communication error caused due to the closeness between the repeater and the mobile stations in communication with the base station.

Modifications of Second Embodiment

Now, a description is given of various modifications of the above second embodiment.

(1) In the above second embodiment, the CRC checking is used as the method for error detection. However, various methods are conventionally used for the error detection, and any of these methods may be used. For example, it is possible to determine that an error has occurred when the preamble reception has failed to be performed at estimated time and intervals, although the preamble is sometimes not appropriately specified due to the error occurred in the communication. In the WiMAX communication, the duration of each frame is fixed, and the time and the intervals of preamble arrival can be appropriately estimated. Alternatively, the error detection may be made when a reception electric field intensity of a received signal is less than a threshold value.

(2) It is also possible to have the following control program stored in a storage medium, or circulated and distributed through various communication channels: the control program comprising program codes for causing processors in the mobile stations and the repeater or circuits connected thereto to execute the handover operations and the handover processing as described in the second embodiment. Such a storage medium includes an IC card, a hard disk, an optical disk, a flexible disk, and a ROM. The circulated and distributed control program becomes available as it is contained in a memory and the like which can be read by a processor. The control program is then executed by the processor, so that the various functions as described in the embodiment are realized.

Third Embodiment

In a third embodiment, a method for solving the problem caused depending on the location of the repeater as described in the above first embodiment is disclosed.

In wireless communication, the mobile station achieves synchronization with the base station or the repeater which is the relay device, to perform the communication. Each base station or each repeater has a communication range according to the specification. Accordingly, if the mobile station is moved to where the communication with the base station or the repeater cannot be smoothly continued, the mobile station achieves synchronization with another base station or another repeater whose signal has a stronger strength. Generally speaking, the handover refers to that the mobile station changes the communication destination to a new base station or a new repeater.

In order to perform such a handover, the mobile station refers to the neighbor list received from the base station with which the mobile station has achieved synchronization to search for the handover target base station. The base station preliminarily holds the neighbor list indicating information of other base station(s) located in the vicinity of the base station as registered by the operator in advance. By receiving the neighbor list, the mobile station is enabled to perform a handover, for example by sequentially attempting a connection with each base station registered in the neighbor list.

Meanwhile, regarding positioning of the repeater, it can be considered that the repeater is mounted in a train car. In this case, it is not possible for a mobile station owned by a user newly riding on the train car to perform a handover to the mounted repeater. This is because of that the mobile station owned by the user newly riding in the train car has the neighbor list including no information about the repeater.

Further, in the case where the repeater has the neighbor list and broadcasts the neighbor list to mobile stations managed by the repeater, if the repeater is mobile, the following problem arises. That is to say, the mobile stations cannot perform a handover once the mobile stations go outside the communication range of the repeater.

In view of the above problem, the objective of the third embodiment is to provide a communication system that is capable of preventing the situation where the movement of the repeater hinders the mobile station(s) to perform a handover.

<Structure>

A description is given of the communication system according to the third embodiment that aims to solve the above problem, with reference to FIGS. 22 to 32.

Figure 22:
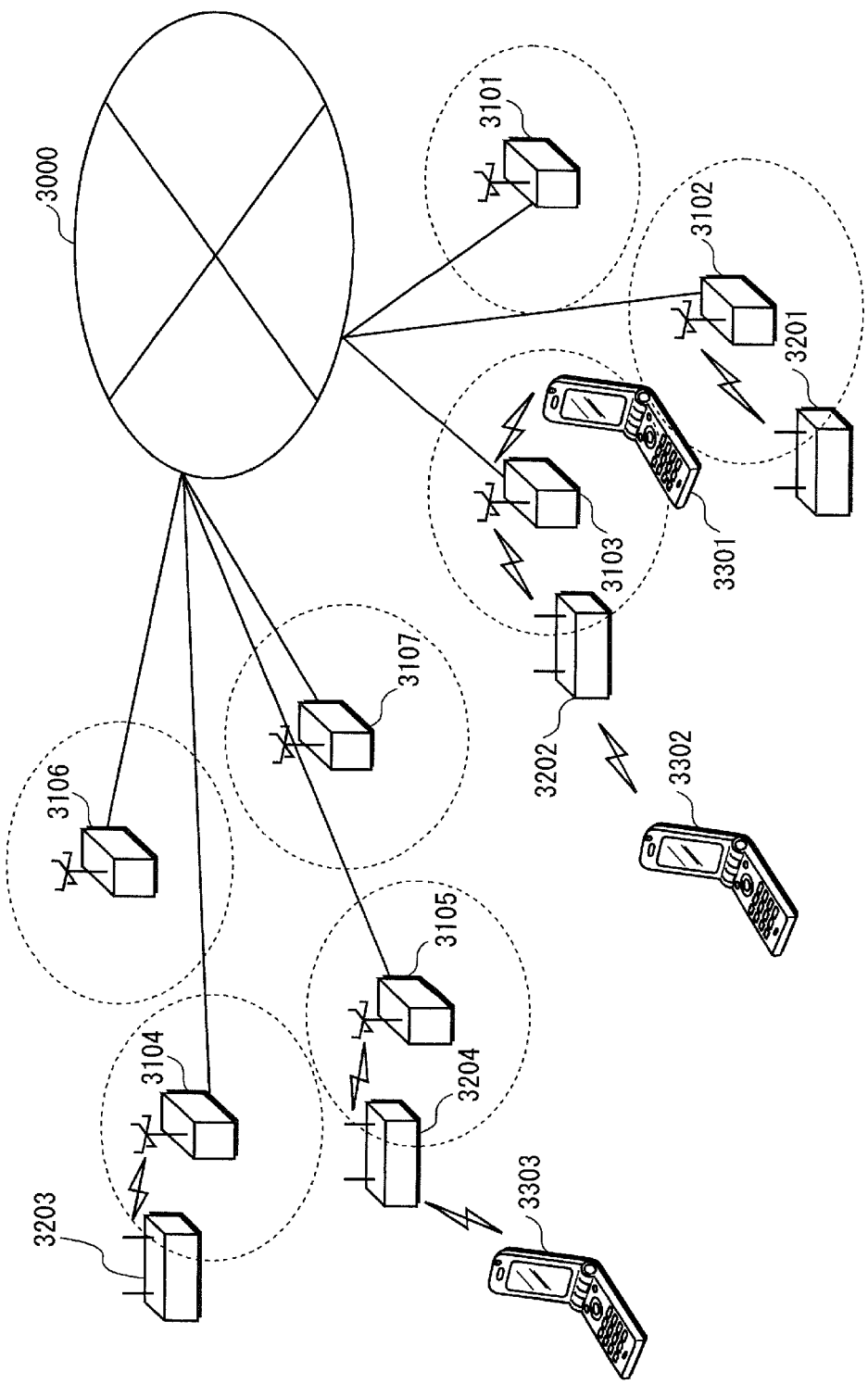
FIG. 22 is a configuration diagram of the communication system according to a third embodiment.

FIG. 22 is a system diagram showing a system structure of the communication system.

The communication system includes base stations 3101 to 3107, repeaters 3201 to 3204, and mobile stations 3301 to 3303. Note that FIG. 22 only shows an example of the numbers of the base stations, the repeaters, and the mobile station. In fact, the communication system may include thousands or several tens of thousands of base stations, repeaters, and mobile stations.

The base stations 3101 to 3107 are connected with each other via a network 3000.

The repeater 3201 has achieved synchronization and is in communication with the base station 3102. The repeater 3202 has achieved synchronization and is in communication with the base station 3103. The repeater 3203 has achieved synchronization and is in communication with the base station 3104. The repeater 3204 has achieved synchronization and is in communication with the base station 3105.

The mobile station 3301 has achieved synchronization and is in communication with the base station 3103. The mobile station 3302 has achieved synchronization and is in communication with the repeater 3202. The mobile station 3303 has achieved synchronization and is in communication with the repeater 3204.

It should be noted that in the description below the base station, the repeater, and the mobile station may be referred to as the BS (Base Station), the RS (Relay Station), and the MS (Mobile Station), respectively. Further, it is assumed that the base station, the repeater, and the mobile station each have a fundamental structure conventionally known, and the description of the present embodiment focuses on characteristic features of the invention.

Figure 23:
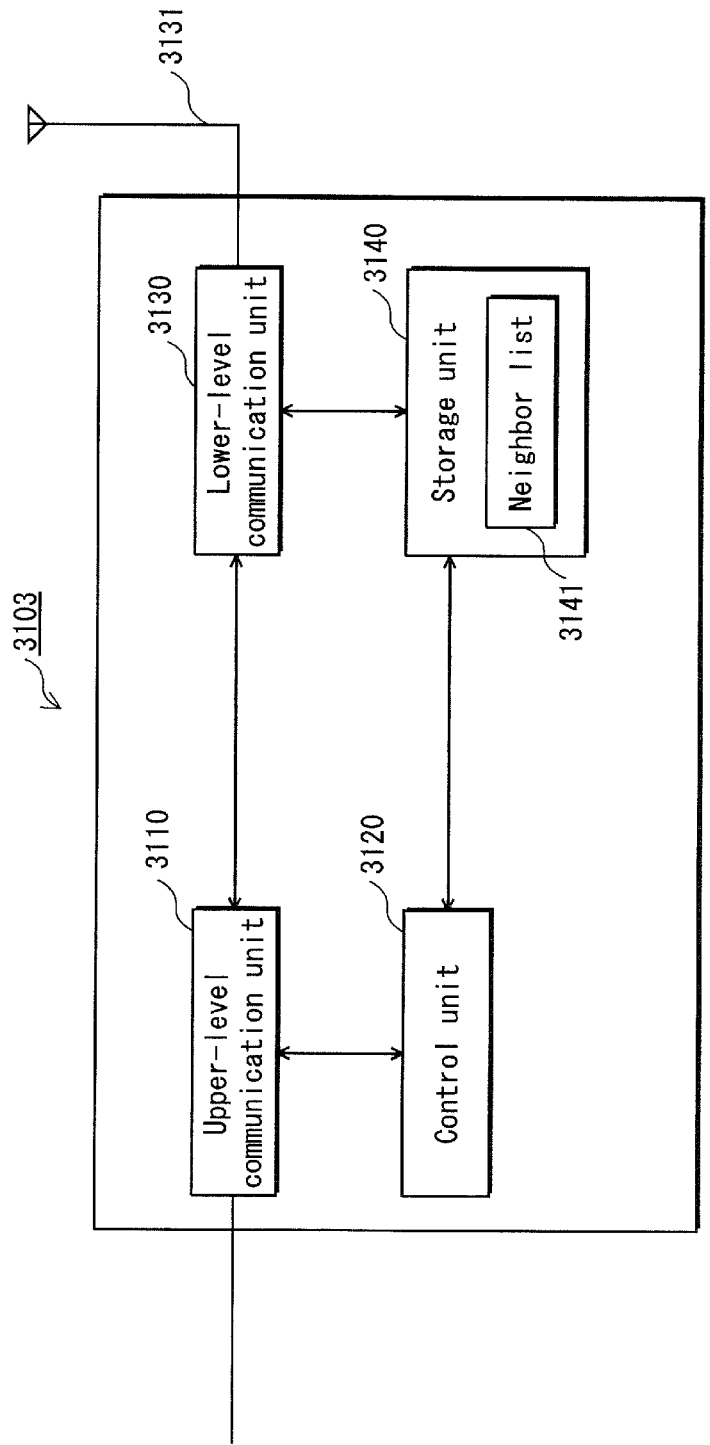
FIG. 23 is a function block diagram showing a functional structure of the base station according to the third embodiment.

FIG. 23 is a function block diagram showing a functional structure of the base station. Each base station has a similar functional structure, and the description herein takes the base station 3103 as an example.

FIG. 23 is a function block diagram showing a functional structure of the base station 3103. As shown in FIG. 23, the base station 3103 includes an upper-level communication unit 3110, a control unit 3120, a lower-level communication unit 3130, and a storage unit 3140.

The upper-level communication unit 3110 is connected to the network 3000, and has a function of performing communication with other base station(s). The upper-level communication unit 3110 also has the following two functions. One is to receive, from another base station, a signal addressed to a mobile station whose information is registered in the own base station, and send the received signal to the lower-level communication unit 3130. The other is to output, to the network 3000, a signal sent from the lower-level communication unit 3130.

The control unit 3120 has a function of controlling each unit included in the base station 3103. The control unit 3120 also has a function, in response to synchronization achievement information from the lower-level communication unit 3130 indicating that the base station 3103 has achieved synchronization with a new repeater, of updating the neighbor list 141 by additionally register information of the new repeater to the neighbor list 141. The control unit 3120 also has a function, in response to synchronization cancellation information from the lower-level communication unit 3130 indicating that the base station 3103 has cancelled synchronization with a repeater, of updating the neighbor list 141 by deleting information of the (canceled) repeater from the neighbor list 141.

The lower-level communication unit 3130 is connected to an antenna 3131, and has a function of performing communication with the mobile station and the repeater. The lower-level communication unit 3130 transmits, via the antenna 3131, a frame containing the preamble, the DL-MAP, and the UL-MAP so as to achieve synchronization with the repeater and the mobile station. The DL-MAP includes information, such as a frequency, required for communication in the downlink direction. The UL-MAP includes information, such as a frequency, required for communication in the downlink direction.

The storage unit 3140 has a function of storing therein a program and data required for the base station 3103 to perform operations, and stores therein a neighbor list 3141. The neighbor list 3141 is information referred to by the mobile station or the repeater with which the base station has achieved synchronization when the mobile station or the repeater performs a handover. The information in the neighbor list 3141 indicates base station(s) and repeater(s) that are candidates for the handover target.

The description has been given of the base station 3103 so far.

Figure 24:
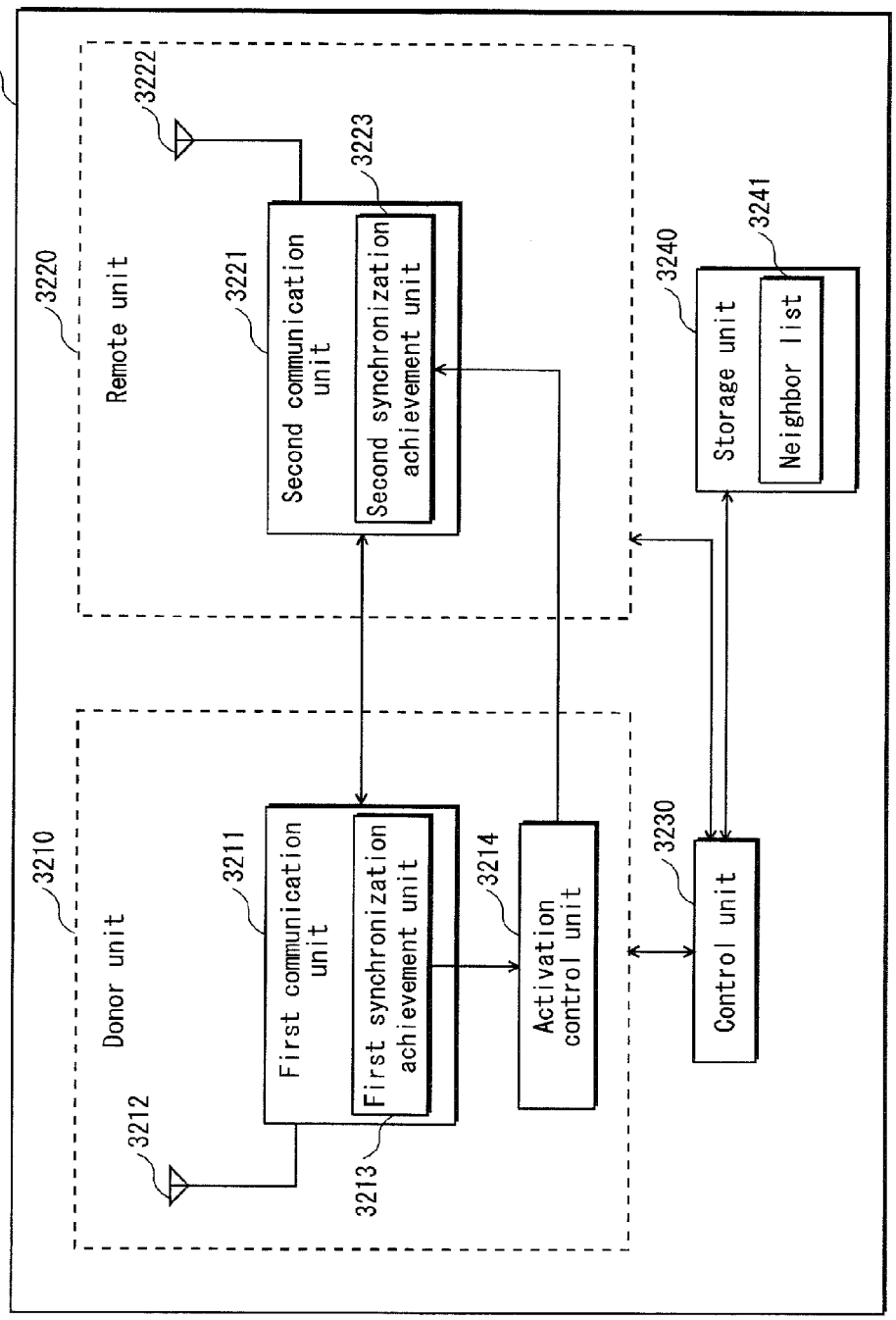
FIG. 24 is a function block diagram showing a functional structure of the repeater according to the third embodiment.

FIG. 24 is a function block diagram showing a functional structure of the repeater. Each repeater has a similar functional structure, and the description herein takes the repeater 3202 as an example.

FIG. 24 is the function block diagram showing the functional structure of the repeater 3202. As shown in FIG. 24, the repeater 3202 includes a donor unit 3210, a remote unit 3220, a control unit 3230, and a storage unit 3240. The donor unit 3210 has a function of performing communication with the base station 3103. The remote unit 3220 has a function of performing communication with the mobile station 3301. The donor unit 3210 and the remote unit 3220 in accordance with an identical clock signal. The identical clock signal herein refers to a common clock signal or a plurality of clock signals having the same frequency and the same phase.

The donor unit 3210 includes a first communication unit 3211 and an activation control unit 3214.

The first communication unit 3211 is connected to an antenna 3212 and includes a first synchronization achievement unit 3213. The first communication unit 3211 has a function of performing communication with the base station via the antenna 3212. The first communication unit 3211 also has a function of sending a signal received from the base station via the antenna 3212 to the remote unit 3220. The first communication unit 3211 also has a function of sending a signal received from the remote unit 3220 to the base station via the antenna 3212.

The first synchronization achievement unit 3213 holds a reference signal for the preamble. In the state where synchronization is not yet achieved with the base station, the first synchronization achievement unit 3213 detects, from among the signals received by the first communication unit, a signal matching the held reference signal to specify the preamble of the signal. Then, in accordance with the MAP information following the preamble (including a frequency bandwidth of the downlink, allocation of the downlink burst, a frequency bandwidth of the uplink, and allocation of the downlink burst), the first synchronization achievement unit 3213 achieves synchronization with the base station.

After the first synchronization achievement unit 3213 achieves synchronization with the base station, the activation control unit 3214 converts time and intervals of preamble arrival from the base station into time and intervals measured in terms of the operation clock of the repeater 3202. The activation control unit 3214 then notifies a second synchronization achievement unit 3223 described below of the converted time and intervals, and instructs transmission of a frame including the preamble required for synchronization.

The remote unit 3220 includes a second communication unit 3211.

The second communication unit 3220 is connected to an antenna 3222 and includes the second synchronization achievement unit 3223. The second communication unit 3221 has a function of performing communication with the mobile station connected to the remote unit via the antenna 3222. The second communication unit 3211 has a function of sending a signal received from the first communication unit 3211 to a specified mobile station via the antenna 3222. The second communication unit 2221 also has a function of sending a signal received via the antenna 3222 to the first communication unit 3211.

The second communication unit 3221 generates the preamble and the MAP information for each frame. The second synchronization achievement unit 3223 notifies the second communication unit 3211 of timing for transmission so that the preamble transmission is synchronized with the time and the intervals notified by the activation control unit 3214. The second communication unit 3221 transmits a signal including the generated information at the timing notified by the second synchronization achievement unit 3223. Upon receipt of the preamble and the MAP information by the mobile station, various processes of synchronization are started. The second synchronization achievement unit 3223 negotiates with the mobile station to achieve synchronization with the mobile station, as needed.

The control unit 3230 has a function of controlling each unit included in the repeater 3202. When the donor unit 210 has achieved synchronization with a new base station, the control unit 3230 adds information of the new base station to the neighbor list that the donor unit 210 acquired from the new base station. In the case where information of the repeater 3202 is already registered in the acquired neighbor list, the control unit 3230 deletes the information of the repeater 3202 from the neighbor list, and causes the storage unit 3240 to store the neighbor list from which the information of the repeater 3202 is deteleted as a neighbor list 3241.

The storage unit 3240 has a function of storing therein a program and data required for the base station 3202 to perform operations, and in particular, stores therein the neighbor list 3241. The neighbor list 3241 is information referred to by the repeater 3202 when the repeater 3202 performs a handover. The information in the neighbor list 3241 indicates base station(s) and repeater(s) that are candidates for the handover target. The neighbor list 3241 is broadcast to the mobile station being in communication with the repeater 3202.

The description has been given of the repeater 3202 so far.

Figure 25:
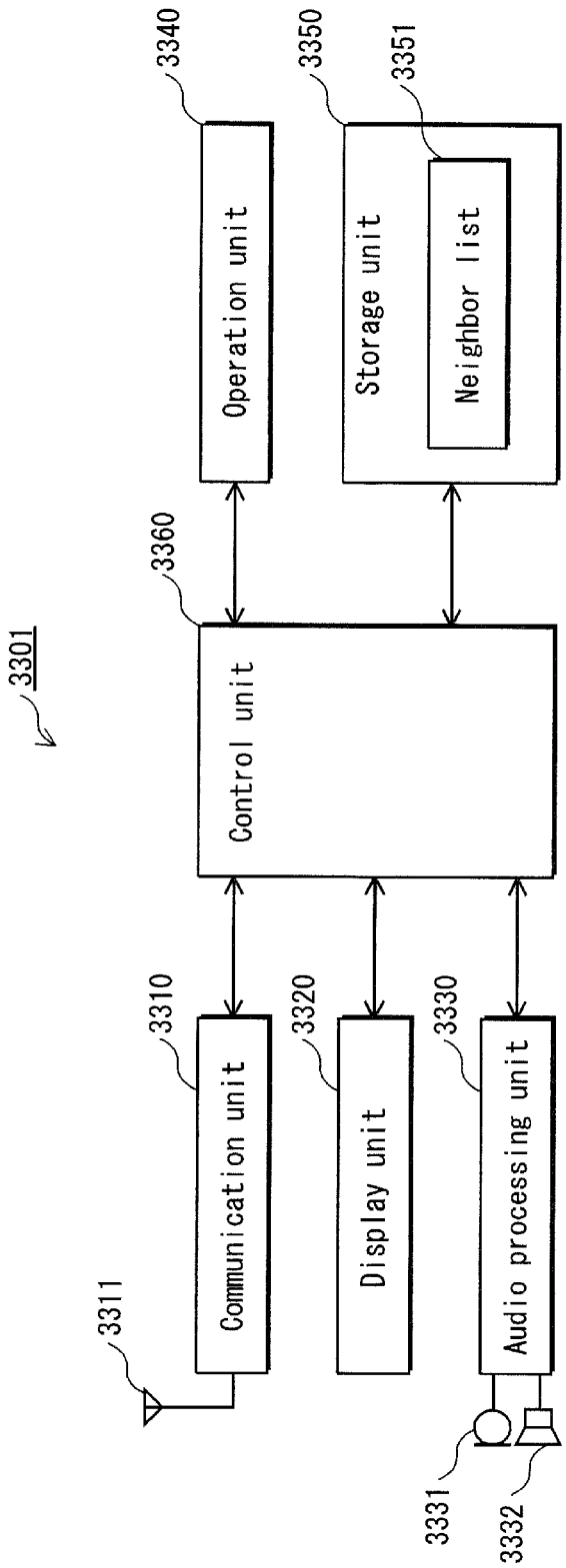
FIG. 25 is a function block diagram showing a functional structure of the mobile station according to the third embodiment.

FIG. 25 is a function block diagram showing a functional structure of the mobile station. Each mobile station has a similar functional structure, and the description herein takes the mobile station 3301 as an example.

As shown in FIG. 25, the mobile station 3301 includes a communication unit 3310, a display unit 3320, an audio processing unit 3330, an operating unit 3340, a storage unit 3350, and a control unit 3360.

The communication unit 3310 has a function of receiving a signal via an antenna 3311, demodulating the received signal to a telephone voice signal and a data signal, and outputting the telephone voice signal and the data signal acquired by the demodulation to the control unit 3360. The communication unit 3310 also has a function of modulating a transmission data signal, and outputting the data signal acquired by the modulation via the antenna 3311 used for the communication. The transmission data signal includes a telephone voice signal which has been A/D converted by the audio processing unit 3330, and an email signal which has been sent from the control unit 3360. The communication unit 3310 also has a function of receiving a signal from the base station or the repeater and achieving synchronization with the base station or the repeater.

The display unit 3320 includes a display realized by an LCD (Liquid Crystal Display) or the like. The display unit 3320 has a function of displaying an image on the display in response to an instruction of the control unit 3360.

The audio processing unit 3330 includes the following two functions. One is to D/A convert the received audio signal acquired from the communication unit 3310 and output the converted audio signal to a speaker 3332. The other is to A/D convert the transmission audio signal acquired from a microphone 3331 and output the converted audio signal to the control unit 3360.

The operating unit 3340 includes a ten-key pad, an on hook key, an off hook key, a direction key, a determination key, a mail key, a side key, and others. The operating unit 3340 has a function of receiving a user operation and outputting the received user operation to the control unit 3360.

The storage unit 3350 includes a ROM (Read Only Memory) and a RAM (Random Access Memory), and can be realized by, for example, a small size hard disk or a nonvolatile memory. The storage unit 3350 has a function of storing therein various data and programs required for the mobile station 3301 to perform operations. The various data includes music data and image data. The storage unit 3350 stores therein a neighbor list 3351 received from the base station or the repeater with which synchronization has been achieved. The neighbor list 3351 is referred to by the communication unit 3310 when the mobile station 3301 performs a handover.

The control unit 3360 is realized by, for example, a CPU (Central Processing Unit), and has a function of controlling each unit included in the mobile station 3301.

<Data>

Next, a description is given of data according to the present embodiment.

FIGS. 26A to 26D show the neighbor lists held by some of the base stations, the repeaters, and the mobile stations shown in FIG. 22. In FIGS. 26A to 26D, each neighbor list is shown in association with the device holding the neighbor list.

FIG. 26A shows the neighbor list held by the base station 3103. In the neighbor list held by the base station 3103, RS3202, RS3201, BS3101, BS3102, and BS3107 are registered as the handover target of the base station 3103. The neighbor list is regularly broadcast to the repeater and the mobile stations with which the base station 3103 has achieved synchronization.

As shown in FIG. 26C, the mobile station 3301 which has achieved synchronization with the base station 3103 also has the identical neighbor list to the base station 3103.

FIG. 26B shows the neighbor list held by the repeater 3202. This neighbor list is referred to by the repeater 3202 when the repeater 3202 itself performs a handover, and referred to by any one of the mobile stations being in synchronization with the repeater 3202 when the mobile station performs a handover.

As shown in FIG. 26D, the mobile station 3302 which is in synchronization with the repeater 3202 also has the identical neighbor list to the repeater 3202. The repeater 3202 and the mobile station 3301 all have the neighbor list in which RS3201, BS3103, BS3107, and BS3102 are registered as the handover target.

Note that although FIGS. 26A to 26D show the neighbor lists held by only some of the devices shown in the system diagram of FIG. 22, actually all the devices of FIG. 22 each have one neighbor list.

<Operations>

Figure 27:
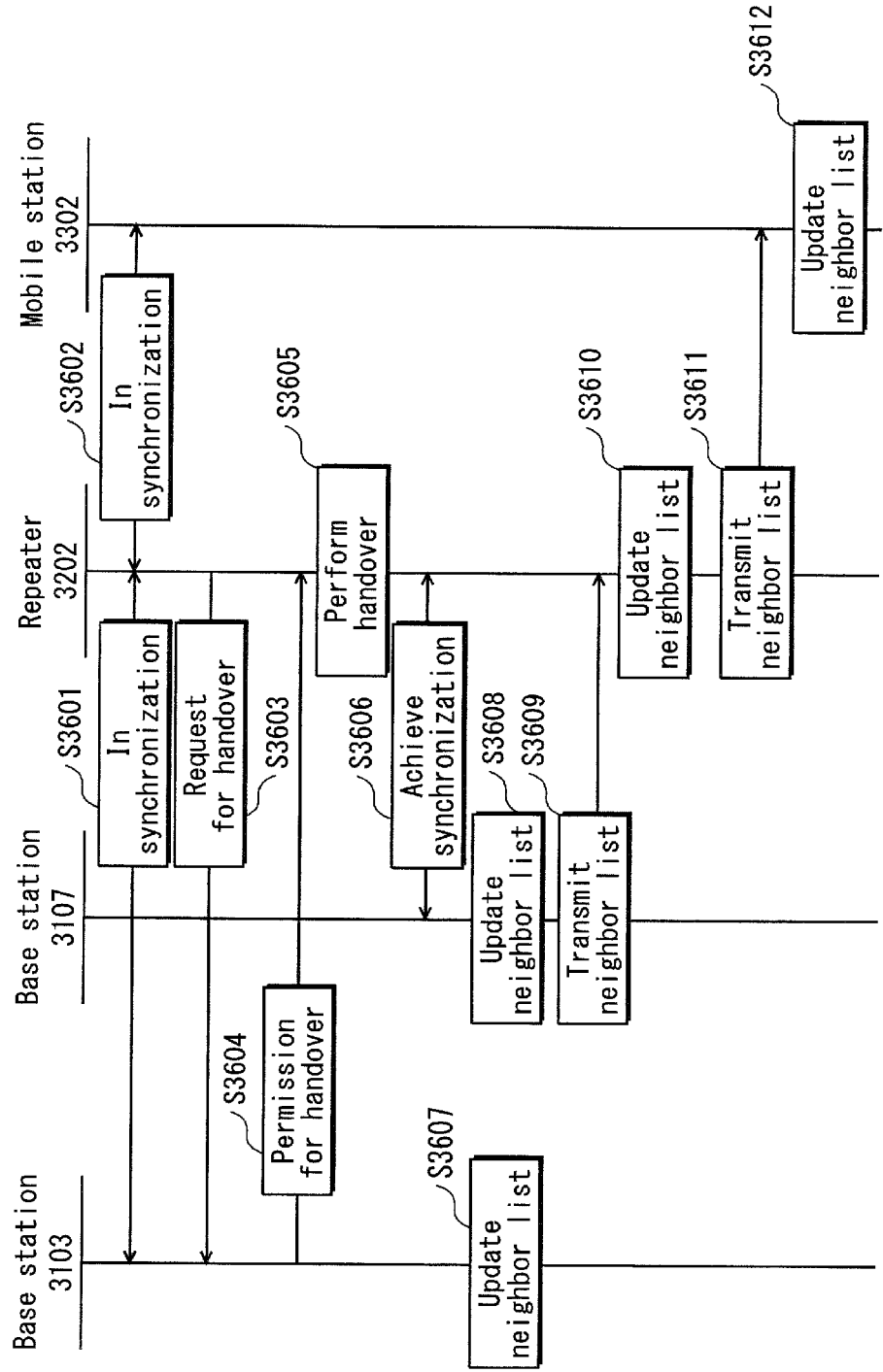
FIG. 27 is a timing chart showing operations of the communication system pertaining to update of each neighbor list according to the third embodiment.

To begin with, a description is given of operations in the communication system pertaining to the neighbor list update in the case where the repeater performs a handover, with reference to a timing chart of FIG. 27. In the description, the repeater 3202, which is in communication with the mobile station 3302, performs a handover from the base station 3103 to the base station 3107, as an example.

The repeater 3202 has achieved synchronization and is in communication with the base station 3103 (step S3601).

On the other hand, the mobile station 3302 has achieved synchronization and is in communication with the repeater 3202 (step S3602).

As the repeater 3202 moves, reception strength of a signal received from the base station 3103 may be lowered. As a result, the repeater 3202 requests the base station 3103 to permit the repeater 3202 to perform a handover (step S3603).

In response to the request for a handover, the base station 3103 transmits to the repeater 3202 a signal indicating permission for a handover (step S3604).

Then, the repeater 3202 refers to the neighbor list held by the repeater 3202 itself to perform a handover (step S3605). In this description, the repeater 3202 performs a handover to the base station 3107.

The repeater 3202 receives the preamble transmitted from the base station 3107, and achieve synchronization with the base station 3107 (step S3606).

Once the repeater 3202 achieves synchronization with the base station 3107, synchronization achieved between the repeater 3202 and the base station 3103 until then is cancelled. The base station 3103 deletes information of the repeater 3202 from the neighbor list held by the base station 3103 itself to update the neighbor list (step S3607). Similarly, upon achieving synchronization with the repeater 3202, the base station 3107 updates the neighbor list held by the base station 3107 itself (step S3608).

Subsequently, the base station 3107 transmits the updated neighbor list to the repeater 3202 (step S3609). At the same time, the updated neighbor list is also transmitted to any other mobile station managed by the base station 3107.

Upon receipt of the neighbor list from the base station 3107, the repeater 3202 updates the received neighbor list and stores the updated neighbor list (step S3610).

Then, the repeater 3202 transmits the updated neighbor list to the mobile station 3302 managed by the repeater 3202 (step S3611).

The mobile station 3302 stores the transmitted neighbor list (step S3612). The new neighbor list stored in the mobile station 3302 is to be referred to when the mobile station 3302 performs a handover from the repeater 3202 to another base station or another repeater.

Next, a description is given of the update of the respective neighbor lists in the base station, the repeater, and the mobile station in the stated order.

Figure 28:
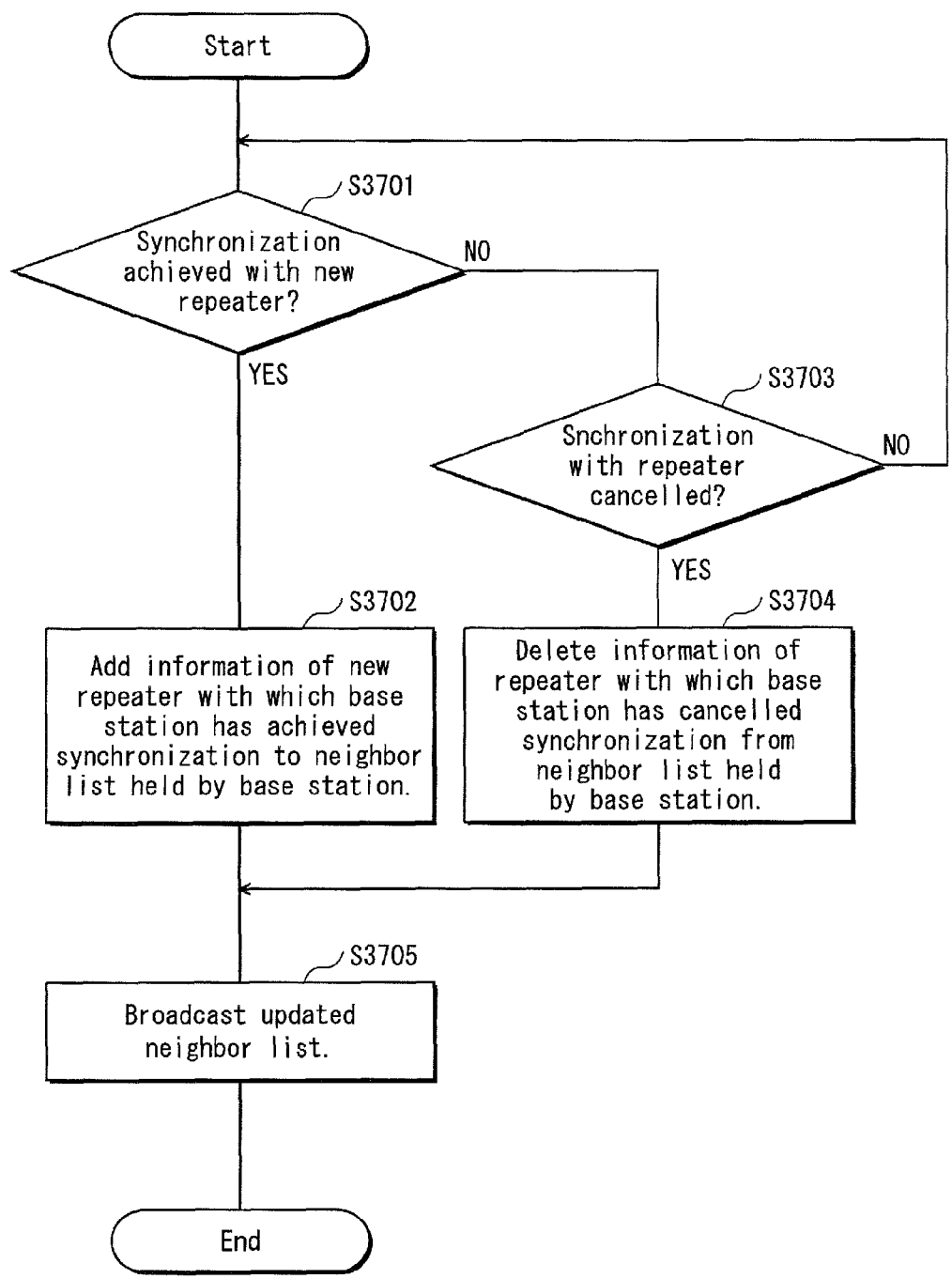
FIG. 28 is a flowchart showing the operations of updating the neighbor list performed by the base station according to the third embodiment.

Firstly, a description is given of the neighbor list update performed in the base station, with reference to a flowchart of FIG. 28.

The control unit 3120 of the base station detects whether or not the lower-level communication unit 3130 has achieved synchronization with a new repeater (step S3701). The detection in the step S3701 is made depending on whether or not the control unit 3120 receives a notification of synchronization achievement with a new repeater from the lower-level communication unit 3130.

In the case where the lower-level communication unit 3130 has achieved synchronization with the new repeater (YES in step S3701), the lower-level communication unit 3130 transmits information of the repeater with which synchronization is newly achieved to the control unit 3120. The control unit 3120 updates the neighbor list 3141 by adding the information of the repeater with which synchronization has been achieved (step S3702).

On the other hand, in the case where the lower-level communication unit 3130 has not achieved synchronization with a new repeater (NO in step S3701), the control unit 3120 detects whether or not synchronization has been cancelled with the repeater previously in communication (step S3703). The detection in the step S3703 is made depending on whether or not the control unit 3120 receives from the lower-level communication unit 3130 a notification of synchronization cancellation with the repeater previously in communication.

In the case where the lower-level communication unit 3130 has not cancelled synchronization with the repeater (NO in step S3703), the control unit 3120 returns to the step S3701 and performs the subsequent processing.

In the case where the lower-level communication unit 3130 has cancelled synchronization with the repeater (YES in the step S3703), information of the repeater previously in communication is transmitted from the lower-level communication unit 3130 to the control unit 3120, and the neighbor list 3141 is updated by deleting the information of the repeater with which synchronization has been cancelled (step S3704).

Then, the control unit 3120 causes the lower-level communication unit 3130 to broadcast the neighbor list 3141 updated in the steps S3702 and S3704 to all the repeaters and the mobile stations with which the lower-level communication unit 3130 has achieved synchronization and is in communication (step S3705).

The description has been given of the operations in the base station pertaining to the neighbor list update.

Figure 29:
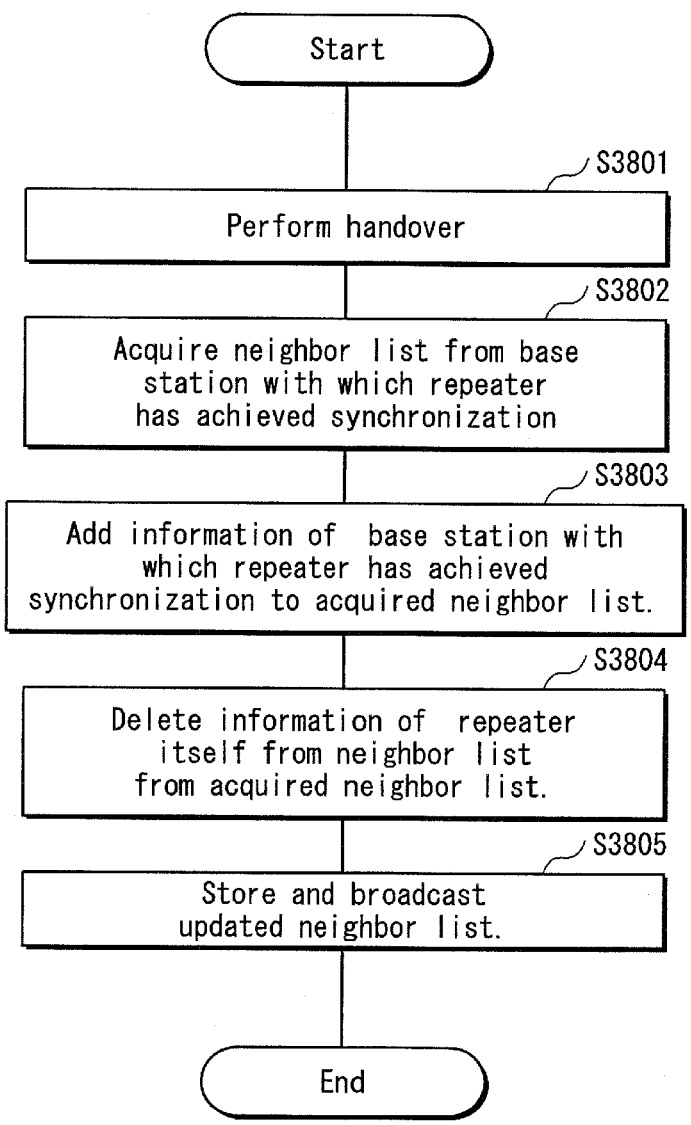
FIG. 29 is a flowchart showing the operations of updating the neighbor list performed by the repeater according to the third embodiment.

Next, a description is given of operations in the repeater pertaining to the neighbor list update, with reference to a flowchart of FIG. 29.

Upon receipt of the permission from the base station, the first communication unit 3211 refers to the neighbor list 3241 to perform a handover, and achieves synchronization with a new base station (step S3801).

The first communication unit 3211 receives the neighbor list broadcast from the base station with which synchronization is newly achieved, and transmits the received neighbor list to the control unit 3230 (step S3802).

The control unit 3230 adds, to the transmitted neighbor list, information of the base station with which synchronization has been achieved (step S3803).

The control unit 3230 also deletes, in the case where information of the repeater itself is registered in the neighbor list, the information of the repeater 3202 from the neighbor list (step S3804).

The control unit 3230 replaces the neighbor list 3241 stored in the storage unit 3240 with the neighbor list updated in the step S3804. Subsequently, the control unit 3230 transmits the new neighbor list 3241 to the mobile station with which the second communication unit 3221 is in communication (step S3805).

The description has been given of the operations in the repeater pertaining to the neighbor list update.

Figure 30:
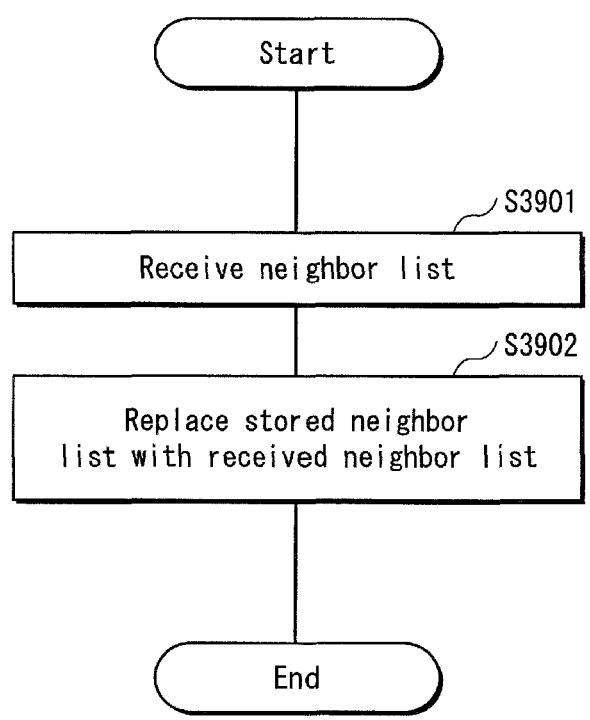
FIG. 30 is a flowchart showing the operations of updating the neighbor list performed by the mobile station according to the third embodiment.

Finally, a description is given of operations in the mobile station pertaining to the neighbor list update, with reference to a flowchart of FIG. 30.

The mobile station regularly receives the neighbor list from the base station or the repeater with which the mobile station is in communication. The communication unit 3310 receives the new neighbor list (step S3901).

Upon receipt of the neighbor list, the communication unit 3310 transmits the received neighbor list to the control unit 3360. Then, the control unit 3360 causes the storage unit 3350 to store the transmitted neighbor list in place of the neighbor list already stored in the storage unit 3350 (step S3902).

The description has been given of the operations in the mobile station pertaining to the neighbor list update.

Now, the neighbor list update is described by a specific example.

Figure 31:
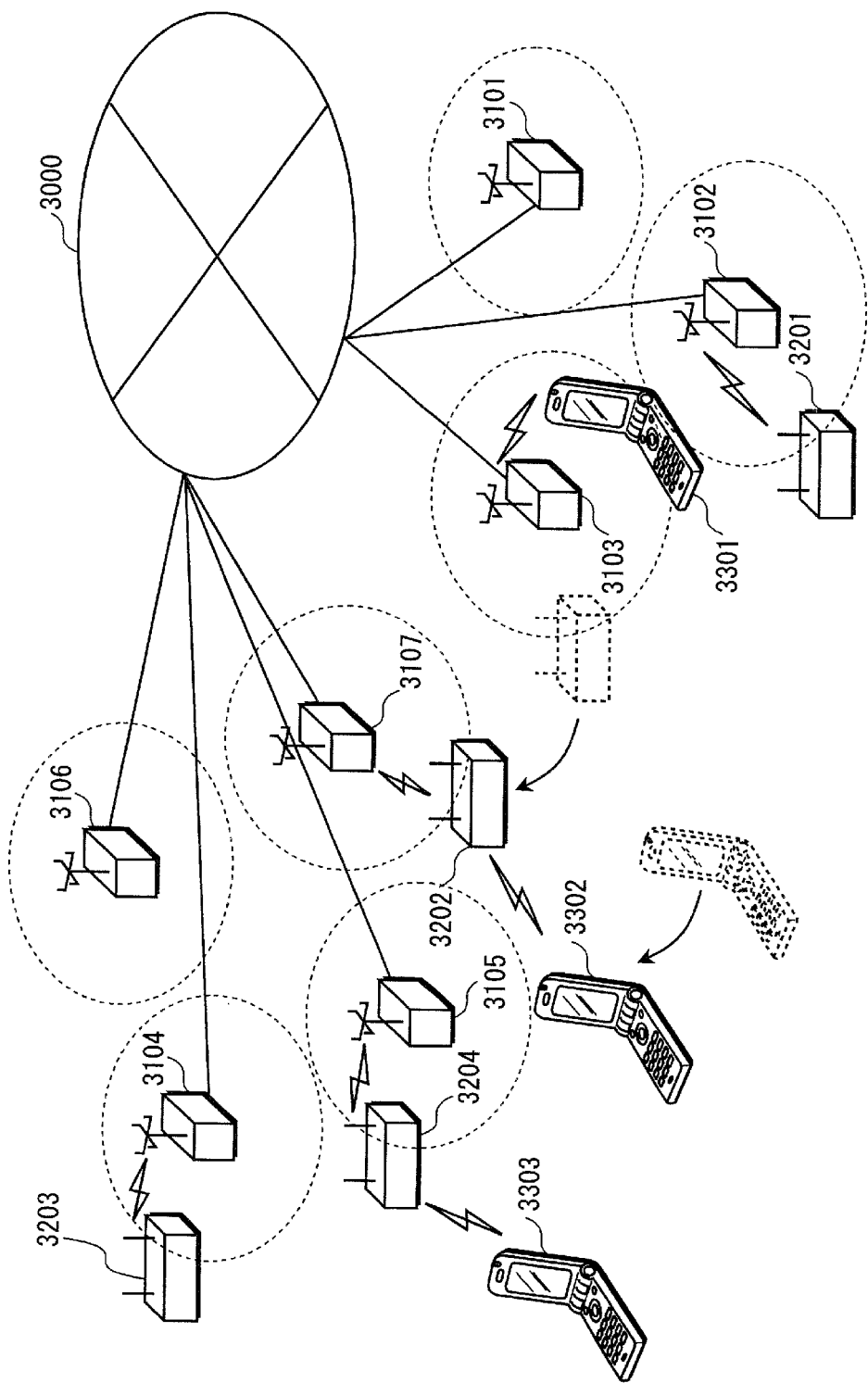
FIG. 31 is a system diagram showing that the repeater 3202 has performed a handover from the base station 3103 to the base station 3107 according to the third embodiment.

In this example, the repeater 3202 in the system diagram of FIG. 22, previously in communication with the base station 3103, performs a handover to the base station 3107, as shown in a system diagram of FIG. 31. Note that in the example the repeater 3202 is mounted in the train car or the like, and that a user of the mobile station 3302 is on the train.

When the repeater 3202 performs the handover from the base station 3103 to the base station 3107, the neighbor list update is performed in each of the base station 3103, the base station 3107, the repeater 3202, and the mobile station 3302.

FIGS. 32A to 32D show the updated neighbor lists held by the respective devices. FIG. 32A shows the updated neighbor list held by the base station 3103, FIG. 32B shows the updated neighbor list held by the repeater 3202, FIG. 32C shows the updated neighbor list held by the base station 3107, and FIG. 32D shows the updated neighbor list held by the mobile station 3302.

Comparison is made between FIGS. 26A to 26D and FIGS. 32A to 32D to describe how the respective neighbor lists are updated.

Firstly, regarding the neighbor list held by the base station 3103, the base station 3103 has cancelled synchronization with the repeater 3202 previously in communication with each other. As a result, as can be seen from a change from FIG. 26A to FIG. 32A, the information of the repeater 3202 is deleted from the neighbor list held by the base station 3103.

Next, regarding the neighbor list held by the base station 3107, the base station 3107 has newly achieved synchronization with the repeater 3202. As a result, as can be seen from a change from FIG. 26C to FIG. 32C, the information of the repeater 3202 is added to the neighbor list held by the base station 3107.

Regarding the neighbor list held by the repeater 3202, the neighbor list is updated as shown by a change from FIG. 26B to FIG. 32B. Since the repeater 3202 has performed the handover to the base station 3107, the repeater 3202 acquires the neighbor list shown in FIG. 32C from the base station 3107. The repeater 3202 adds the information of the base station 3107 to the neighbor list shown in FIG. 32C, and deletes the information of the repeater 3202 itself. Consequently, the repeater 3202 holds the neighbor list shown in FIG. 32B.

The neighbor list updated by the repeater 3202 is broadcast to the mobile station 3302. Consequently, the neighbor list held by the mobile station 3302 is updated as shown by a change from FIG. 26D to FIG. 32D. As can be seen from comparison between FIG. 26D and FIG. 26D, the neighbor list held by the mobile station 3302 is naturally identical to the neighbor list held by the repeater 3202.

In this way, in the case where the repeater performs a handover, the neighbor list update is performed in each of the base station previously in communication with the repeater, the base station to which the repeater has performed the handover, the mobile station which is in communication with the repeater, and the repeater itself. Consequently, the mobile station and the repeater are enabled to appropriately perform a handover anytime. Thus, in the case where the repeater performs the handover, the handover triggers the update of the respective neighbor lists held by the handover target base station and the repeater itself. These neighbor lists are to be broadcast to the mobile station. This prevents, when the mobile station previously managed by the repeater performs a handover from the repeater, the situation where the mobile station cannot actually detect the handover target base station or the handover target repeater registered in the own neighbor list.

Modifications of Third Embodiment

A description is given of various modifications of the above third embodiment.

(1) Although in the third embodiment the neighbor list update is triggered by the handover performed by the repeater, the neighbor list update may be performed using the following method.

In the case where the repeater is mounted in the train car, it is basically possible to speculate the communication target base stations of the repeater for various time zones, based on the train time table, the train map, and so on. For this reason, the base stations and the repeater may each hold, for each time zone, a neighbor list showing one of the base stations in association with the repeater. In this case, each base station and the repeater may switch the neighbor list to be used in accordance with time information obtained from the respective clocks or the like.

(2) In the third embodiment, the handover triggers the neighbor list update involving addition and deletion of the information to and from the respective neighbor lists held in the base stations and the repeater. Such information is used to uniquely specify the base stations and the repeater in the communication system. That is to say, the information shows IDs uniquely allocated to the base stations and the repeater.

In the case where the ID of a base station and the ID of the repeater overlap with each other for the reason of the system specification, information clarifying that the ID is allocated to the repeater, such as the repeater's ID, is further added.

Furthermore, the neighbor list includes other information, such as frequency bandwidth used by each base station and each repeater.

(3) It is possible to create a control program consisting of a program code for causing processors of the base stations, the repeaters, and the mobile stations and various circuits connected to the processors to perform neighbor list update operations and neighbor list update processing (see FIGS. 28, 29, and 30) described in the third embodiment. Such a control program may be recorded on a recording medium, or circulated and distributed via various communication networks. Such a storage medium includes an IC card, a hard disk, an optical disk, a flexible disk, and a ROM. The circulated and distributed control program becomes available as it is contained in a memory and the like which can be read by a processor. The control program is then executed by the processor, so that the various functions as described in the embodiments are realized.

Fourth Embodiment

In the above first to third embodiments, the repeaters, the mobile stations, and the communication systems are disclosed, all of which operate in accordance with the WiMAX standards.

The WiMAX standards specify services called MCBCS (Multi Cast Broad Cast Services).

Figure 45:
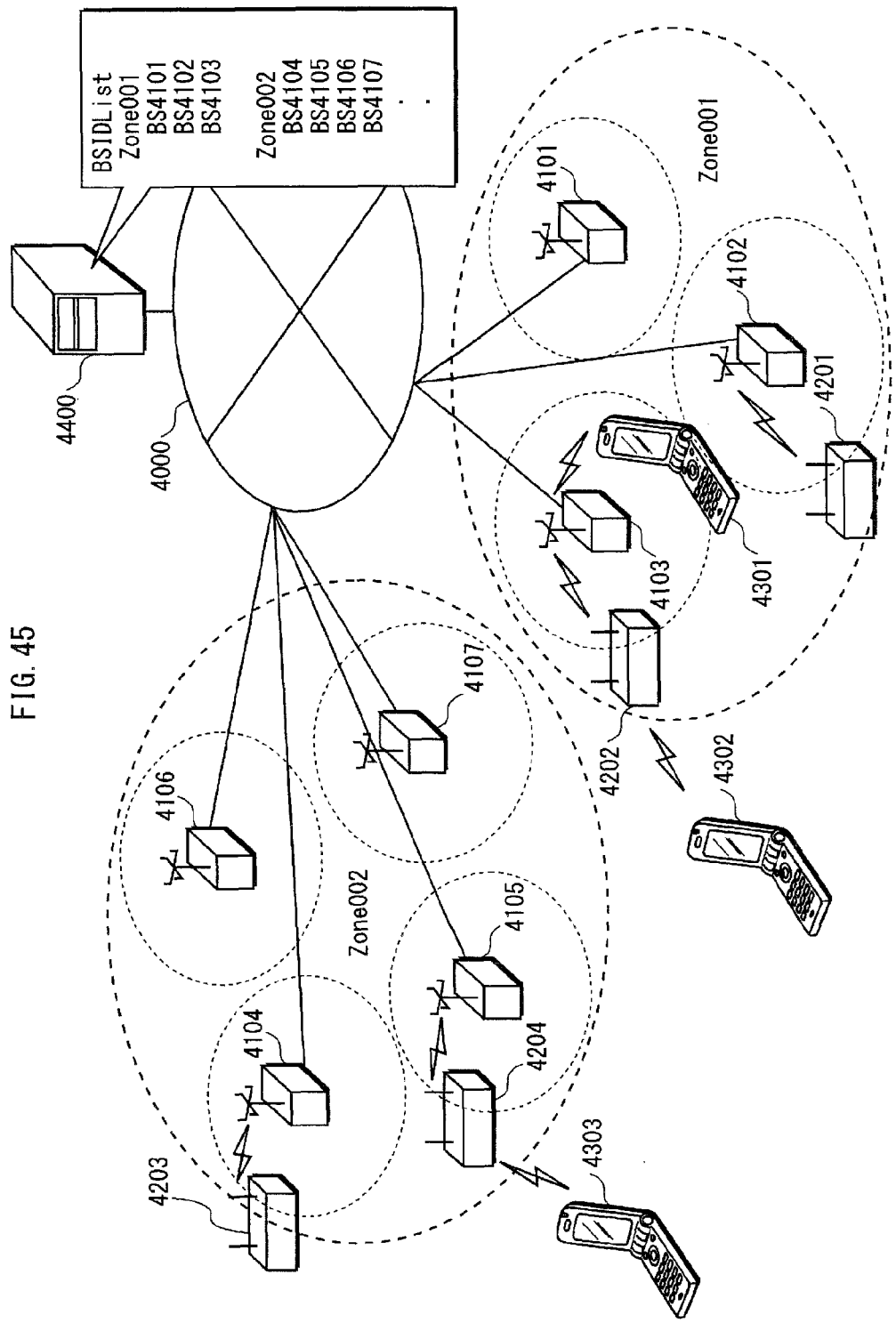
FIG. 45 is a system diagram for illustrating conventional MCBCS according to the fourth embodiment.

FIG. 45 is a system diagram of the communication system for illustrating the WiMAX MCBCS. The MCBCS are services optimized for transmission of common information to devices located in one of zones that are determined in advance. Each zone is specified in association with one or more base stations located in the zone.

As shown in FIG. 45, the communication system includes an ASN-GW (Access Service Network-Gate Way) server 4400, base stations BS (Base Stations) 4101 to 4107, repeaters 4201 to 4204, and mobile stations 4301 to 4303. Note that FIG. 45 only shows an example of the numbers of the base stations, the repeaters, and the mobile station, and the communication system may include any numbers of base stations, repeaters, and mobile stations.

The base stations 4101 to 4107 are connected with each other via a network 4000.

The repeater 4201 has achieved synchronization and is in communication with the base station 4102. The repeater 4202 has achieved synchronization and is in communication with the base station 4103. The repeater 4203 has achieved synchronization and is in communication with the base station 4104. The repeater 4204 has achieved synchronization and is in communication with the base station 4105.

The mobile station 4301 has achieved synchronization and is in communication with the base station 4103. The mobile station 4302 has achieved synchronization and is in communication with the repeater 4202. The mobile station 4303 has achieved synchronization and is in communication with the repeater 4204.

The ASN-GW server 4400 holds a BSID (Base Station IDentifier) list for classifying the base stations into several zones, and broadcasts a content specified by the operator to base stations corresponsing to one or more of the zones.

Figure 33:
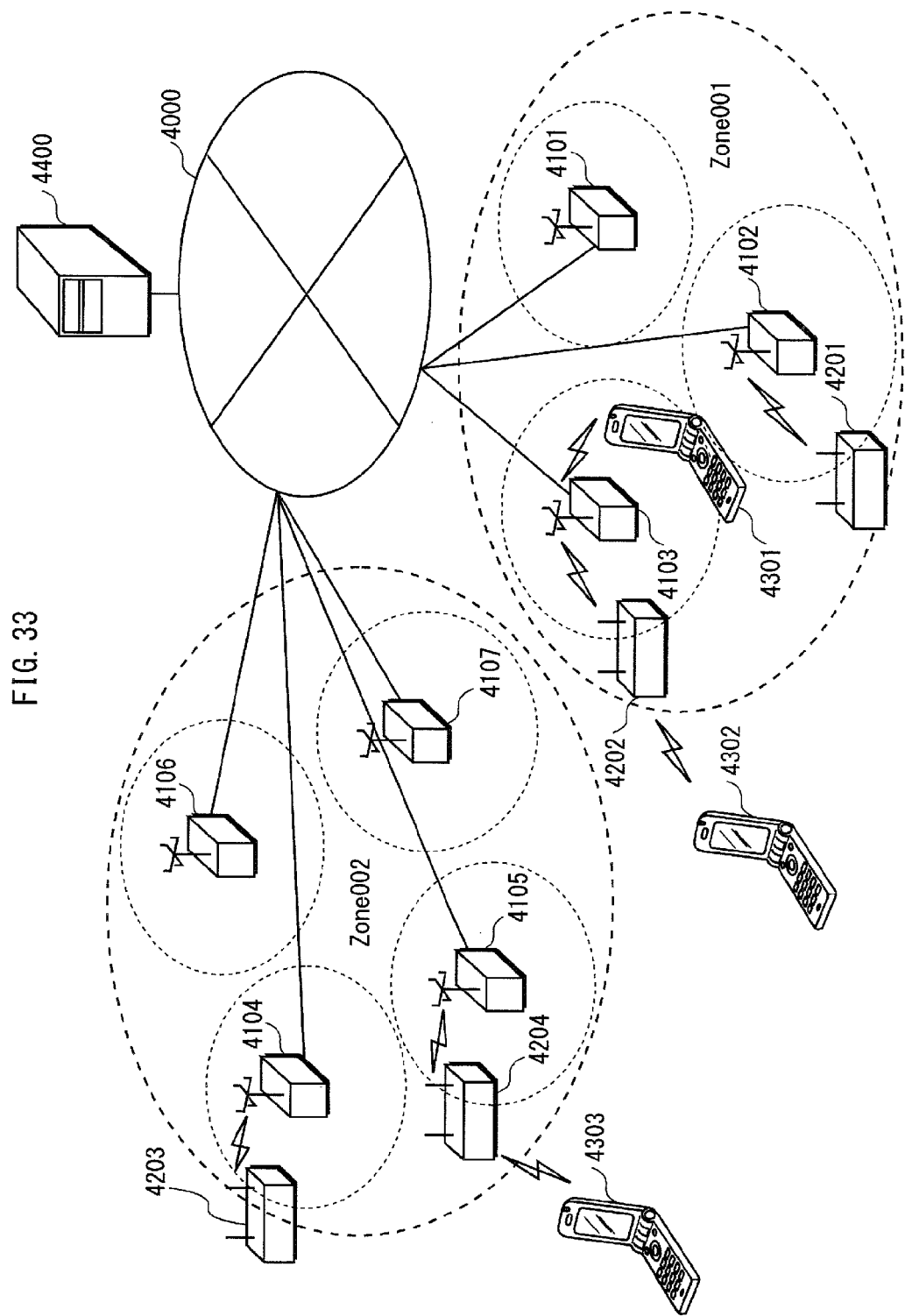
FIG. 33 is a configuration diagram of the communication system according to a fourth embodiment.

In the system diagram shown in FIG. 33, the BSs 4101 to 4103 belong to Zone 001, and the BSs 4104 to 4107 belong to Zone 002. For example, a content A is broadcast to the Zone 001, and a content B is broadcast to the Zone 002.

In the BSID list stored in the ASN-GW server 4400 broadcasting information, the base stations are classified into the several zones. This enables different sets of information to be broadcast to the respective zones.

Conventional techniques only allow specification of zones in the unit of a wireless base station, thereby raising a problem that the MCBCS information transmission cannot be performed with detailed zone specification.

In view of the above problem, an objective of the fourth embodiment is to provide a management server that is capable of managing content broadcast destinations so that the MCBCS information transmission is performed with more detailed zone classification than before.

<Structure>

A description is given of the management server according to the fourth embodiment that aims to solve the above problem, with reference to FIGS. 33 to 45.

FIG. 33 is a system diagram showing a system structure of the communication system.

The communication system includes the base stations 4101 to 4107, the repeaters 4201 to 4204, the mobile stations 4301 to 4303, and the ASN-GW server 4400. Note that FIG. 33 only shows an example of the numbers of the base stations, the repeaters, and the mobile station. In fact, the communication system may include thousands or several tens of thousands of base stations, repeaters, and mobile stations.

Each base station 4101 to 4107 is connected to the ASN-GW server 4400 via the network 4000. The base stations 4101 to 4103 belong to the Zone 001, and the base stations 4104 to 4107 belong to the Zone 002. The Zone 001 and the Zone 002 are destinations of the content broadcast using the MCBCS.

The repeater 4201 has achieved synchronization and is in communication with the base station 4102. The repeater 4202 has achieved synchronization and is in communication with the base station 4103. The repeater 4203 has achieved synchronization and is in communication with the base station 4104. The repeater 4204 has achieved synchronization and is in communication with the base station 4105.

The mobile station 4301 has achieved synchronization and is in communication with the base station 4103. The mobile station 4302 has achieved synchronization and is in communication with the repeater 4202. The mobile station 4303 has achieved synchronization and is in communication with the repeater 4204.

In the system diagram of FIG. 33, the base stations 4101 to 4103 belong to the Zone 001. The base stations 4104 to 4107 belong to the Zone 002.

It should be noted that in the description below the base station, the repeater, and the mobile station may be referred to as the BS (Base Station), the RS (Relay Station), and the MS (Mobile Station), respectively. Further, it is assumed that the base station, the repeater, and the mobile station each have a fundamental structure conventionally known, and the description of the present embodiment focuses on characteristic features of the invention.

Figure 34:
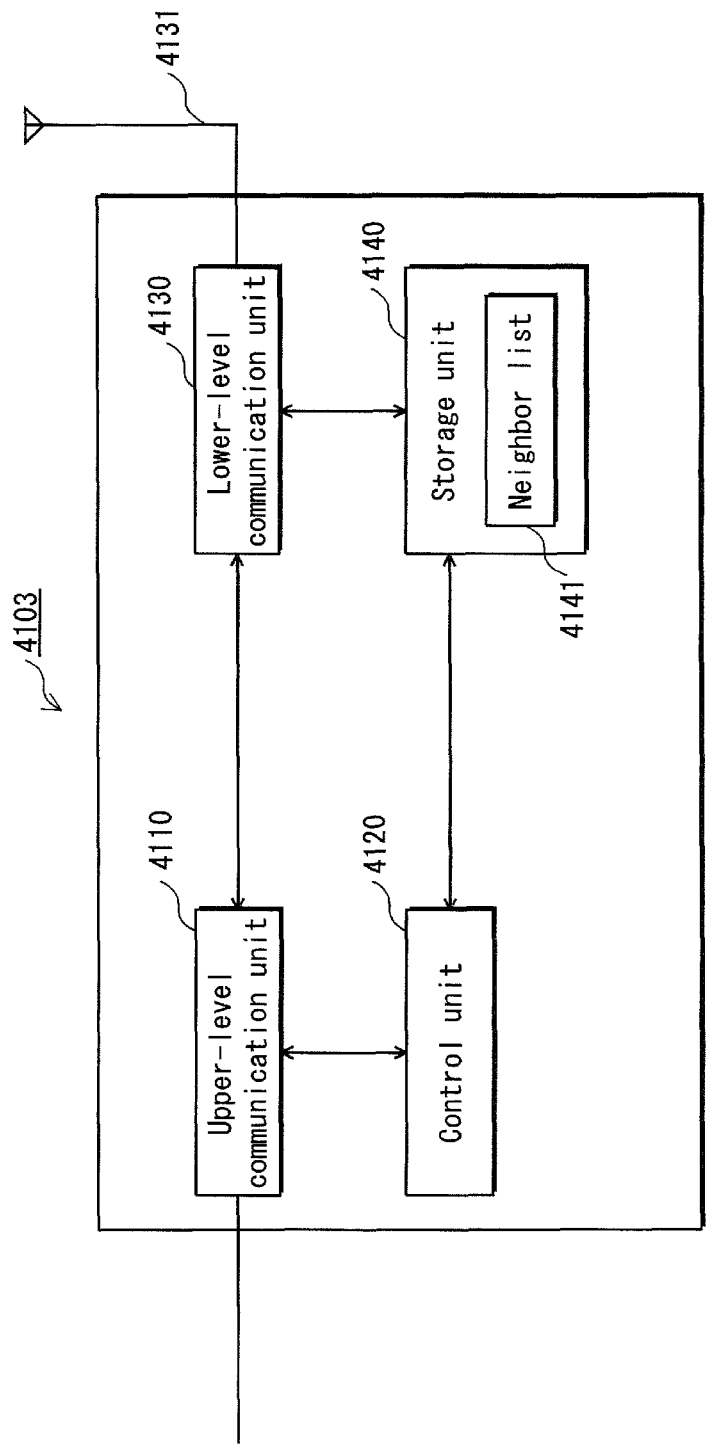
FIG. 34 is a function block diagram showing a functional structure of the base station according to the fourth embodiment.

FIG. 34 is a function block diagram showing a functional structure of the base station. Each base station has a similar functional structure, and the description herein takes the base station 4103 as an example.

FIG. 34 is a function block diagram showing a functional structure of the base station 4103. As shown in FIG. 34, the base station 4103 includes an upper communication unit 4110, a control unit 4120, a lower-level communication unit 4130, and a storage unit 4140.

The upper-level communication unit 4110 is connected to the network 4000, and has a function of performing communication with other base station(s). The upper-level communication unit 4110 also has the following two functions. One is to receive, from another base station, a signal addressed to a mobile station whose information is registered in the own base station, and send the received signal to the lower-level communication unit 4130. The other is to output, to the network 4000, a signal sent from the lower-level communication unit 4130. The upper-level communication unit 4110 also has a function of receiving content data transmitted from the ASN-GW server 4400 using the MCBCS. The upper-level communication unit 4110 further includes a function of, upon receipt of the synchronization achievement information or the synchronization cancellation information from the lower-level communication unit 4130, transmitting the received synchronization achievement information or the received synchronization cancellation information to the ASN-GW server 4400.

The control unit 4120 has a function of controlling each unit included in the base station 4103.

The lower-level communication unit 4130 is connected to an antenna 4131, and has a function of performing communication with the mobile station and the repeater. The lower-level communication unit 4130 transmits, via the antenna 4131, a frame containing the preamble, the DL-MAP, and the UL-MAP so as to achieve synchronization with the repeater and the mobile station. The DL-MAP includes information, such as a frequency, required for communication in the downlink direction. The UL-MAP includes information, such as a frequency, required for communication in the downlink direction. In the case where a signal received from the upper-level communication unit 4110 is content data broadcast from the ASN-GW server 4400 using the MCBCS and where the received signal is addressed to the base station 4103, the lower-level communication unit 4130 transmits the received signal to the mobile station which is in communication with the base station 4103. Even in the case where the received signal is not addressed to the own station, the lower-level communication unit 4130 transmits the content data for the MCBCS to the repeater.

The lower-level communication unit 4130 also has a function of, in the case where the base station 4103 has achieved synchronization with a new repeater, transmitting to the upper-level communication unit 4110 the synchronization achievement information that includes information of the new repeater and indicates that synchronization is newly achieved. The lower-level communication unit 4130 also has a function of, in the case where the base station 4103 has cancelled synchronization with the repeater previously in communication, transmitting to the upper-level communication unit 4110 the synchronization cancellation information that includes information of the cancelled repeater and indicates that synchronization is cancelled.

The storage unit 4140 has a function of storing therein a program and data required for the base station 4103 to perform operations, and stores therein the neighbor list 4141. The neighbor list 4141 is information referred to by the mobile station or the repeater with which the base station has achieved synchronization when the mobile station or the repeater performs a handover. The information in the neighbor list 4141 indicates base station(s) and repeater(s) that are candidates for a handover target.

The description has been given of the base station 4103 so far.

Figure 35:
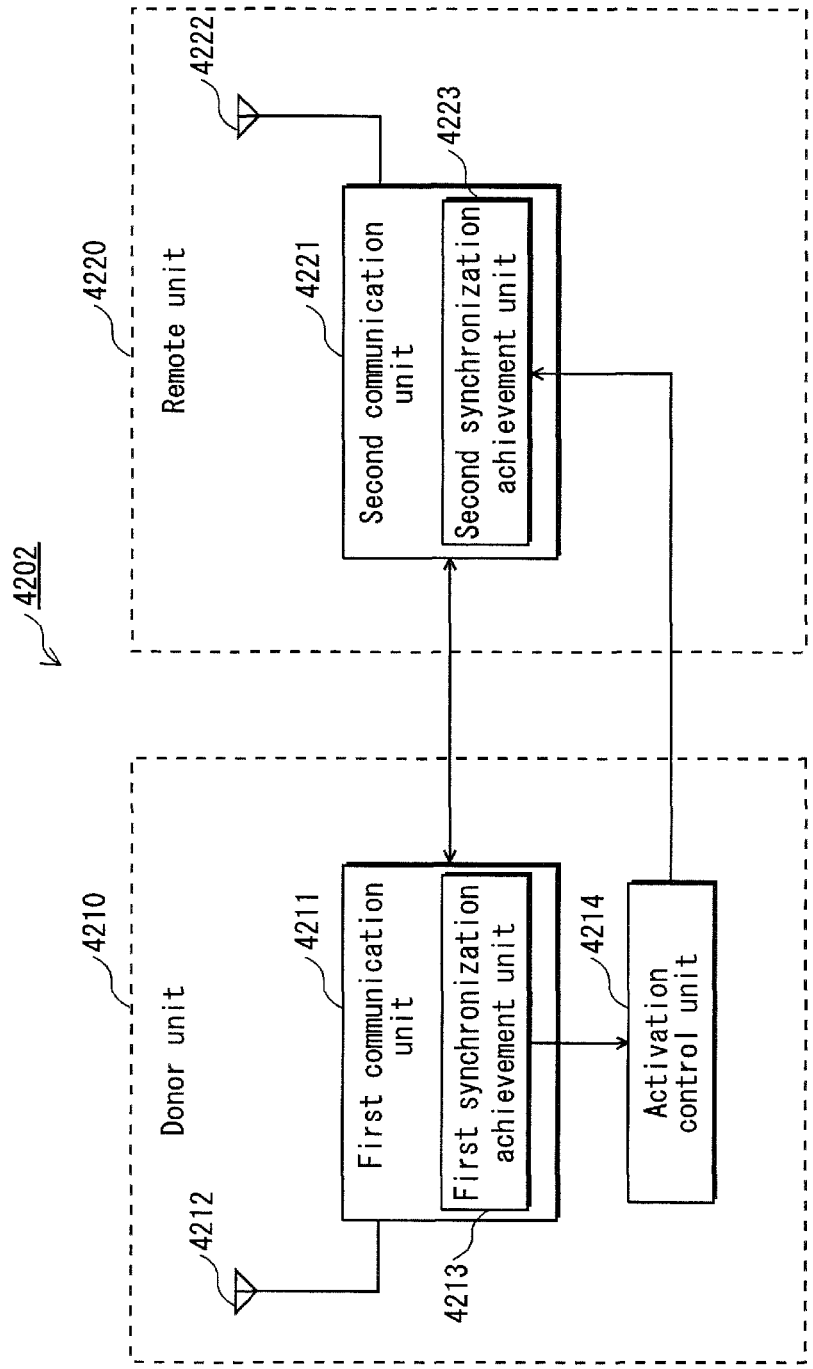
FIG. 35 is a function block diagram showing a functional structure of the repeater according to the fourth embodiment.

FIG. 35 is a function block diagram showing a functional structure of the repeater. Each repeater has a similar functional structure, and the description herein takes the repeater 4202 as an example.

FIG. 35 is the function block diagram showing the functional structure of the repeater 4202. As shown in FIG. 35, the repeater 4202 includes a donor unit 4210 and a remote unit 4220. The donor unit 4210 has a function of performing communication with the base station 4103. The remote unit 4220 has a function of performing communication with the mobile station 4301. The donor unit 4210 and the remote unit 4220 in accordance with an identical clock signal. The identical clock signal herein refers to a common clock signal or a plurality of clock signals having the same frequency and the same phase.

The donor unit 4210 includes a first communication unit 4211 and an activation control unit 4214.

The first communication unit 4211 is connected to an antenna 4212 and includes the second synchronization achievement unit 4213. The first communication unit 4211 has a function of performing communication with the base station via the antenna 4212. The first communication unit 4211 has a function of sending a signal received from the base station via the antenna 4212 to the remote unit 4220. The first communication unit 4211 also has a function of sending a signal received from the remote unit 4220 to the base station via the antenna 4212. The first communication unit 4211 also has a function of sending, in the case where the signal received from the base station is content data broadcast using the MCBCS and where the received signal includes information specifying an address of the repeater itself, the received signal to a second communication unit 4221 which is described below. In the case where the received signal is the content data broadcast using the MCBCS and where the received signal does not include the information specifying the address of to the repeater itself, the first communication unit 4211 discards the received signal. Note that, however, in the case where the repeater is in communication with another repeater, the first communication unit 4211 transmits the received signal to the second communication unit 4221 so that the content data broadcast using the MCBCS is sent to the other repeater in communication. The first communication unit 4211 further has the following function. When the repeater has difficulty in performing the communication with the base station, that is, when an error rate in the communication is greater than the predetermined threshold value, the first communication unit 4211 requests the base station to permit the repeater to perform a handover. Upon receipt of a permission signal in response to the request, the first communication unit 4211 performs the handover.

The first synchronization achievement unit 4213 holds a reference signal for the preamble. In the state where synchronization is not yet achieved with the base station, the first synchronization achievement unit 4213 detects, from among the signals received by the first communication unit, a signal matching the held reference signal to specify the preamble of the signal. Then, in accordance with the MAP information following the preamble (including a frequency bandwidth of the downlink, allocation of the downlink burst, a frequency bandwidth of the uplink, and allocation of the downlink burst), the first synchronization achievement unit 4213 achieves synchronization with the base station.

After the first synchronization achievement unit 4213 achieves synchronization with the base station, the activation control unit 4214 converts time and intervals of preamble arrival from the base station into time and intervals measured in terms of an operation clock of the repeater 4202. The activation control unit 4214 then notifies a second synchronization achievement unit 4223 described below of the converted time and intervals, and instructs transmission of a frame including the preamble required for synchronization.

The remote unit 4220 includes a second communication unit 4221.

The second communication unit 4221 is connected to an antenna 4222 and includes the second synchronization achievement unit 4223. The second communication unit 4221 has a function of performing communication with the mobile station connected to the remote unit via the antenna 4222. The second communication unit 4221 has a function of sending a signal received from the first communication unit 4211 to a specified mobile station via the antenna 4222. The second communication unit 4221 also has a function of sending a signal received via the antenna 4222 to the first communication unit 4211.

The second communication unit 4221 generates the preamble and the MAP information for each frame. The second synchronization achievement unit 4223 notifies the second communication unit 4211 of timing for transmission so that the preamble transmission is synchronized with the time and the intervals notified by the activation control unit 4214. The second communication unit 4221 transmits a signal including the generated information at the timing notified by the second synchronization achievement unit 4223. Upon receipt of the preamble and the MAP information by the mobile station, various processes of synchronization are started. The second synchronization achievement unit 4223 negotiates with the mobile station to achieve synchronization with the mobile station, as needed.

The description has been given of the repeater 4202 so far.

Figure 36:
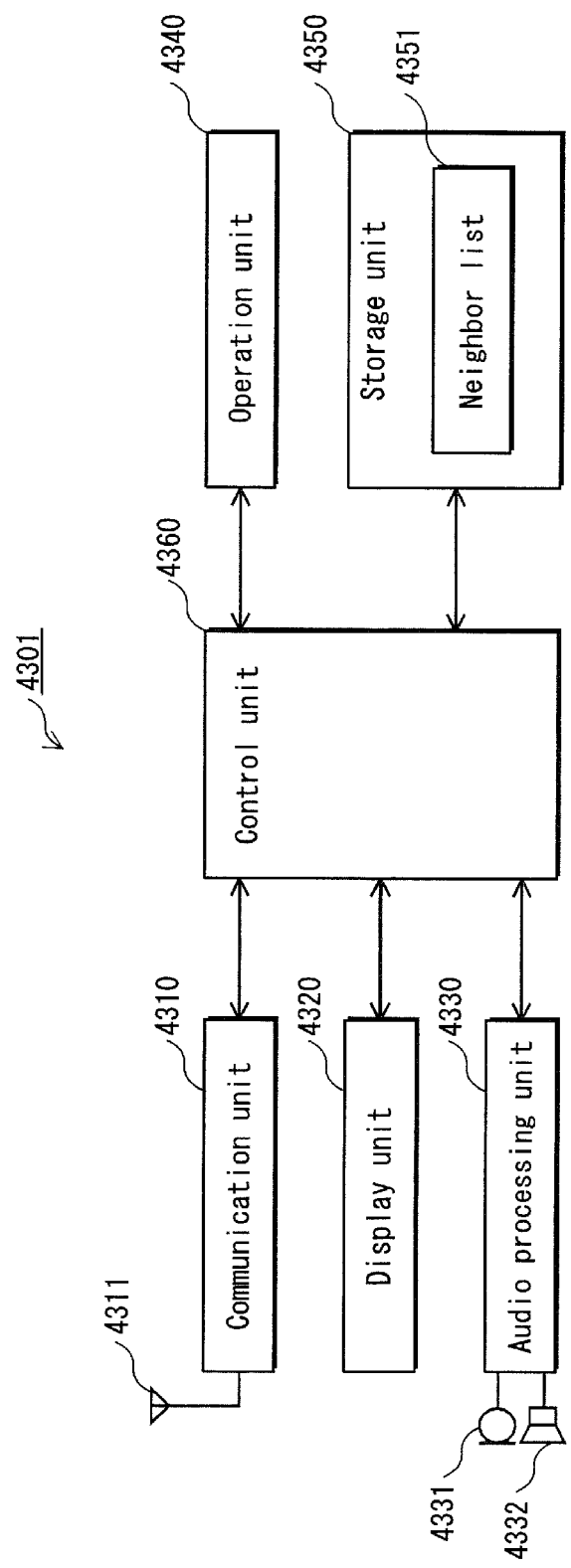
FIG. 36 is a function block diagram showing a functional structure of the mobile station according to the fourth embodiment.

FIG. 36 is a function block diagram showing a functional structure of the mobile station. Each mobile station has a similar functional structure, and the description herein takes the mobile station 4301 as an example.

As shown in FIG. 36, the mobile station 4301 includes a communication unit 4310, a display unit 4320, an audio processing unit 4330, an operating unit 4340, a storage unit 4350, and a control unit 4360.

The communication unit 4310 has a function of receiving a signal via an antenna 4311, demodulating the received signal to a telephone voice signal and a data signal, and outputting the telephone voice signal and the data signal acquired by the demodulation to the control unit 4360. The communication unit 4310 also has a function of modulating a transmission data signal, and outputting the data signal acquired by the modulation via the antenna 4311 used for the communication. The transmission data signal includes a telephone voice signal which has been A/D converted by the audio processing unit 4330, and an email signal which has been sent from the control unit 4360. The communication unit 4310 also has a function of receiving a signal from the base station or the repeater and achieving synchronization with the base station or the repeater.

The display unit 4320 includes a display realized by an LCD (Liquid Crystal Display) or the like. The display unit 4320 has a function of displaying an image on the display in response to an instruction of the control unit 4360.

The audio processing unit 4330 includes the following two functions. One is to D/A convert the received audio signal acquired from the communication unit 4310 and output the converted audio signal to a speaker 4332. The other is to A/D convert the transmission audio signal acquired from a microphone 4331 and output the converted audio signal to the control unit 4360.

The operating unit 4340 includes a ten-key pad, an on hook key, an off hook key, a direction key, a determination key, a mail key, a side key, and others. The operating unit 4340 has a function of receiving a user operation and outputting the received user operation to the control unit 4360.

The storage unit 4350 includes a ROM (Read Only Memory) and a RAM (Random Access Memory), and can be realized by, for example, a small size hard disk or a non-volatile memory. The storage unit 4350 has a function of storing therein various data and programs required for the mobile station 4301 to perform operations. The various data includes music data and image data. The storage unit 4350 stores therein a neighbor list 4351 received from the base station or the repeater with which synchronization has been achieved. The neighbor list 4351 is referred to by the communication unit 4310 when the mobile station 4301 performs a handover.

The control unit 4360 is realized by, for example, a CPU (Central Processing Unit), and has a function of controlling each unit included in the mobile station 4301. If the content broadcast using the MCBCS and received by the communication unit 4310 is audio data, the control unit 4360 causes the audio processing unit 4330 to output the audio data. If the content broadcast using the MCBCS and received by the communication unit 4310 is character or image data, the control unit 4360 causes the display unit 4320 to display the character or the image data.

Figure 37:
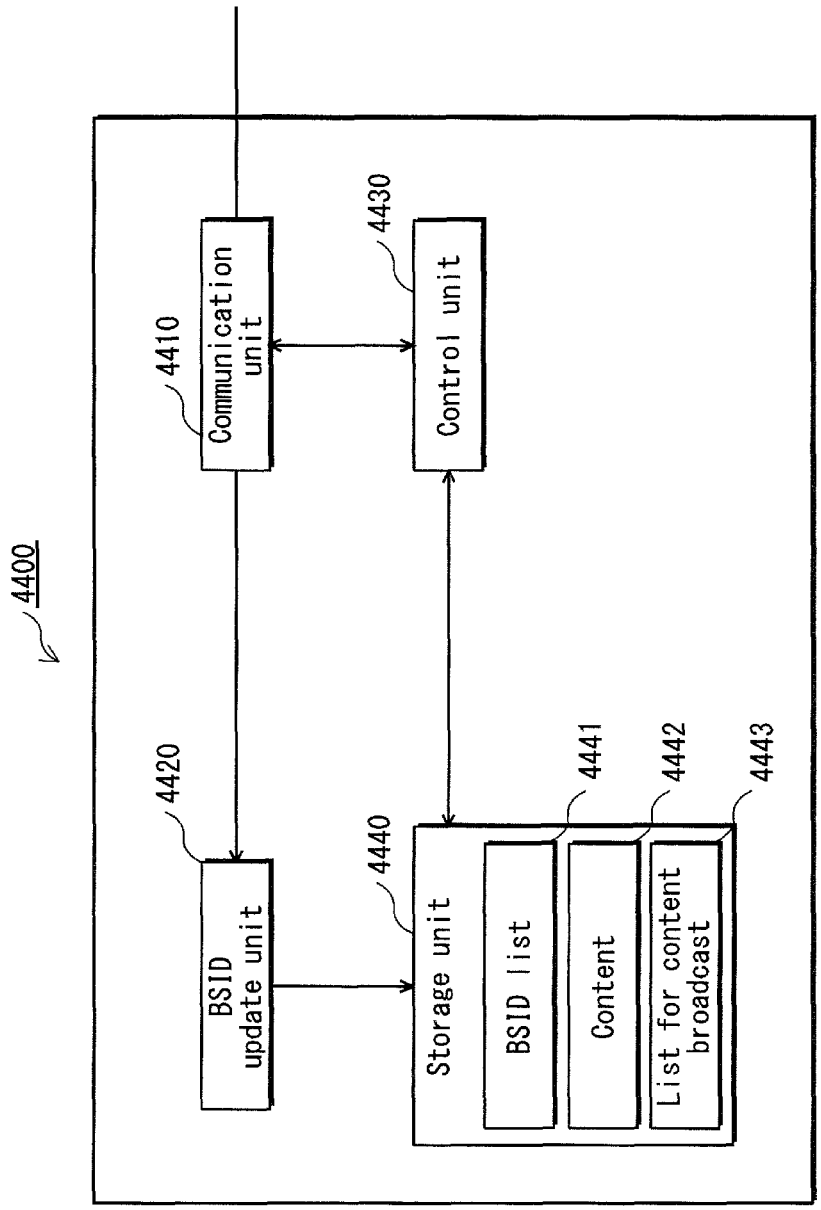
FIG. 37 is a function block diagram showing a functional structure of an ASN-GW server according to the fourth embodiment.

FIG. 37 is the function block diagram showing a functional structure of the ASN-GW server 4400.

As shown in FIG. 37, the ASN-GW server 4400 includes a communication unit 4410, a BSID update unit 4420, a control unit 4430, and a storage unit 4440.

The communication unit 4410 has a function of performing communication with the base stations and the repeaters connected to the network 4000. The communication unit 4410 has a function of transmitting a signal, such as a content to be broadcast using the MCBCS, as instructed by the control unit 4430. The communication unit 4410 also has a function of, upon receipt of the synchronization achievement information from a base station showing that the base station has achieved synchronization with a new repeater, transmitting the synchronization achievement information to the BSID update unit 4420. The communication unit 4410 also has a function of, upon receipt of the synchronization cancellation information from a base station showing that the base station has cancelled synchronization with the repeater, transmitting the synchronization cancellation information to the BSID update unit 4420.

The BSID update unit 4420 has a function of updating the BSID list 4441 stored in the storage unit 4440. Specifically, upon receipt of the synchronization achievement information from the communication unit 4410, the BSID update unit 4420 adds information of the repeater indicated by the synchronization achievement information to a zone in the BSID list 4441 to which the base station sending the synchronization achievement information belongs. Upon receipt of the synchronization cancellation information from the communication unit 4410, the BSID update unit 4420 deletes information of the repeater indicated by the synchronization cancellation information from a zone in the BSID list 4441 to which the base station sending the synchronization cancellation information belongs.

The control unit 4430 has a function of controlling each unit included in the base station 4400, and in particular serves as follows. The control unit 4430 causes the communication unit 4410 to transmit a content to the corresponding base stations and the corresponding repeaters by specifying the base stations and the repeaters with the respective addresses.

The storage unit 4440 has a function of storing therein a program and data required for the ASN-GW server 4400 to perform operations, and in particular, stores therein the BSID list 4441, a content 4442, and a list for content broadcast 4443.

The BSID list 4441 is information showing each zone in association with the base stations and the repeaters belonging to the zone.

The content 4442 is a set of content data that is to be broadcast.

The list for content broadcast 4443 is information indicating which content is to be transmitted to which zone. In the list 4443, information of zones and contents are shown in one-to-one correspondence.

The description has been given of the constituent elements of the ASN-GW server 4400.

<Data>

FIG. 38 is a conceptual data diagram showing an example of a data structure of the BSID list 4441 held by an ASN-GW server 4400.

As shown in FIG. 38, in the BSID list 4441, several base stations and several repeaters are registered for each zone.

According to the BSID list 4441 of FIG. 38, the BS 4101, the BS 4102, the BS 4103, the RS 4201, and the RS 4202 belong to the Zone 001.

The BS 4104, the BS 4105, the BS 4106, the BS 4107, the RS 4203, and the RS 4204 belong to the Zone 002.

Such a configuration of the BSID list 4441 realizes the zone classification shown by the system diagram of FIG. 33. Further, the fact that the repeaters are also registered in the BSID list 4441 allow the content for the MCBCS to be broadcast to any mobile stations managed by the repeaters.

Now, a description is briefly given of a mechanism of the content broadcast. The ASN-GW server 4400 broadcasts each content for the MCBCS to the base stations and the repeaters belonging to the broadcast destination zone of the content, in the form of a signal including in the header the addresses of the base stations and the repeaters. The broadcast content data is received by each base station and each repeater. Only when the addresses included in the header are matching, each base station and each repeater broadcast the received content data to all the mobile stations with which the base station and the repeater has achieved synchronization and are in communication.

FIG. 39 is a conceptual data diagram showing an example of a data structure of the list for content broadcast 4443 held by the ASN-GW server 4400.

As shown in FIG. 39, the list for content broadcast 4443 is configured to show the zones and the contents to be broadcast in one-to-one correspondence.

According to FIG. 39, the content A is broadcast to the Zone 001, and the content B is broadcast to the Zone 002.

<Operations>

Figure 40:
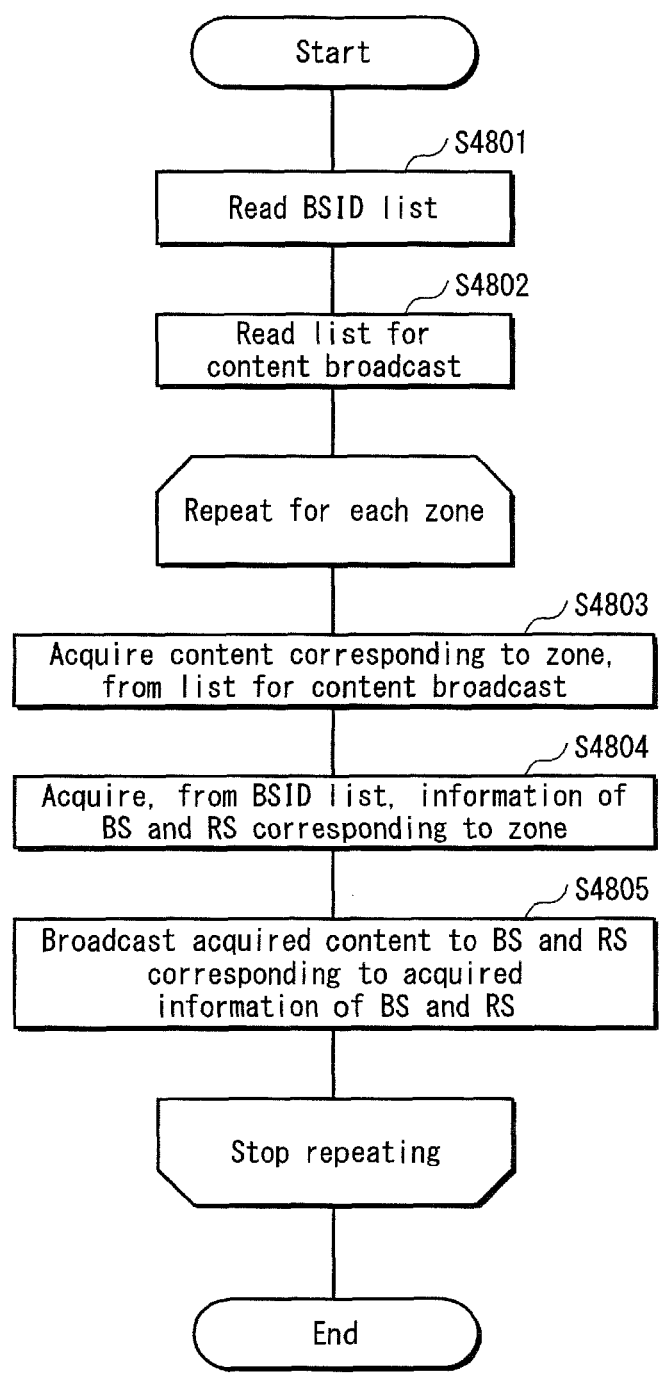
FIG. 40 is a flowchart showing operations performed by the management (i.e. ASN-GW) server to broadcast content data using BCMCS in accordance with the BSID list 4441 according to the fourth embodiment.
Figure 41:
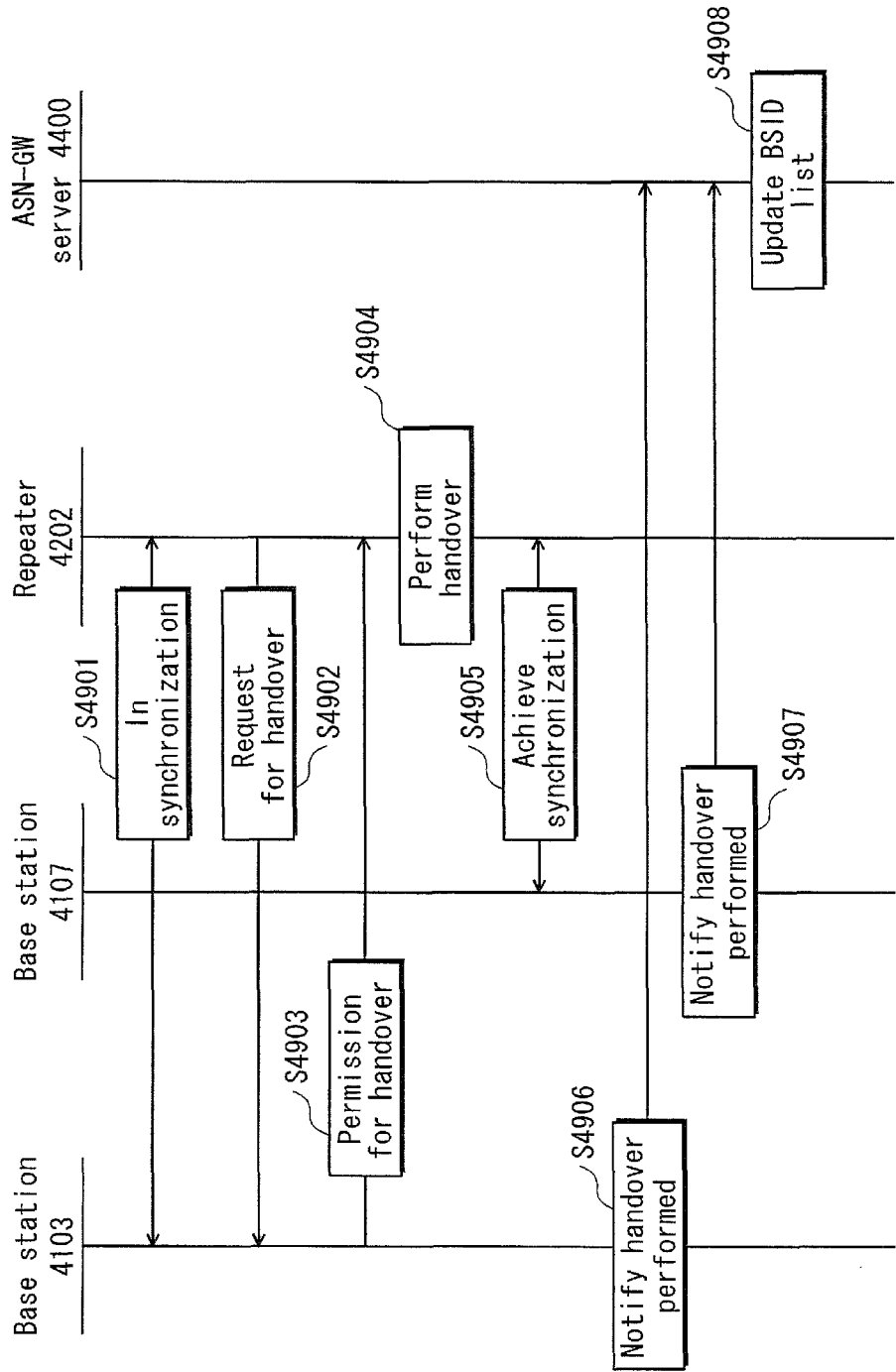
FIG. 41 is a timing chart showing operations of the communication system pertaining to update of the BSID list 4441 according to the fourth embodiment.
Figure 42:
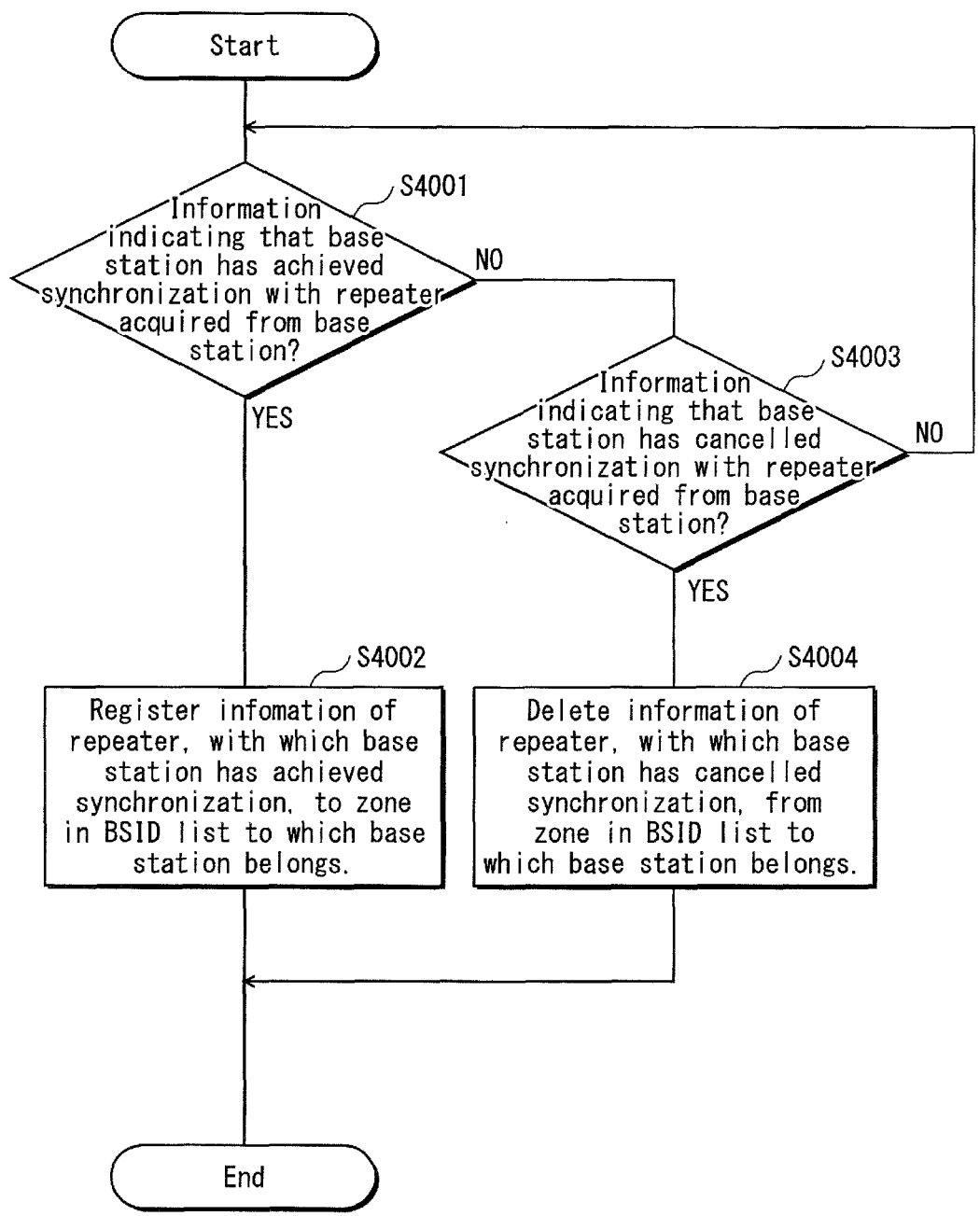
FIG. 42 is a flowchart showing operations performed by the management (i.e. ASN-GW) server to update the BSID list 4441 according to the fourth embodiment.

A description is now given of operations of the fourth embodiment, with reference to flowcharts shown in FIGS. 40, 41, and 42.

A description is firstly given of the content broadcast with reference to FIG. 40. FIG. 40 is the flowchart showing operations performed by the ASN-GW server 4400 when broadcasting the contents.

The following describes the case where the ASN-GW server 4400 is instructed by, for example, the operator to perform the content broadcast.

In response to the instruction, the control unit 4430 reads the BSID list 4441 from the storage unit 4440 (step S4801).

The control unit 4430 also reads the list for content broadcast 4443 from the storage unit 4440 (step S4802).

The control unit 4430 then performs processing of the following steps S4803 to S4805 for all the zones included in the list for content broadcast 4443.

The control unit 4430 acquires, from the storage unit 4440, a content corresponding to one of the zones included in the list for content broadcast 4443 to which the content broadcast has not been performed (step S4803).

This zone is determined as the destination zone to which the content acquired in the step S4803 is to be broadcast. The control unit 4430 acquires information of the base stations and the repeaters belonging to the destination zone with reference to the BSID list 4441 (step S4804).

Subsequently, the control unit 4430 notifies the communication unit 4410 of the content and the addresses of the destination base stations and the destination repeaters to which the content is to be distributed. The communication unit 4410 then broadcasts the notified content to the notified addresses (step S4805).

Each base station and each repeater determines whether the broadcast signal is addressed to the own device (i.e. the base station and the repeater) in accordance with the addresses included in the signal. If the signal is addressed to the own device, the base station and the repeater broadcast the received content to the mobile stations with which the base station and the repeater are in communication. This enables users of the mobile stations to view and listen to the content for the MSBCS and acquire information. The above series of operations are performed by the ASN-GW server 4400 for the content broadcast using the MCBCS.

Meanwhile, it should be noted that some repeaters are mounted in the train car. In this case, such a repeater can be made to move over several zones. This hinders an appropriate content broadcast using the previous BSID list 4441, thereby creating a need for updating the BSID list 4441.

Next, a description is given below of operations of the communication system pertaining to the update of the BSID list 441, with reference to FIG. 41. Thereafter, a description is given of operations in the ASN-GW server 4400 pertaining to the update of the BSID list 4441, with reference to FIG. 42.

FIG. 41 is a timing chart showing the operations of the communication system pertaining to the update of the BSID list 4441.

As shown in FIG. 41, the repeater 4202 has achieved synchronization and is in communication with the base station 4103 (step S4901).

In the description, it is assumed that the repeater 4202 is mounted on, for example, the train car and on the move. As the repeater 4202 has difficulty in performing the communication with the base station 4103, the repeater 4202 requests the base station 4103 to permit the repeater 4202 to perform a handover (step S4902).

In response to the request for a handover, the base station 4103 sends permission for the handover to the repeater 4202 (step S4903).

Upon receipt of the permission for the handover, the repeater refers to the neighbor list held by the repeater itself to perform the handover (step S4904). In the description, the repeater 4202 performs the handover to the base station 4107.

The repeater 4202 receives a preamble signal from the base station 4107, and achieves synchronization with the base station 4107 by the predetermined procedures (step S4905).

The base station 4103 detects that synchronization with the repeater 4202 has been cancelled, and notifies the ASN-GW server 4400 of the information indicating that the synchronization between the base station 4103 and the repeater 4202 has been cancelled due to the handover performed by the repeater 4202 (step S4906).

On the other hand, the base station 4107 notifies the ASN-GW server 4400 of the information indicating that the base station 4107 has newly achieved synchronization with the repeater 4202 (step S4907).

In response to the information regarding the performed handover and the synchronization achievement information regarding the new repeater, the ASN-GW server 4400 updates the BSID list 4441 held therein (step S4908).

So now, the description is given of the BSID update operations performed by the ASN-GW server 4400, with reference to the flowchart of FIG. 42.

As shown in FIG. 42, upon receipt of a signal from the base station, the ASN-GW server 4400 determines whether or not the signal carries the synchronization achievement information indicating that the base station has achieved synchronization with a new repeater (step S4001). The determination in the step S4001 is made depending on whether the received signal includes an identifier indicating the synchronization achievement information.

In the case where the signal received from the base station carries the synchronization achievement information (YES in the step S4001), the BSID update unit updates the BSID list 4441, by adding information of the new repeater to a zone to which the base station belongs (step S4002). The information of the repeater is included in the transmitted synchronization achievement information.

In the case where the signal received from the base station does not carry the synchronization achievement information (NO in the step S4001), the communication unit determines whether or not the received signal carries the synchronization cancellation information indicating that the base station has cancelled synchronization with the repeater previously in communication (step S4003). The determination in the step S4003 is made depending on whether or not the received signal includes an identifier indicating the synchronization cancellation information.

In the case where the received signal does not carry the synchronization cancellation information (NO in the step S4003), this means that the received signal is other signal than the synchronization achievement information and the synchronization cancellation information. In this case, processing in accordance with the received signal is performed.

In the case where the received signal carries the synchronization cancellation information (YES in the step S4003), the BSID update unit updates the BSID list 4441, by deleting information of the repeater with which the base station has cancelled synchronization from a zone to which the base station transmitting the synchronization cancellation information belongs (step S4004). The information of the repeater is included in the transmitted synchronization cancellation information.

The above series of operations are performed for the update of the BSID list 4441. The movement of the repeater from one zone to another zone is always accompanied by a handover, and the BSID list 4441 is updated with taking the fact into consideration.

Now, the update of the BSID list 4441 is described by a specific example.

Figure 43:
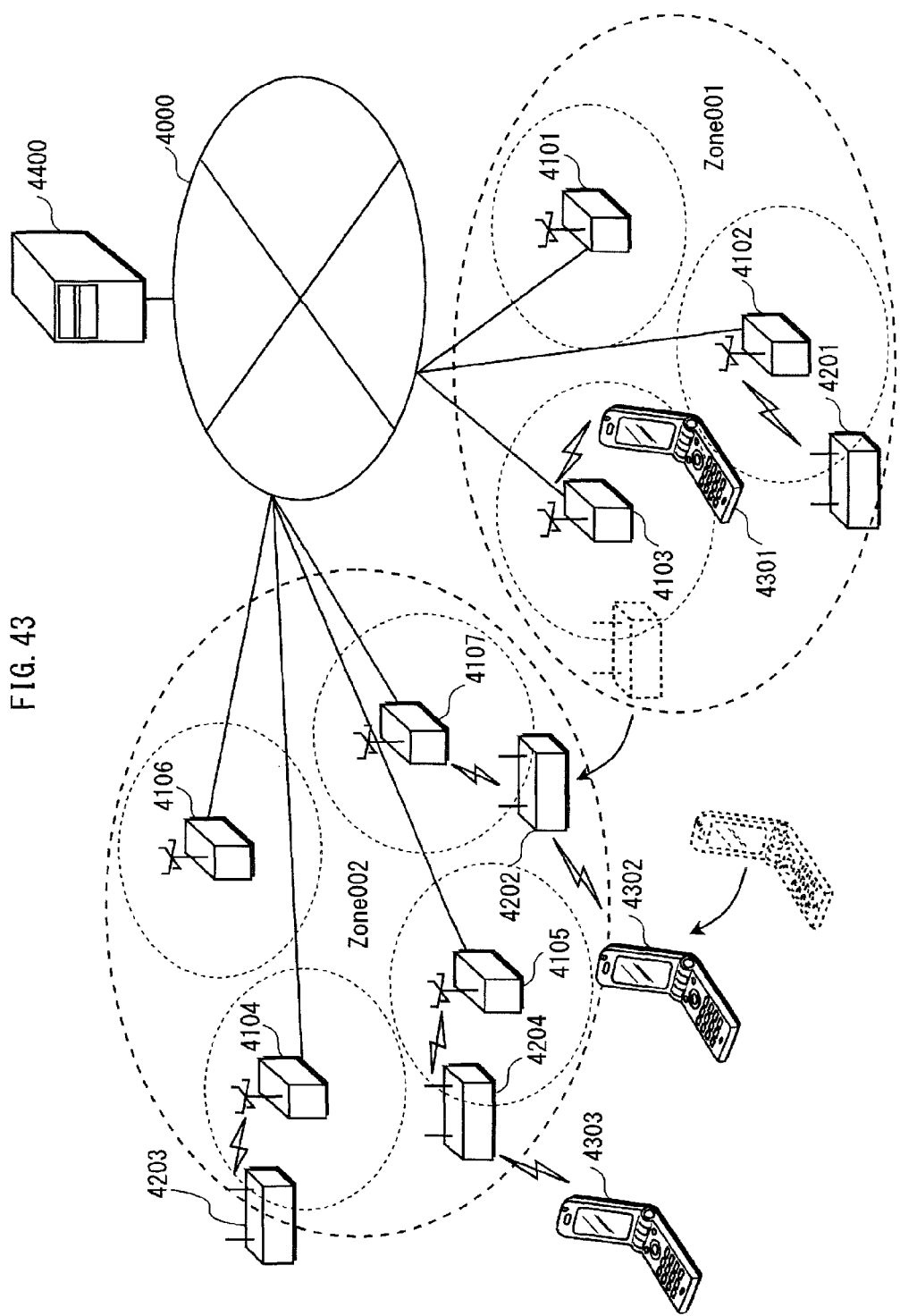
FIG. 43 is a system diagram showing a status of the communication system after a repeater 4202 has moved according to a fourth embodiment.

FIG. 43 is a system diagram showing a status of the communication system after the repeater 4202, which is assumed to be mounted in the train car, has been moved from the status shown in FIG. 33 and performed the handover to the base station 4107.

As shown in FIG. 43, the repeater 4202 has achieved synchronization with the base station 4107, and currently belongs to the Zone 002.

Then, the ASN-GW server 4400 updates the BSID list 4441 shown in FIG. 38 as the BSID list 4441 shown in FIG. 44.

As can be seen from comparison between FIG. 38 and FIG. 44, the RS 4202 is associated with the Zone 001 in FIG. 38, but the association with the RS 4202 and the Zone 001 is deleted in FIG. 44. The RS 4202 is not associated with the Zone 002 in FIG. 38, but associated with the Zone 002 in FIG. 44.

By the BSID list 4441 updated as shown by a change from FIG. 38 to FIG. 44, the ASN-GW server 4400 is enabled to appropriately broadcast the content for the MCBCS even when the repeater performs the handover.

As mentioned so far, due to the fact that the BSID list 4441 includes the information of repeaters, the content broadcast using the MCBCS is performed with more detailed zone classification. This solves the problem in the conventional techniques that only a common content can be broadcast to repeaters belonging to one base station. In contrast to the conventional techniques, the present embodiment allows the repeaters managed by one base station to belong to different zones, so that different contents are broadcast to the respective repeaters.

Furthermore, in the case where the repeaters are mobile, such a repeater moves from one zone to another zone. Even in the case involving the repeater's movement over zones, an appropriate content to the corresponding zone is broadcast to the repeater, by updating the BSID list 4441.

Modifications of Fourth Embodiment

Now, a description is given of various modifications of the above fourth embodiment.

(1) Although in the fourth embodiment each zone includes the base stations and the repeaters adjacent to each other, the zones are provided only for the purpose of setting a group of the base stations and the repeaters to which a common content is to be broadcast. The zones may be set in such a manner that one zone covers a random area skipping some base stations and repeaters. For example, in the system diagram of FIG. 33, the base station 4102 may belong to the Zone 002.

(2) Although in the fourth embodiment each of the base stations and the repeaters belongs to the corresponding one of the zones, each may belong to two or more zones at once. This, however, does not apply to the mobile repeaters.

(3) In the fourth embodiment, the update of the BSID list 4441 is triggered by the handover performed by the repeater to the base station. However, in the case where the repeater is mounted in the train car, it is basically possible to speculate time zones in which the repeater passes through the corresponding zones, based on the train time table, and so on. For this reason, the ASN-GW server 4400 may hold time table information indicating the time zones in which the repeater passes though the respective zones, along with the BSID lists 4441 used in the respective time zones. In this case, the ASN-GW server 4400 may switch one BSID list 4441 to another in accordance with the held time table information.

(4) Although in the fourth embodiment the ASN-GW server 4400 has the function of broadcasting a content, it is suffice for the ASN-GW server 4400 to manage the BSID list 4441. It is possible to provide a separate server for broadcasting a content. In this case, the content broadcast server for broadcasting a content may perform the content broadcast as follows. That is to say, the content broadcast server accesses the ASN-GW server 4400 to acquire the BSID list 4441 in order to determine the broadcast destination zone, and broadcast the content held by the content broadcast server itself in accordance with the acquired BSID list 4441.

The ASN-GW server 4400 may also receive a content input from a recording medium or the like by the operator, in addition to the content held by the ASN-GW server 4400 itself, and broadcast the received content.

(5) Although in the fourth embodiment the information of the repeater included in the synchronization achievement information and the synchronization cancellation information is not described in details, the included information of the repeater allows the ASN-GW server 4400 to uniquely identify the repeater. In other words, the information of the repeater refers to ID that is uniquely allocated to the repeater and does not overlap with the IDs of the base stations.

In the case where the ID of a base station and the ID of the repeater overlap with each other for the reason of the system specification, information clarifying that the ID is allocated to the repeater, such as the repeater's ID, is further added.

(6) In the fourth embodiment, at the time of the content broadcast using the MCBCS, the repeater may be tunneled to the ASN-GW server 4400.

(7) It is also possible to have the following control program stored in a storage medium, or circulated and distributed through various communication channels: the control program comprising program codes for causing processors in the mobile stations and the repeater or circuits connected thereto to execute the operations pertaining to the communication and the update processing of the BSID list 4441 (see FIG. 42) as described in the fourth embodiment. Such a storage medium includes an IC card, a hard disk, an optical disk, a flexible disk, and a ROM. The circulated and distributed control program becomes available as it is contained in a memory and the like which can be read by a processor. The control program is then executed by the processor, so that the various functions as described in the embodiment are realized.

INDUSTRIAL APPLICABILITY

Repeaters according to the present invention may be utilized as a relay device for relaying communication between a base station and a mobile station by achieving synchronization with the base station and the mobile station without using a GPS.

REFERENCE SIGNS LIST 100, 2101 to 2107, 3101 to 3107, 4101 to 4107 base station
110, 2110, 3110, 4110 upper-level communication unit
120, 2120, 3120, 4120 control unit
130, 2130, 3130, 4130 lower-level communication unit
131, 2131, 3131, 4131 antenna
140, 2140, 3140, 4140 storage unit
141, 2141, 3141, 4141 neighbor list
200, 2201 to 2204, 3201-3204, 4201 to 4204 repeater
210, 2210, 3210, 4210 donor unit
211, 2211, 3211, 4211 first communication unit
212, 2212, 3212, 4212 antenna
213, 2213, 3213, 4213 first synchronization achievement unit
214, 2214, 3214, 4214 activation control unit
220, 2220, 3220, 4220 remote unit
221, 2221, 3221, 4221 second communication unit
222, 2222, 3222, 4222 antenna
223, 2223, 3223, 4223 second synchronization achievement unit
300, 2301 to 2304, 3301 to 3303, 4301 to 4303 mobile station
310, 2310, 3310, 4310 communication unit
311, 2311, 3311, 4311 antenna
320, 2320, 3320, 4320 display unit
330, 2330, 3330, 4330 audio processing unit
331, 2331, 3331, 4331 microphone
332, 2332, 3332, 4332 speaker
340, 2340, 3340, 4340 operating unit
350, 2350, 3240, 3350, 4350 storage unit
351, 2351, 3241, 3351, 4351 neighbor list
360, 2360, 3230, 3360, 4360 control unit
2000, 3000, 4000 network
4400 ASN-GW server
4410 communication unit
4420 BSID update unit
4430 control unit
4440 storage unit
4441 BSID list
4442 content
4443 list for content broadcast

The invention claimed is:

1. A repeater for relaying data communication between a base station and a mobile station, the repeater comprising:
a donor unit operable to perform data communication with the base station;
a remote unit operable to perform data communication with the mobile station, wherein
the donor unit (i) receives a signal including a preamble from the base station, (ii) achieves synchronization with the base station in accordance with the received signal to determine start timing of each frame to be used in the data communication between the donor unit and the base station, and (iii) notifies the remote unit of timing serving as a reference for determination of start timing of each frame to be used in the data communication between the remote unit and the mobile station,
the remote unit transmits a frame including a preamble at the start timing determined with reference to the notified reference timing so that the preamble reception by the donor unit is synchronized with the preamble transmission from the remote unit to the mobile station,
the donor and the remote units operate in accordance with an identical clock signal,
the reference timing notified from the donor unit to the remote unit equals timing of the preamble reception by the donor unit as measured in terms of the clock signal, and
the start timing of each frame to be used in the data communication between the remote unit and the mobile station is determined so that the preamble is transmitted from the remote unit to the mobile station at the reference timing.

2. The repeater of claim 1, wherein
the remote unit performs data communication with a plurality of mobile stations in parallel, and
the repeater further includes an instruction unit operable to instruct all the mobile stations to perform a handover in a case where an error satisfying a predetermined condition is detected in the data communication between the repeater and the mobile stations.

3. The repeater of claim 1, further comprising:
a storage unit storing therein a neighbor list indicating information of one or more base stations as candidates for a handover target of the repeater;
a handover performing unit operable to perform a handover from the base station to a target base station selected from the base stations whose information is indicated by the neighbor list, with reference to the neighbor list stored in the storage unit;
an acquisition unit operable to acquire, in a case where the handover performing unit has performed the handover, a new neighbor list held by the target base station; and
a replacement unit operable to replace the neighbor list stored in the storage unit with the new neighbor list and add information of the target base station to the new neighbor list, wherein
the remote unit transmits the neighbor list stored in the storage unit to the mobile station with which the repeater is in communication.

4. The repeater of claim 3, wherein
the replacement unit is further operable, in a case where information of the repeater is included in the neighbor list acquired by the acquisition unit, to delete the information of the repeater from the neighbor list.

5. In a communication system including one or more base stations, one or more repeaters, and one or more mobile stations, a mobile station comprising:
a communication unit operable to perform communication;
a detection unit operable to detect an error in the communication;
a storage unit storing therein a neighbor list indicating information of one or more repeaters and one or more base stations as candidates for a handover target of the mobile station; and
a handover performing unit operable to perform a handover to a target repeater selected from the repeaters whose information is indicated by the neighbor list in a case where an error rate of errors detected by the detection unit is greater than a predetermined threshold value.

6. The mobile station of claim 5, wherein
the handover performing unit comprises:
a request unit operable to request a base station, with which the mobile station has achieved synchronization, to permit the mobile station to perform a handover;
a reception unit operable to receive a permission signal indicating permission for the request; and
a search unit operable to search the neighbor list for the target repeater, upon receipt of the permission signal by the reception unit.

7. The mobile station of claim 6, wherein
the information of the repeaters and the base stations indicated by the neighbor list is registered such that the repeaters have a higher priority than the base stations for the mobile station in performing the handover,
the search unit searches the neighbor list for a repeater or a base station in accordance with order of the priority, and
the handover performing unit performs the handover to the target repeater searched by the search unit, in a case where a signal received from the target repeater has a signal strength greater than or equal to a predetermined level.

8. A communication system including one or more base stations, one or more repeaters, and one or more mobile stations, in which relative positional relations between the repeaters and the base stations are changeable, wherein a base station comprises:
a first storage unit storing therein a neighbor list indicating information of one or more base stations and one or more repeaters as candidates for a handover target of each repeater and each mobile station that are in communication with the base station;
an update unit operable to update, in a case where the base station has achieved synchronization with a new repeater whose information is not indicated by the neighbor list, the neighbor list by adding the information of the new repeater; and
a first transmission unit operable to transmit the neighbor list stored in the first storage unit to each repeater and each mobile station that are in communication with the base station,
a repeater comprises:
a second storage unit storing therein a neighbor list indicating information of one or more base stations and one or more repeaters as candidates for a handover target of each mobile station with which the repeater is in communication;
an acquisition unit operable to acquire, in a case where the repeater has cancelled synchronization previously achieved and achieved synchronization with a new base station, a new neighbor list from the new base station;
a replacement unit operable to replace the neighbor list stored in the second storage unit with the new neighbor list and adds information of the new base station to the new neighbor list; and
a second transmission unit operable to transmit the neighbor list stored in the second storage unit to each mobile station with which the repeater is in communication.

9. The communication system of claim 8, wherein
the update unit is further operable to update, in a case where the base station has cancelled synchronization with a repeater whose information is indicated by the neighbor list, the neighbor list by deleting the information of the repeater.

10. The communication system of claim 8, wherein
the replacement unit is further operable to delete, in a case where information of the repeater is indicated by the new neighbor list acquired by the acquisition unit, the information of the repeater from the new neighbor list.

11. The communication system of claim 8, wherein
the first storage unit stores therein a plurality of neighbor lists each in association with a different time period, each neighbor list indicating information of one or more base stations and one or more repeaters which are located close to the base station in the time period,
the base station further includes:
a determination unit operable to determine, in accordance with the time periods, one of the stored neighbor lists to be broadcast, and
the first transmission unit transmits the neighbor list determined by the determination unit to each repeater and each mobile station that are in communication with the base station.

12. In a communication system including a management server, one or more base stations, one or more repeaters, and one or more mobile stations, the management server being used for managing broadcast destinations of contents in the communication system, each base station (i) receiving a content broadcast from the management server and (ii) transmitting the received content to a repeater managed by the base station and, in a case where the received content is addressed to the base station, to a mobile station managed by the base station, and the repeater transmitting the received content to a mobile station managed by the repeater in a case where the received content is addressed to the repeater, wherein the management server comprises:

a storage unit storing therein a broadcast list referred to by the management server when broadcasting any content, the broadcast list indicating zones each in association with one or more base stations and one or more repeaters belonging to the zone, each zone being determined as a broadcast destination of one of the contents.

13. The management server of claim 12, further comprising:

a content storage unit storing therein the contents; and
   a broadcast unit operable to broadcast a content to each base station and each repeater belonging to the corresponding one of the zones, with reference to the broadcast list.

14. The management server of claim 12, wherein at least one of the repeaters performs a handover from one base station to a new base station as a result of positional movement of the repeater, the management server further comprises:

a reception unit operable to receive, from the new base station, handover performing information indicating that the at least one repeater has performed the handover; and an update unit operable to update the broadcast list, by adding information of the at least one repeater indicated by the handover performing information to a zone to which the new base station belongs and deleting the information of the at least one repeater from a zone to which the repeater previously belongs.

* * * * *